(12) United States Patent
Jones et al.

(10) Patent No.: US 9,049,558 B2
(45) Date of Patent: *Jun. 2, 2015

(54) SYSTEMS AND METHODS FOR DETERMINING MOBILE THING MOTION ACTIVITY (MTMA) USING SENSOR DATA OF WIRELESS COMMUNICATION DEVICE (WCD) AND INITIATING ACTIVITY-BASED ACTIONS

(71) Applicants: Martin Kelly Jones, Vancouver (CA); Scott Andrew Horstemeyer, Atlanta, GA (US); Maria Khomenko, Pefferlaw (CA)

(72) Inventors: Martin Kelly Jones, Vancouver (CA); Scott Andrew Horstemeyer, Atlanta, GA (US); Maria Khomenko, Pefferlaw (CA)

(73) Assignees: Scott Andrew Horstemeyer, Atlanta, GA (US); Martin Kelly Jones, Vancouver, British Columbia (CA)

( * ) Notice: Subject to any disclaimer, the term of this patent is extended or adjusted under 35 U.S.C. 154(b) by 84 days.

This patent is subject to a terminal disclaimer.

(21) Appl. No.: 13/935,672

(22) Filed: Jul. 5, 2013

(65) Prior Publication Data

US 2014/0065976 A1 Mar. 6, 2014

Related U.S. Application Data

(60) Provisional application No. 61/694,981, filed on Aug. 30, 2012, provisional application No. 61/695,001, filed on Aug. 30, 2012, provisional application No. 61/695,044, filed on Aug. 30, 2012, provisional application No. 61/843,077, filed on Jul. 5, 2013.

(51) Int. Cl.
*H04B 17/00* (2006.01)
*H04W 4/02* (2009.01)

(52) U.S. Cl.
CPC .................................. *H04W 4/027* (2013.01)

(58) Field of Classification Search
USPC .................................. 455/67.11, 418, 456.3
See application file for complete search history.

(56) References Cited

U.S. PATENT DOCUMENTS

| | | | |
|---|---|---|---|
| 5,050,595 A | 9/1991 | Krafft | |
| 5,304,215 A | 4/1994 | MacWhinnie et al. | |
| 5,409,500 A | 4/1995 | Dyrek | |
| 5,897,580 A | 4/1999 | Silver | |
| 6,083,254 A | 7/2000 | Evans | |
| 6,522,265 B1 | 2/2003 | Hillman et al. | |
| 7,499,797 B2 * | 3/2009 | Mok | 701/434 |
| 8,614,670 B2 * | 12/2013 | Nakaoka | 345/158 |
| 2002/0070856 A1 | 6/2002 | Wolfe | |
| 2002/0072348 A1 | 6/2002 | Wheeler et al. | |

(Continued)

*Primary Examiner* — Tuan H Nguyen
(74) *Attorney, Agent, or Firm* — Thomas | Horstemeyer, LLP

(57) ABSTRACT

Systems, apparatus, and methods are disclosed for accurately identifying a moving thing motion activity (MTMA) associated with a mobile thing (MT) using sensor data from one or more sensors associated with a wireless communication device (WCD) transported by the MT so as to enable or initiate a further one or more activity based actions. One such method, among others, comprises: (a) receiving first and second data from one or more sensors (e.g., accelerometer, gyroscope, magnetometer, etc.) associated with a wireless communication device (WCD) transported by a mobile thing (MT), the first and second data indicative of movement of the WCD; (b) determining reference data that defines a reference framework from the first data; (c) normalizing the second data with the reference data so that the second data can be analyzed in the reference framework; and (d) identifying an MTMA associated with the MT based upon the normalized second data.

60 Claims, 56 Drawing Sheets

(56) References Cited

U.S. PATENT DOCUMENTS

| | | |
|---|---|---|
| 2003/0073930 A1 | 4/2003 | Morrissey et al. |
| 2004/0155781 A1 | 8/2004 | DeOme |
| 2005/0075116 A1 | 4/2005 | Laird et al. |
| 2007/0293186 A1 | 12/2007 | Lehmann |
| 2008/0147310 A1 | 6/2008 | Mok |
| 2009/0181640 A1 | 7/2009 | Jones |
| 2009/0191839 A1 | 7/2009 | Cannon, Jr. |
| 2009/0215426 A1 | 8/2009 | Dimsdale |
| 2010/0156788 A1 | 6/2010 | Nakaoka |
| 2011/0130112 A1 | 6/2011 | Saigh et al. |
| 2011/0227788 A1 | 9/2011 | Lundgren et al. |

* cited by examiner

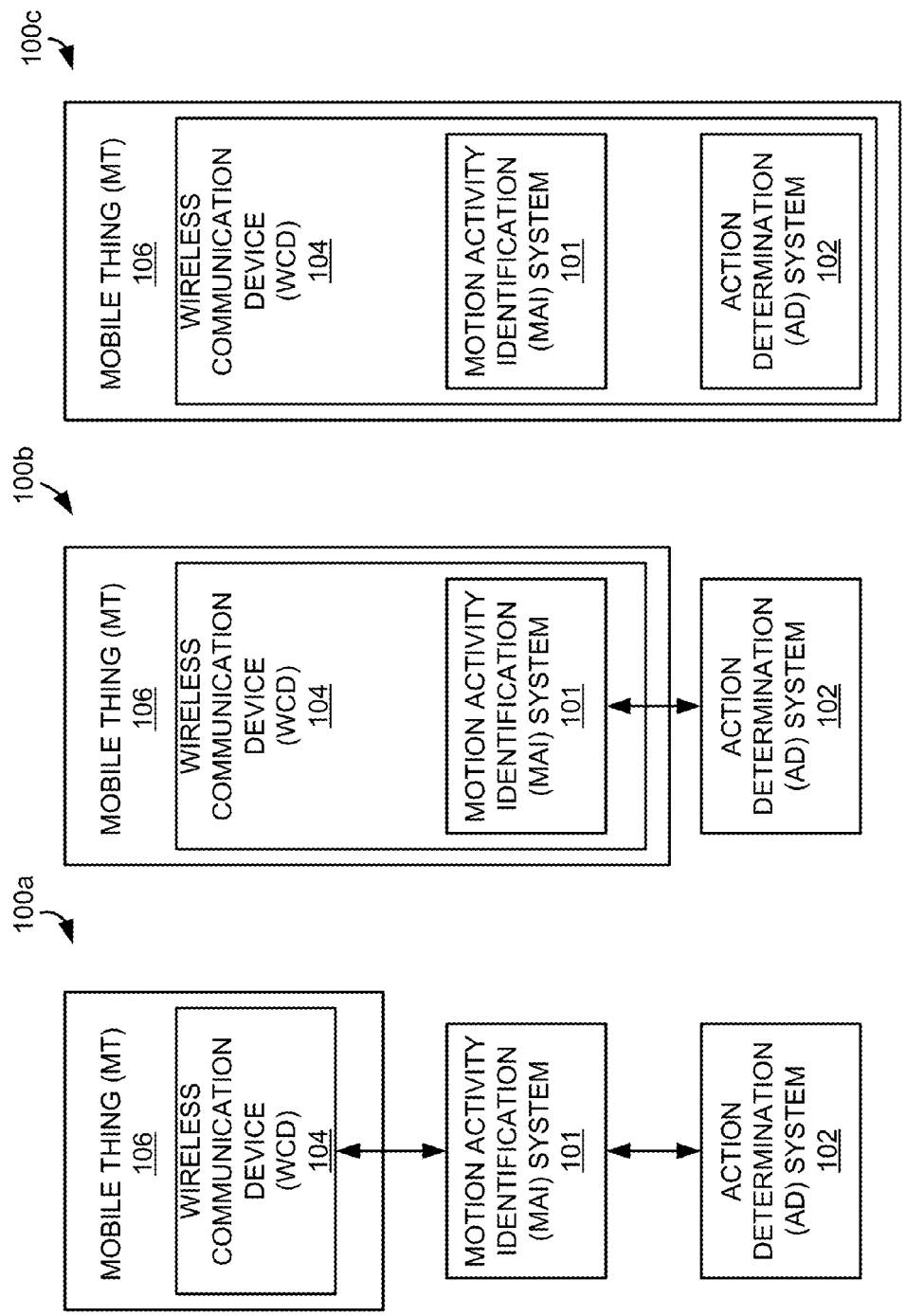

| TIME STAMP 120a | X-AXIS ACCELERATION 120b | Y-AXIS ACCELERATION 120c | Z-AXIS ACCELERATION 120d |

ACCEROMETER OUTPUT DATA STRUCTURE 120

FIG. 3A

| TIME STAMP 121a | ANGULAR RATE OF CHANGE ABOUT X-AXIS 121b | ANGULAR RATE OF CHANGE ABOUT Y-AXIS 121c | ANGULAR RATE OF CHANGE ABOUT Z-AXIS 121d |

GYROSCOPE OUTPUT DATA STRUCTURE 121

FIG. 3B

| TIME STAMP 122a | X-AXIS MAGNETIC FIELD STRENGTH 122b | Y-AXIS MAGNETIC FIELD STRENGTH 122c | Z-AXIS MAGNETIC FIELD STRENGTH 122d |

MAGNETOMETER OUTPUT DATA STRUCTURE 122

FIG. 3C

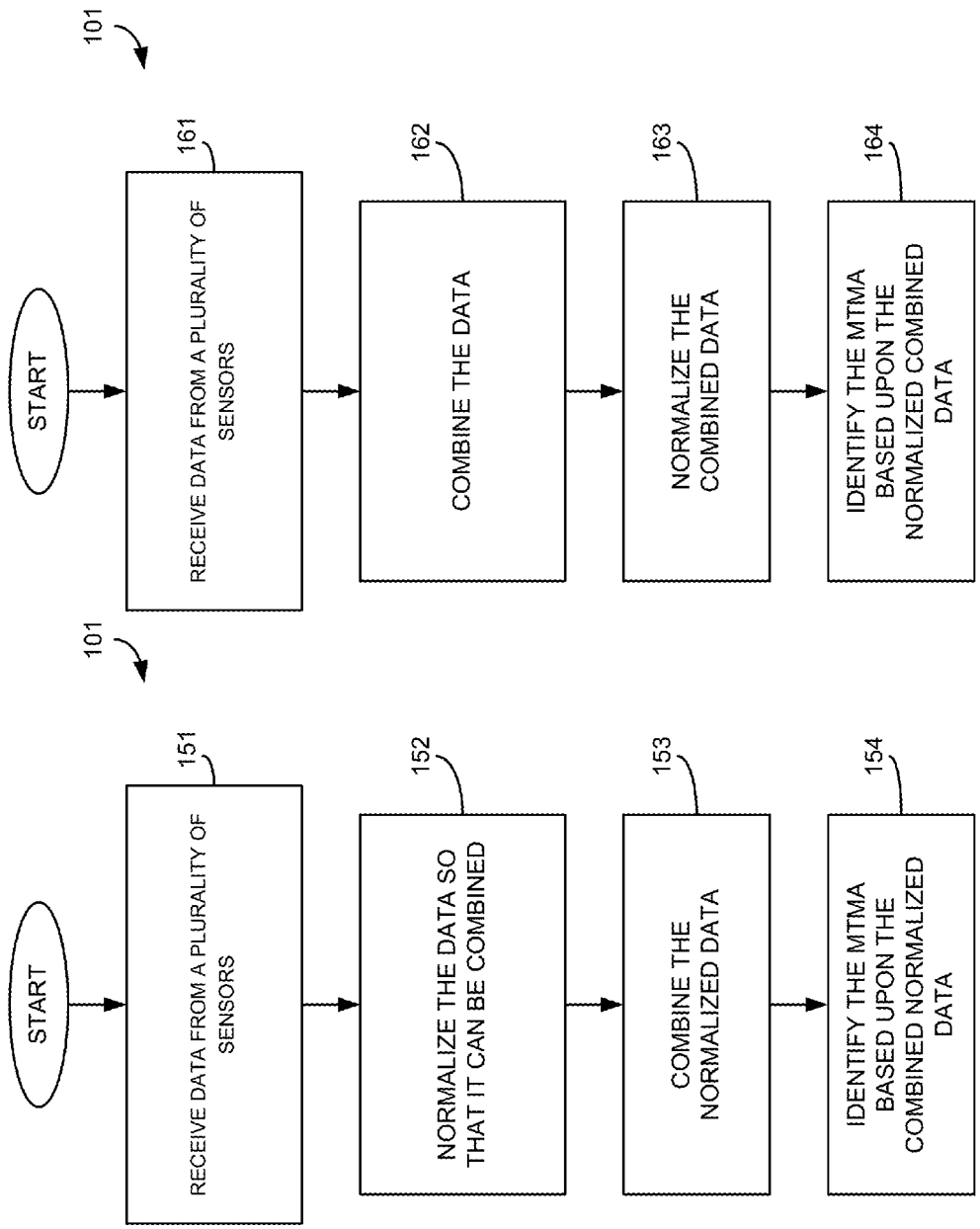

Determining A Users Activity From Accelerometer Data

Rotation of the Axes

1. Gravity has net magnitude of 1 and the direction is always downwards

2. Gravity is always present, so if net acceleration magnitude is not 1, the the other forces are present in the system (motion of the body).

3. If net acceleration magnitude is detected to be 1, then only gravity is felt at that point and therefore, the direction of the vector is the downwards direction 4. Find these effectively stationary point with magnitude within δ=0.02 of one. That is, sufficiently close to one. Use this direction as the positive z-axis.

5. Experimentally, these points are found 3-6 times per second. Thus, even if a point is falsely classified as stationary, the program would quickly self correct 6. Determine the rotation matrix which would rotate the position of this reference point, (x, y, z) to be on the positive z-axis, point (0,0,1)

7. 1) Rotate about the x-axis so that the y-coordinate is zero
   2) Rotate about the y-axis so that the x-coordinate is zero 8. The two steps can be done in reverse to obtain a different rotation matrix, which would still orient the vector along positive z-axis 9. For the consequent points which are not within δ of one, the same rotation matrix is used, since the device cannot significantly change orientation that frequently 10. There is more than one unique matrix which ensures that the gravity is oriented along the vertical axis (positive or negative direction).

11. The x and y coordinates of non stationary would be different depending on how the rotation is done.

12. The magnitude of the net horizontal acceleration will be the same regardless of which matrix is used.

13. The vector may also be rotated about the z-axis in the xy-plane. In the future, this may rely on data from gyroscope, compass, etc.

14. When the next point within δ of one is reached, a new rotation matrix is generated.

15. The old rotation matrix is updated

FIG. 5

Determining A Users Activity From Accelerometer Data

Basic Parameters

1. Average, mean or median of the data set. A measure of where the data is centred.

2. Standard deviation or variance. A measure of how wide is the data distribution.

3. The above can be calculated from the whole interval or partial intervals. Such as average of the first half of data points or average of only one (or more) components.

4. Can also calculate average/variance of sets of points selected from the data. Such as the average of peak values. Also, can average several data intervals over prolonged period of time.

5. Averaging and Variance alone can obtain a certain degree of accuracy, requiring very little computation time and in some cases are sufficient.

6. It is possible to apply these basic methods without rotating the data.

7. After a certain accuracy is obtained with average and variance alone, it is very difficult to improve it without resorting to more sophisticated methods.

Advanced Parameters

1. Higher order moments, calculated about mean, zero or other value.

2. Root mean square (also can be used as an alternative to standard deviation) or generalized mean.

3. Signal Magnitude area, that is the area encompassed by the magnitude of the signal.

Fourier Transform (FT)

1. Identifying the peaks, which give the amplitude and frequency of all the oscillations present in the signal.

2. Since the signal contains real values only, the FT will be symmetric, and only half can be used to save on computation costs.

3. The human motion, such as walking or running tends to have lower frequencies and motion with a transport (car, bike, etc) has higher frequencies. Thus, the above techniques (averaging, rms, etc) are applied in higher and lower frequency regions to compare their strength.

FIG. 6

Determining A Users Activity From Accelerometer Data

Walking

1. If 3rd order moment of horizontal acceleration about zero is above 0.056, reduce walking likelihood by one.

2. If the average of FT is significantly higher than the average higher frequency, then increase the likelihood of walking.

3. If RMS of the net acceleration vector is above 1.16, then increase likelihood of walking accordingly.

4. If 4th order moment about zero is less than 1.09, reduce the likelihood of walking and if the moment is above 1.69, increase it.

5. If FT only shows motions with very low amplitude and there is very little motion, standard deviation less than 0.1 (a case resembling standing), then reduce likelihood of walking by two.

6. If RMS of the vertical acceleration is above 0.07, then reduce likelihood of walking accordingly.

7. If there are no peaks present in FT, reduce likelihood of walking.

8. If the highest peak is at a slightly higher frequency and has amplitude less than 0.3, reduce likelihood of walking.

9. If there is a prominent peak at low frequency, increase the likelihood of walking.

FIG. 10A

WALKING

Determining A Users Activity From Accelerometer Data

Running

1. About 80% of running is identified based on average and standard deviation alone.

2. Running is still a possible motion if the average is higher than 0.6.

3. The next main identifier of running is a high amplitude at a low frequency. If the vertical average is also less than 0.8, then the motion is identified as running and analysis terminated.

4. If the average of FT is less than twice the average higher frequency, then reduce the likelihood of running. If it is greater than 2.5 times the higher frequency, increase the likelihood slightly.

5. If standard deviation (both vertical and horizontal) are significantly high, increase the likelihood of running.

6. If the 4$^{th}$ order moment of the vertical acceleration about zero is above two, increase the likelihood by one.

7. If there is very little activity (low standard deviation, lack of peaks in the Fourier transform) then running is almost certainly not the motion.

8. If the RMS of the vertical acceleration about zero is above 0.69, increase the likelihood of running.

FIG. 11A

RUNNING

DRIVING

BIKING

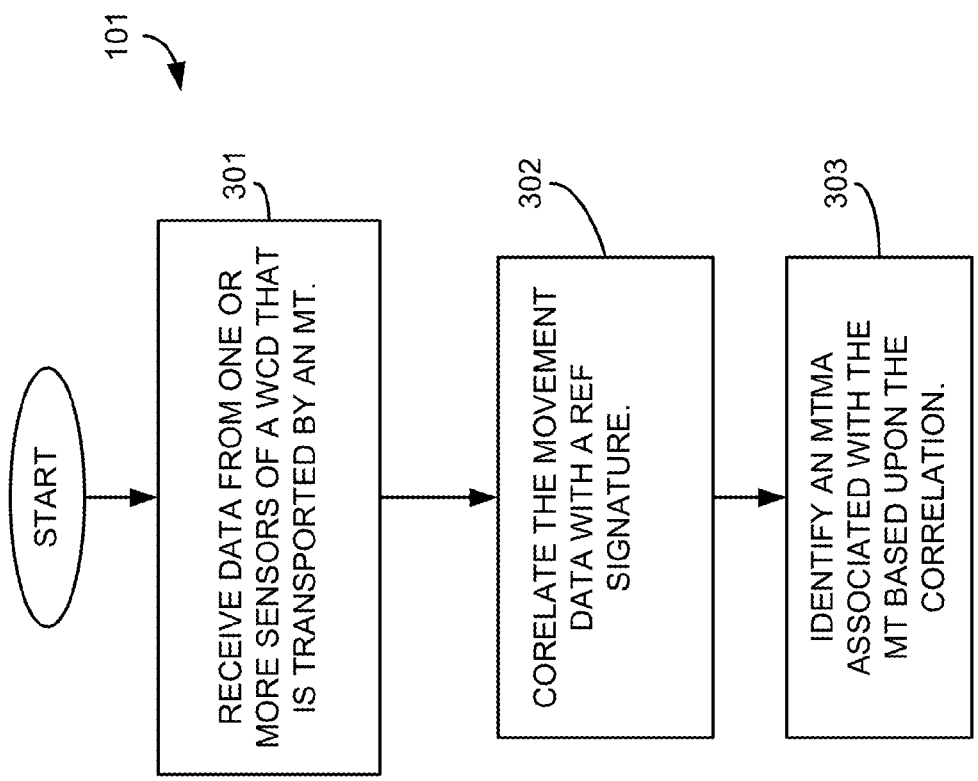

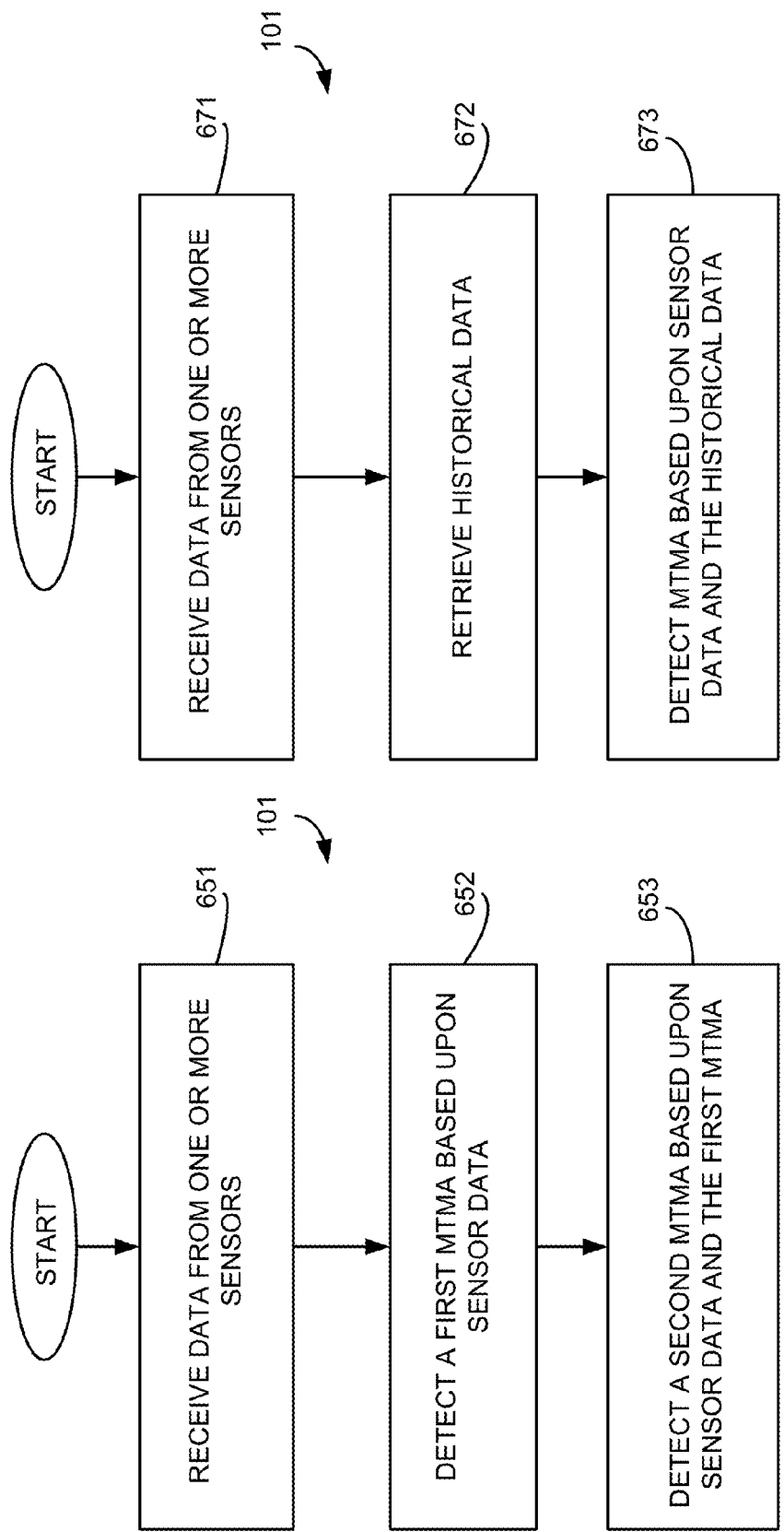

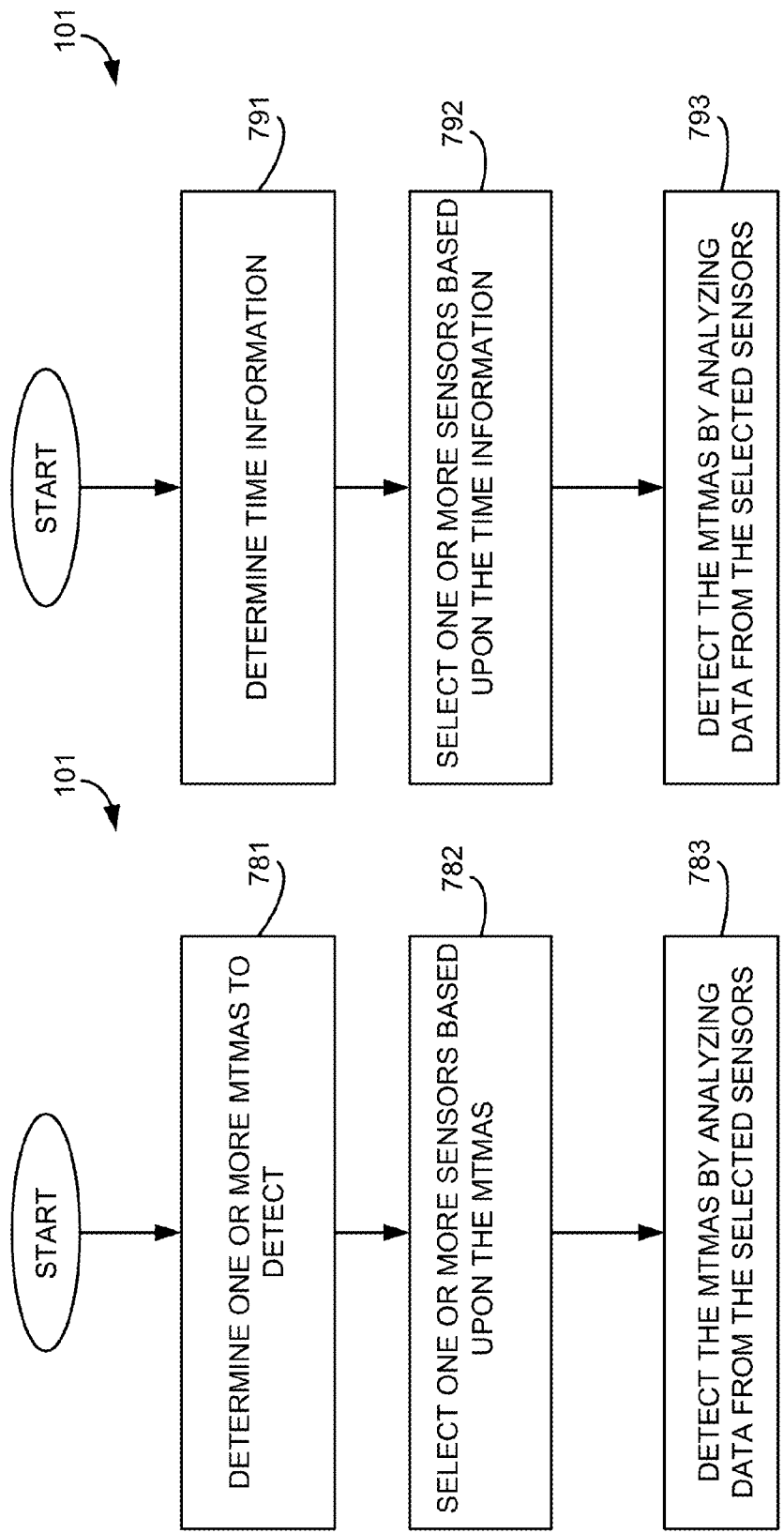

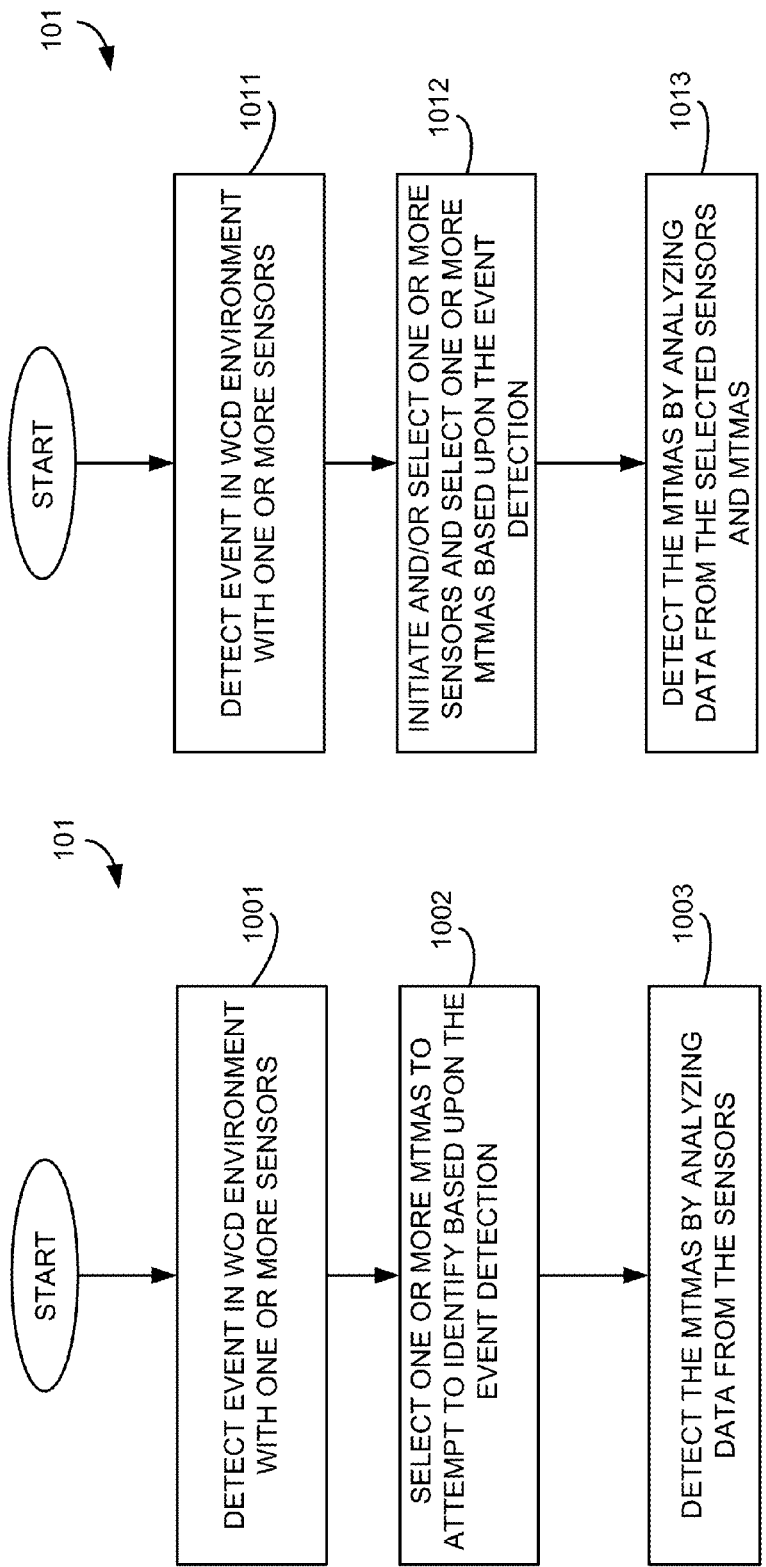

SYSTEMS AND METHODS FOR DETERMINING MOBILE THING MOTION ACTIVITY (MTMA) USING SENSOR DATA OF WIRELESS COMMUNICATION DEVICE (WCD) AND INITIATING ACTIVITY-BASED ACTIONS

CLAIM OF PRIORITY

This application claims priority and the benefit of the following applications:

U.S. Provisional Application No. 61/694,981, filed Aug. 30, 3012, entitled "SYSTEMS AND METHODS FOR DETERMINING MOBILE THING MOTION ACTIVITY (MTMA) USING ACCELEROMETER OF WIRELESS COMMUNICATION DEVICE,"

U.S. Provisional Application No. 61/695,001, filed Aug. 30, 3012, entitled "SYSTEMS AND METHODS FOR DETERMINING MOBILE THING MOTION ACTIVITY (MTMA) USING SENSOR DATA OF WIRELESS COMMUNICATION DEVICE (WCD) AND INITIATING ACTIVITY-BASED ACTIONS,"

U.S. Provisional Application No. 61/695,044, filed Aug. 30, 2012, entitled "NOTIFICATION SYSTEMS AND METHODS THAT EMPLOY ACTIVITY DETECTION," and U.S. Provisional Application No. 61/843,077, filed Jul. 5, 2013, entitled "NOTIFICATION SYSTEMS AND METHODS THAT EMPLOY ACTIVITY DETECTION."

All of the foregoing applications are incorporated by reference herein in their entireties.

RELATED APPLICATION

U.S. Utility application Ser. No. 13/658,353, filed Oct. 23, 2012, entitled "SYSTEMS AND METHODS FOR DETERMINING MOBILE THING MOTION ACTIVITY (MTMA) USING ACCELEROMETER OF WIRELESS COMMUNICATION DEVICE," now U.S. Pat. No. 8,452,273, which is incorporated herein by reference in its entirety.

FIELD OF THE INVENTION

The present invention relates to electronic messaging technologies, and more particularly, to systems, methods, and apparatus for accurately identifying a motion activity (MA) associated with a mobile thing (MT) using sensor data from a wireless communication device (WCD) transported by the MT so as to enable or initiate a further one or more activity based actions.

BACKGROUND

Electronic messaging and notification systems have been evolving over time, particularly in the last two decades. Much of this development has been due to the expansion of electronic networking, including the Internet, and the incorporation of more sophisticated capabilities in personal portable wireless communications devices (WCDs), for example, smartphones, tablets, mini tablets, etc.

SUMMARY OF THE INVENTION

After much thought, study, and analysis, the inventors have envisioned that the next generation of at least one species of messaging systems should be based at least in part upon a mobile thing motion activity (MTMA; e.g., walking, running, biking, driving, etc.) associated with an MT that is transporting (e.g., carrying, moving, etc.) the WCD. In many scenarios, the MT is capable of more than one MTMA. Detecting that an MT is currently involved in, has transitioned from, and has transitioned into an MTMA can lead to initiating more intelligent actions that are activity based. Various inventions associated with this next generation of electronic messaging systems are set forth hereafter.

Activity detection can be a problematic and difficult task. To date, at least a couple studies have been undertaken to determine how a person's activity can be determined with an accelerometer. However, neither study has determined a way to identify the activity with sufficient accuracy when several are possible, and furthermore, neither study suggests taking further intelligent actions based upon the detected activity (as the present inventors suggest herein).

For example, see Nham, Siangliulue, and Yeung, "Predicting Mode of Transport From iPhone Accelerometer Data," CS 229: Machine Learning Final Projects, Stanford University (2008), which is incorporated herein by reference. This paper describes a university project which concentrated on identifying 4 motions (walk, run, drive, and bike) with an accelerometer associated with a smartphone. The data results were collapsed into a single vector in 3D rather than separate components. These scientists did not rotate the data and use the net magnitude to simplify their analysis. The data was collected by always placing the smartphone in a hip pocket. While the orientation of the phone is randomized, the position on the body was always the same. The project also used training methods, to create a training matrix with magnitudes of Fourier coefficients, which were then used to classify the motion. The values used in the analysis were mean, variance, energy of the signal, and FFT components. More sophisticated parameters, such as higher order moments, were not used. The overall results were accurate for walking and running, but were less than 50% for biking and barely over 50% for driving. The research admits that they were unable to improve the accuracy. The experimental research was conducted based on only 4 users, the system was trained, and the paper states that due to time constraints, they did not have time to explore the accuracy further.

As another example of an attempt to detect motion activity, see Figo, Diniz, Diogo, Ferreira, and Joo, Cardoso, "Preprocessing Techniques for Context Recognition from Accelerometer Data," Personal and Ubiquitous Computing 14(7): 645-662 (2010), which is incorporated herein in its entirety. This paper looks at various methods of analyzing accelerometer data. It lists a number of methods used in signal processing and briefly describes their applications. It does not provide detailed practical applications of any methods. The paper discusses that using averages and differences between averages can be effective and that other methods have "disappointing performance." The research focused on distinguishing two activities: walking and running, and then three activities: walking, running and jumping. Also, the accelerometer was always positioned in the right hand pocket. The data was collected via Nintendo Wii Remote. The analysis only uses net force ($\sqrt{x^2+y^2+z^2}$) and did not use vertical/horizontal directions nor rotation. Overall, the research admits that the results are "not outstanding" and many of the methods with high complexity and computational cost were expected to perform better.

As compared to the analyses set forth in the Nham and Figo papers, the inventors of the present disclosure have discovered much more efficient and accurate ways to determine the motion activity of an MT, as will be described in sections to follow.

Furthermore, the inventors further envision that location data (e.g., global positioning system (GPS)) data and other sensor data associated with the WCD may be used to determine or assist with determining the MTMA. However, in many instances, it may be necessary or desirable to determine the MTMA with only the accelerometer data. As an example, the MTMA may need to be identified in a context where the WCD cannot receive a GPS signal. As another example, it may be desirable to determine the MTMA without turning on the GPS receiver in order to preserve power.

The present disclosure provides systems, methods, and apparatus for accurately identifying an MTMA associated with a MT using data from one or more sensors of a WCD transported by the MT so as to enable or initiate a further one or more intelligent activity based actions.

One embodiment, among others, is a method for implementation in a WCD. The method comprises the steps of producing accelerometer data with an accelerometer based upon movement of the device; attempting to identify an MTMA of a user based upon the accelerometer data; requesting data from a different sensor when the MTMA cannot be determined with sufficient accuracy or probability; and determining the MTMA based upon the accelerometer data in addition to the different sensor data. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data indicative of movement of the WCD with a plurality of sensors; selecting one or more of the plurality of sensors for identifying an MTMA of a user; acquiring data from the selected one or more sensors; and determining the MTMA based upon the acquired data. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of providing a plurality of sensors designed to produce data indicative of movement of the WCD; selecting one or more of the sensors based upon time information (e.g., time of day, time of week, etc.); and identifying an MTMA associated with a user based upon the produced sensor data from the selected one or more sensors. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of providing a plurality of sensors, each of the sensors designed to produce data indicative of movement of the WCD; selecting one or more of the sensors based upon one or more predefined user preferences; and identifying an MTMA associated with a user based upon the produced sensor data from the selected one or more sensors. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data indicative of movement of the WCD with one or more sensors; storing one or more user preferences, the user preferences defining an action to be taken when an MTMA associated with a user is detected; detecting the MTMA based upon the produced sensor data from the one or more sensors; and initiating the action based upon the detected MTMA and user preferences. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data indicative of movement of the device with one or more sensors; storing one or more user preferences, the user preferences defining one or more MTMAs to attempt to detect; and detecting one of the MTMAs based upon the produced sensor data from the one or more sensors. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of providing a plurality of sensors, each of the sensors designed to produce data based upon a sensed environmental condition; identifying an event in a local environment associated with the WCD by data produced by one or more of the sensors (first sensors); selecting one or more other sensors (second sensors) based upon the detected event, the other sensors designed to produce data indicative of movement of the WCD; and identifying an MTMA associated with a user based upon the produced sensor data from the one or more other sensors (second sensors). An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of providing one or more sensors designed to produce environment data based upon a sensed environmental condition and designed to produce movement data indicative of WCD movement; detecting transition to, transition from, or current involvement in an MTMA associated with an MT transporting the WCD, based upon the produced movement data from the one or more sensors; detecting an event in a local environment associated with the WCD based upon the produced environment data from the one or more of the sensors; initiating an action based upon MTMA detection and the event detection. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing movement data indicative of WCD movement with one or more sensors; detecting an MTMA associated with an MT transporting the WCD, based upon the produced movement data from the one or more sensors; detecting discontinuance or disruption of the MTMA; determining whether or not the MTMA recommences within a predefined time period; and initiating an action based upon MTMA discontinuance and lapse of the predefined time period. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing movement data indicative of WCD movement with one or more sensors; detecting an MTMA associated with an MT transporting the WCD, based upon the produced movement data from the one or more sensors; detecting discontinuance or disruption of the MTMA; requesting a user input; and initiating an action based upon lack of the user input and lapse of a predefined time period. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data with one or more sensors based upon movement of the WCD; identifying an MTMA of a user based upon the data; communicating the identified MTMA to the user and requesting confirmation from the user that the identified MTMA is correct; and initiating or refraining from initiating a communication session with a remote communication device to request an action based upon whether or not the confirmation is received from the user. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data indicative of movement of the WCD with one or more sensors; identifying a first MTMA associated with a user based upon the produced data; and identifying a second MTMA based upon the produced data after a predetermined time period has lapsed since the first MTMA. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data indicative of movement of the device with one or more sensors; identifying a first MTMA associated with a user based upon the produced data; detecting an event in a local environment of the WCD; and identifying a second MTMA based upon the produced data after detection of the event. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data indicative of movement of the WCD with one or more sensors; identifying a first MTMA associated with a user based upon the produced data; and identifying a second MTMA, subsequent to the first MTMA, based at least in part upon the produced data and the first MTMA. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data indicative of movement of the device with one or more sensors; receiving a message indicating that a remote party is involved in an MTMA; and determining whether or not a user of the WCD is involved in the remote party MTMA based upon the produced data. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data indicative of movement of the WCD with one or more sensors; receiving a message indicating that a remote party is involved in an MTMA; and identifying a local MTMA based upon the produced data and the remote MTMA. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data indicative of movement of the WCD with one or more sensors; detecting a plurality of MTMAs (for example, a specific succession from a first MTMA to a second MTMA) based upon the produced data and the remote MTMA; and initiating a communication session with a remote communication device to request an action based upon the identification of the plurality of MTMAs. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data indicative of movement of the WCD with one or more sensors; storing historical data; selecting one or more of the sensors based upon the historical data; and identifying an MTMA associated with a user based upon the produced sensor data from the one or more sensors. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data indicative of movement of the WCD with one or more sensors; storing historical data; and identifying an MTMA associated with a user based upon the produced sensor data from the one or more sensors and the historical data. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data indicative of movement of the WCD with one or more sensors; identifying a plurality of sessions of an MTMA (same or different) associated with a user based upon the produced sensor data from the one or more sensors; initiating a communication session with a remote communication device to request an action based upon the identification of the plurality of MTMA sessions. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data indicative of movement of the WCD with one or more sensors; determining a length of a session of an MTMA associated with a user based upon the produced sensor data from the one or more sensors; initiating a communication session with a remote communication device to request an action based upon the length of the MTMA session. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing first and second data indicative of movement of the WCD with one or more sensors; determining reference data for defining a reference framework of at least two dimensions in space from the first data; normalizing the second data with the reference data; and identifying the MTMA based upon the normalized second data. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing first reference data and first movement data indicative of movement of the WCD with a first sensor; determining a reference framework of at least two dimensions in space from the reference data; normalizing the first movement data with the first reference data; producing second reference data and second movement data indicative of movement of the WCD with a second sensor; normalizing the second movement data with the second reference data; combining the normalized first movement data and the normalized second movement data; identifying the MTMA based upon the normalized first movement data and the normalized second movement data. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing reference data and first movement data indicative of movement of the WCD with a first sensor; determining a reference framework of at least two dimensions in space from the reference data; normalizing the first movement data with the reference data; producing second movement data indicative of movement of the WCD with a second sensor; normalizing the second movement data with the reference data; combining the normalized first movement data and the normalized second movement data; and identifying the MTMA based upon the normalized first movement data and the normalized second movement data. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data indicative of movement of the WCD with a sensor, the data produced at a sampling rate; and increasing the sampling rate to one or more other sampling rates when the MTMA cannot be identified beyond a predefined probability until the MTMA can be identified beyond the predefined probability. An embodiment of a related system or WCD has a computer-based architecture with computer software that is stored in one or more memories and executed by one or more processors for performing the foregoing steps.

Yet another embodiment of a related system or WCD can be implemented in software and/or hardware and has a means for performing each of the aforementioned steps.

Another embodiment, among others, is a method for implementation in a WCD. The method comprises the steps of identifying a first MTMA based upon the data from one or more sensors; determining that the MTMA is in error based upon one or more previous MTMAs; and re-identifying the MTMA as a second MTMA that is different than the first MTMA based upon the determined error. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data indicative of movement of the WCD with one or more sensors; determining a contingent MTMA based upon an initial analysis of the sensor produced data; requesting commencement of at least one of a sequence of steps for implementation an action based upon the determined contingent MTMA; based upon a further analysis of the sensor produced data, concluding that the contingent MTMA is incorrect and cancelling the action by stopping the commencement of a further one or more steps of the sequence. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data indicative of movement of the WCD with one or more sensors; identifying a first contingent MTMA and a second contingent MTMA based upon an initial analysis of the sensor produced data; requesting commencement of at least one of a first sequence of first steps for implementation a first action based upon the determined first contingent MTMA; requesting commencement of at least one of a second sequence of second steps for implementation a second action based upon the determined second contingent MTMA; based upon a further analysis of the sensor produced data (for example, based upon probabilities), determining that the first contingent MTMA was incorrect, cancelling the first action by stopping the commencement of a further one or more first steps of the first sequence, and permitting the second action to be implemented. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of producing data indicative of movement of the WCD with one or more sensors, the data representing amplitude information in the time domain; transforming the data to frequency domain data, the frequency domain data representing amplitude information in the frequency domain; In the frequency domain data, identifying an ambiguous MTMA and a first certain MTMA; filtering the first certain MTMA from the time domain data, in whole or in part, to produce better time domain data for better analyzing the ambiguous MTMA; transforming the better time domain data to better frequency domain data; and identifying a second certain MTMA from the better frequency domain data. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of receiving data from one or more sensors of a WCD that is transported by an MT, the data indicative of movement of the WCD; correlating the movement data with a reference signature; and identifying an MTMA associated with the MT based upon the correlation. The correlation can be a mathematical correlation or another type of comparison of arrays of magnitudes or vectors. The movement data and the reference signature can be a single or multi-dimensional array of magnitudes or vectors. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of receiving a plurality of data streams from a respective plurality of sensors of a WCD that is transported by a MT, the data indicative of movement of the WCD; normalizing each data stream with respect to a reference; combining the normalized data streams; and identifying an MTMA associated with the MT based upon the combined normalized data streams. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of receiving a plurality of data streams from a respective plurality of sensors of a WCD that is transported by an MT, the data indicative of movement of the WCD; combining the data streams; normalizing the combined data stream with respect to a reference; identifying an MTMA associated with the MT based upon the normalized combined data streams. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD. The method comprises the steps of receiving data from each of a plurality of sensors of a WCD that is transported by a MT, the data indicative of movement of the WCD; and identifying an MTMA associated with the MT based upon the data. An embodiment of a related system or WCD has a computer-based architecture with computer software that is stored in one or more memories and executed by one or more processors for performing the foregoing steps.

Yet another embodiment of a related system or WCD can be implemented in software and/or hardware and has a means for performing each of the aforementioned steps.

Another embodiment, among others, is a method for implementation in a WCD. The method comprises the steps of receiving a request from a requestor to engage in a communication session with the WCD associated with an MT; detecting an MTMA pertaining to the MT associated with the WCD, based at least in part upon an analysis of sensor data from one or more sensors associated with the WCD; and determining whether to permit or prevent consummation of the communication session based at least in part upon the detected MTMA. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD that is designed to detect a plurality of MTMAs associated with an MT and that is designed to communicate to a user or user designee upon occurrence of an incoming communication session request via one or more of a plurality of possible notification methods. The method comprises the steps of receiving a request from a requestor to engage in a communication session with the WCD associated with the MT; detecting an MTMA pertaining to the MT associated with the WCD from the plurality, based at least in part upon an analysis of sensor data from one or more sensors associated with the WCD; and selecting one or more of the notification methods based at least in part upon the detected MTMA. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD that is designed to detect a plurality of MTMAs associated with an MT and that is designed to communicate to a user or user designee upon occurrence of an incoming communication session request via one or more of a plurality of possible notification methods. The method comprises the steps of detecting an MTMA pertaining to the MT associated with the WCD from the plurality, based at least in part upon an analysis of sensor data from one or more sensors associated with the WCD; and causing an appropriate advertisement to be communicated to the user of the WCD based at least in part upon the detected MTMA. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD that is designed to detect a plurality of MTMAs associated with an MT. The method comprises the steps of detecting an MTMA pertaining to the MT associated with the WCD from the plurality, based at least in part upon an analysis of sensor data from one or more sensors associated with the WCD; and activating and/or deactivating one or more programs and/or subsystems based at least in part upon the MTMA. An example would be to deactivate a power consuming program and/or subsystem (GPS receiver, WiFi transceiver, Bluetooth transceiver, cellular transceiver, etc.) to preserve battery power. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Another embodiment, among others, is a method for implementation in a WCD that is designed to detect a plurality of MTMAs associated with an MT. The method comprises the steps of detecting an MTMA pertaining to the MT associated with the WCD from the plurality, based at least in part upon an analysis of sensor data from one or more sensors associated with the WCD; and changing an operational characteristic of a computer program and/or subsystem based at least in part upon the MTMA. An embodiment of a related system or WCD has a computer-based architecture with computer software that is stored in one or more memories and executed by one or more processors for performing the foregoing steps. Yet another embodiment of a related system or WCD can be implemented in software and/or hardware and has a means for performing each of the aforementioned steps.

Other systems, methods, apparatus, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWING FIGURES

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2A is a block diagram illustrating an exemplary first set of embodiments of an MTMA identification/action system in accordance with the present disclosure, wherein a motion activity identification (MAI) system and an action determination (AD) system are implemented remotely from a wireless communication device (WCD) that is transported by the MT of FIG. 1.

FIG. 2B is a block diagram illustrating an exemplary second set of embodiments of an MTMA identification/action system in accordance with the present disclosure, wherein the MAI system is implemented in or locally to the WCD and the AD system is implemented remotely from the WCD that is transported by the MT of FIG. 1.

FIG. 2C is a block diagram illustrating an exemplary third set of embodiments of an MTMA identification/action system in accordance with the present disclosure, wherein the MAI system and the AD system are implemented in or locally to the WCD that is transported by the MT of FIG. 1.

FIG. 3A is an example of an output data structure from a three-axis accelerometer (x, y, z) that can be employed as one of the sensors of FIG. 2D.

FIG. 3B is an example of an output data structure from a three-axis gyroscope that can be employed as one of the sensors of FIG. 2D.

FIG. 3C is an example of an output data structure from a three-axis magnetometer that can be employed as one of the sensors of FIG. 2D.

FIG. 4D is a flowchart of an example of a fourth set of embodiments of the MAI system of FIG. 2D.

FIG. 4E is a flowchart of an example of a fifth set of embodiments of the MAI system of FIG. 2D.

FIG. 5 is an example of a methodology that can be used by the MAI system of FIG. 2D to establish a reference framework in two dimensions of space (essentially a cylindrical coordinate system, wherein the reference framework enables normalization of sampled data so that sampled data can be intelligently compared).

FIG. 6 is a description of statistical parameters in the time domain and the frequency domain that can be utilized by the MAI system of FIG. 2D to identify a most probable MTMA.

Figure 10B:
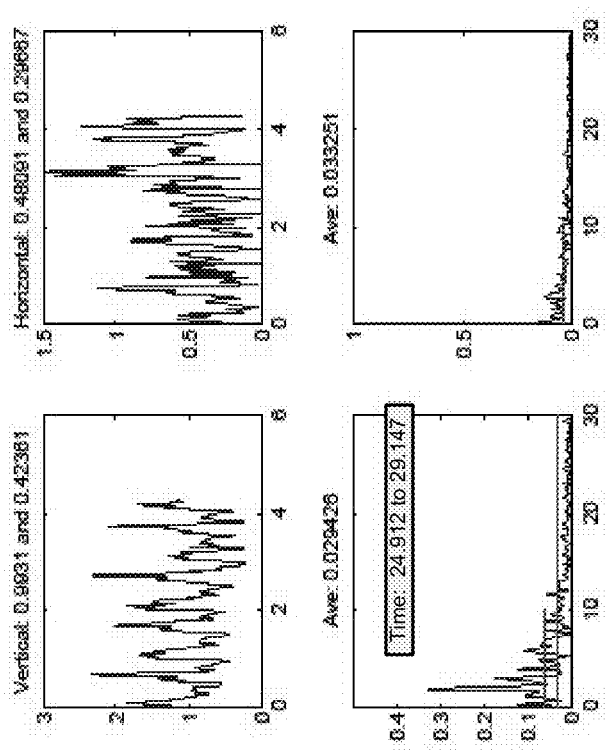
FIG. 10A is a description of parameters/methodology in the time domain and frequency domain that can be used by the MAI system of FIG. 2D to analyze walking in the exemplary methodology of FIG. 7.

FIG. 10B is an example of time domain and frequency domain graphs, in connection with walking, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

Figure 2D:
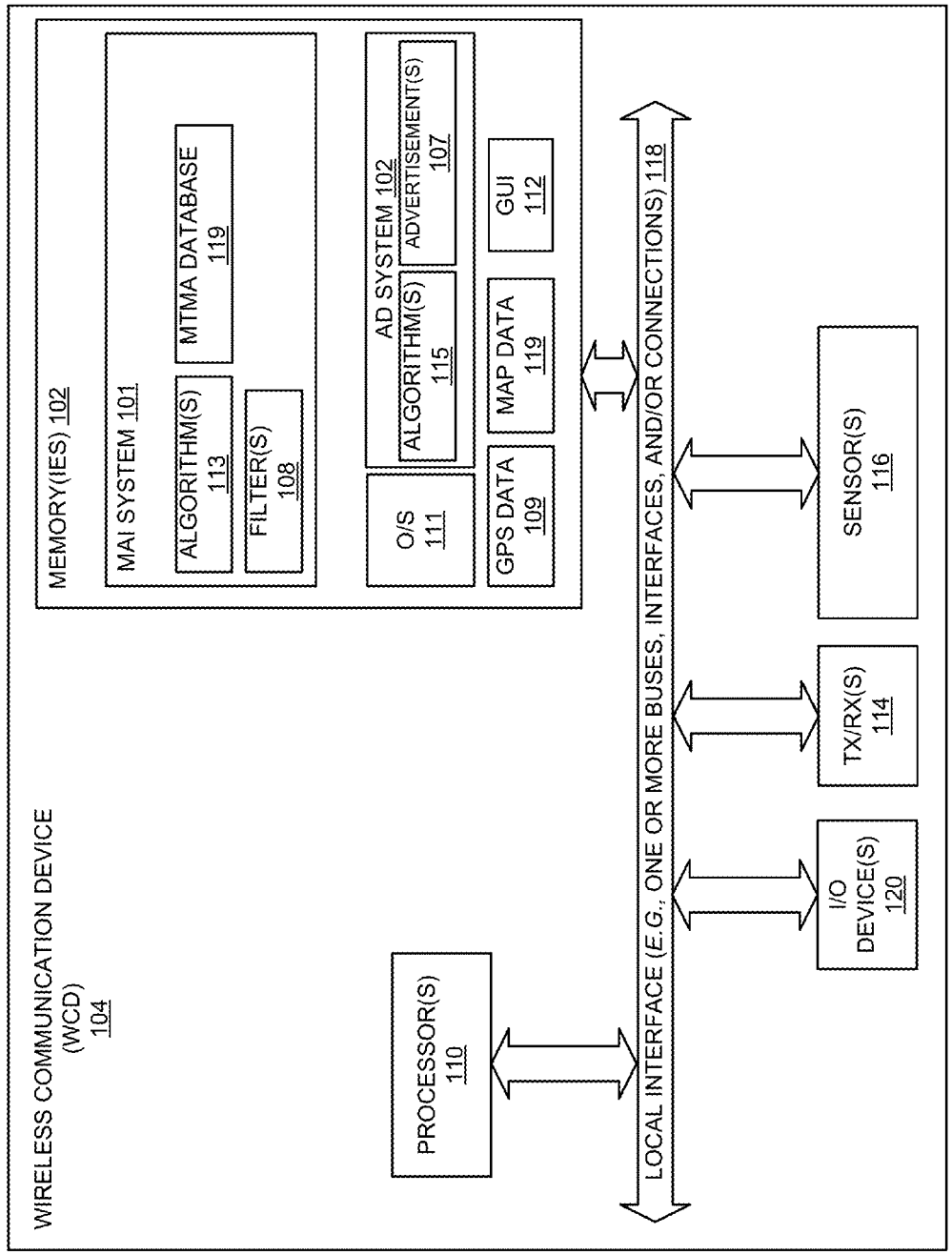
FIG. 2D is a block diagram illustrating an example of a computer system employing the architecture of FIG. 2C, wherein the MAI system and the AD system are implemented in software within the wireless communication device (WCD).

FIG. 11A is a description of parameters/methodology in the time domain and frequency domain that can be used by the MAI system of FIG. 2D to analyze running.

Figure 11B:
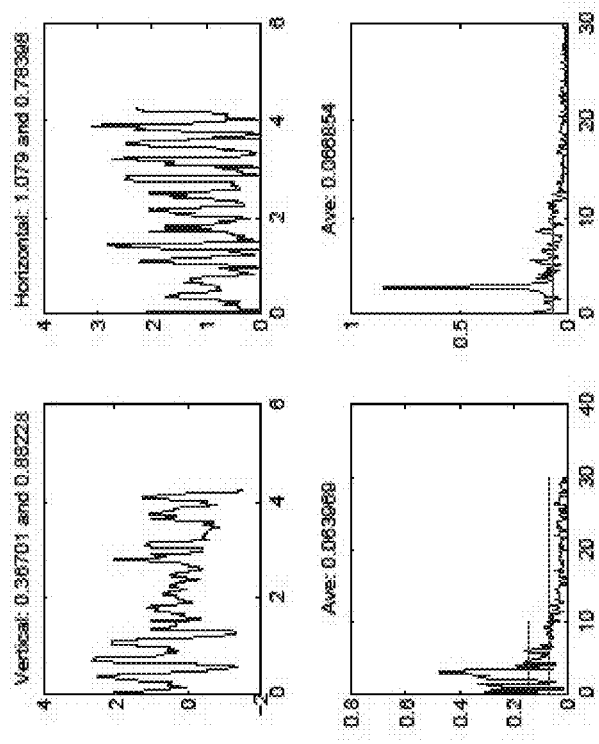

FIG. 11B is an example of time domain and frequency domain graphs, in connection with running, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

Figure 12A:
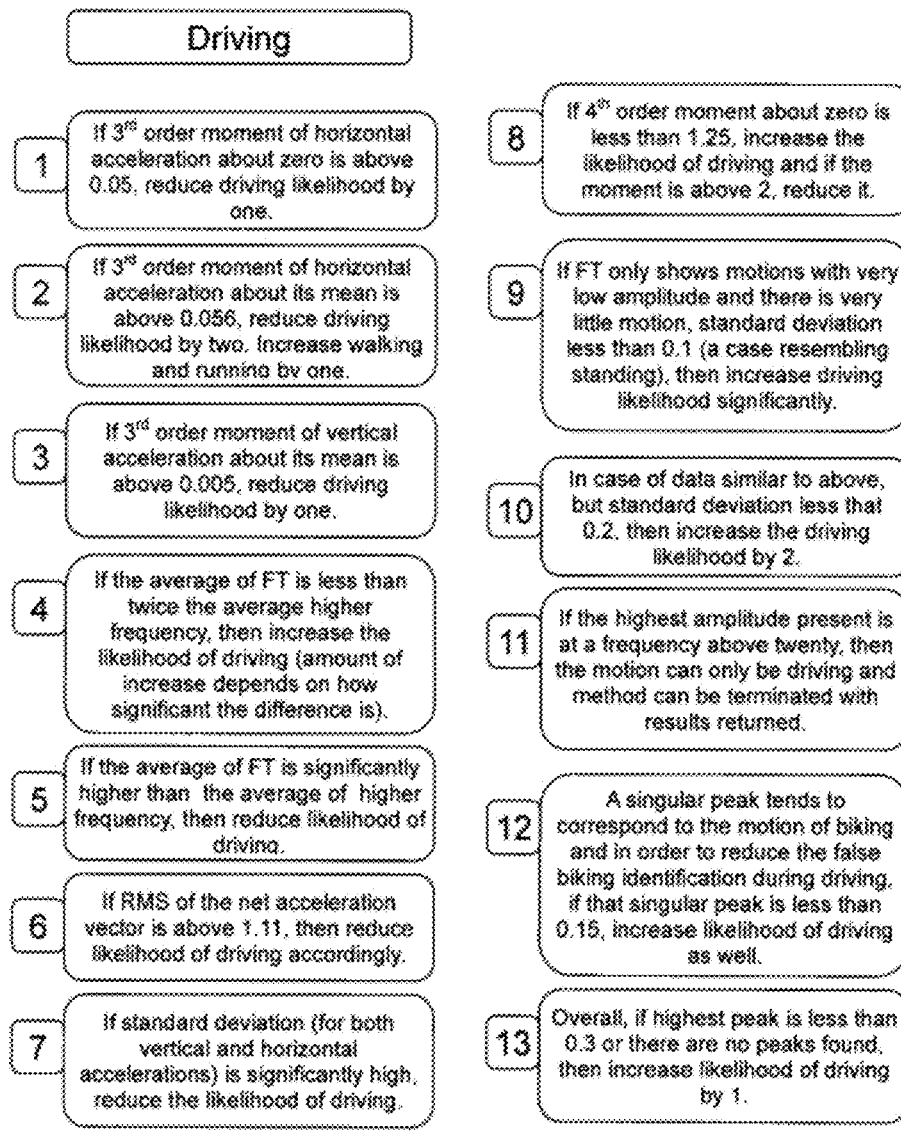

FIG. 12A is a description of parameters/methodology in the time domain and frequency domain that can be used by the MAI system of FIG. 2D to analyze driving.

Figure 12B:
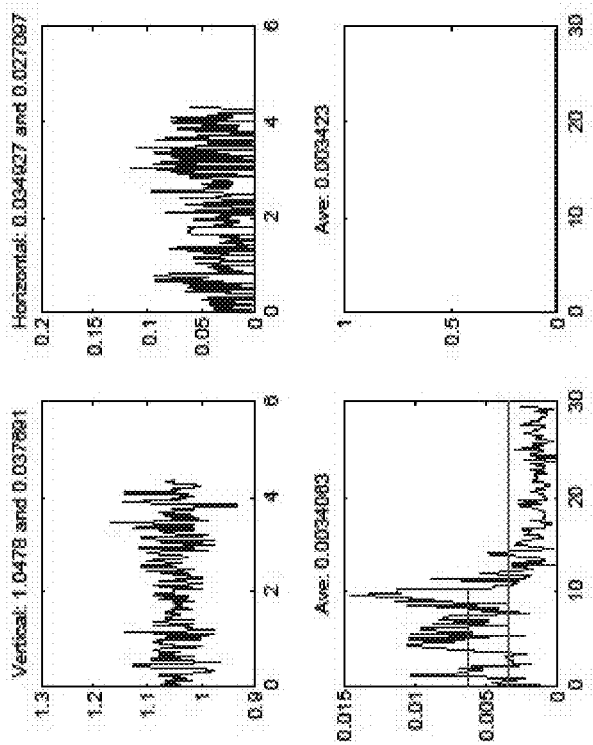

FIG. 12B is an example of time domain and frequency domain graphs, in connection with driving, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

Figure 13A:
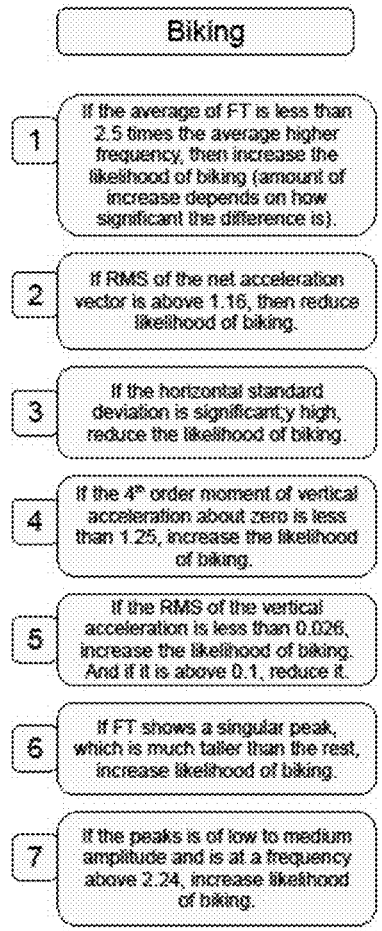

FIG. 13A is a description of parameters/methodology in the time domain and frequency domain that can be used by the MAI system of FIG. 2D to analyze biking.

Figure 13B:
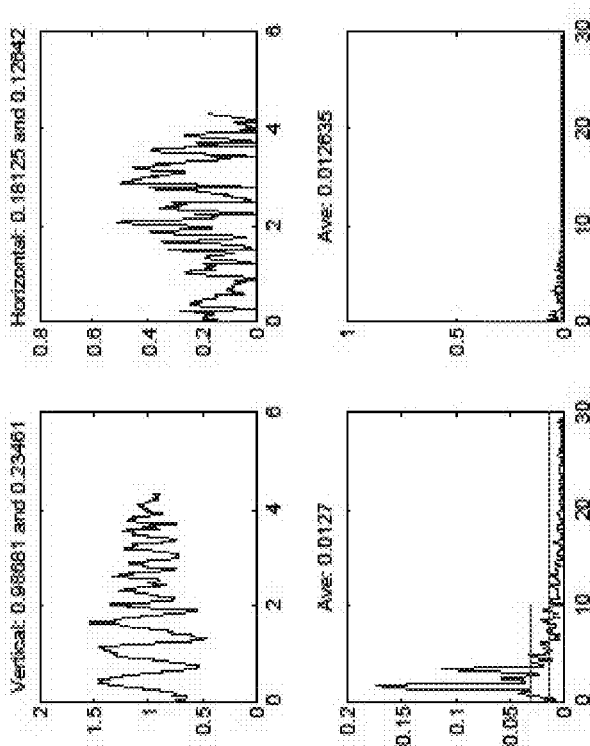

FIG. 13B is an example of time domain and frequency domain graphs, in connection with biking, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

FIG. 14A is a flowchart showing a set of possible embodiments of the MIA system of FIG. 2D that employ correlation to identify the MTMA.

Figure 14B:
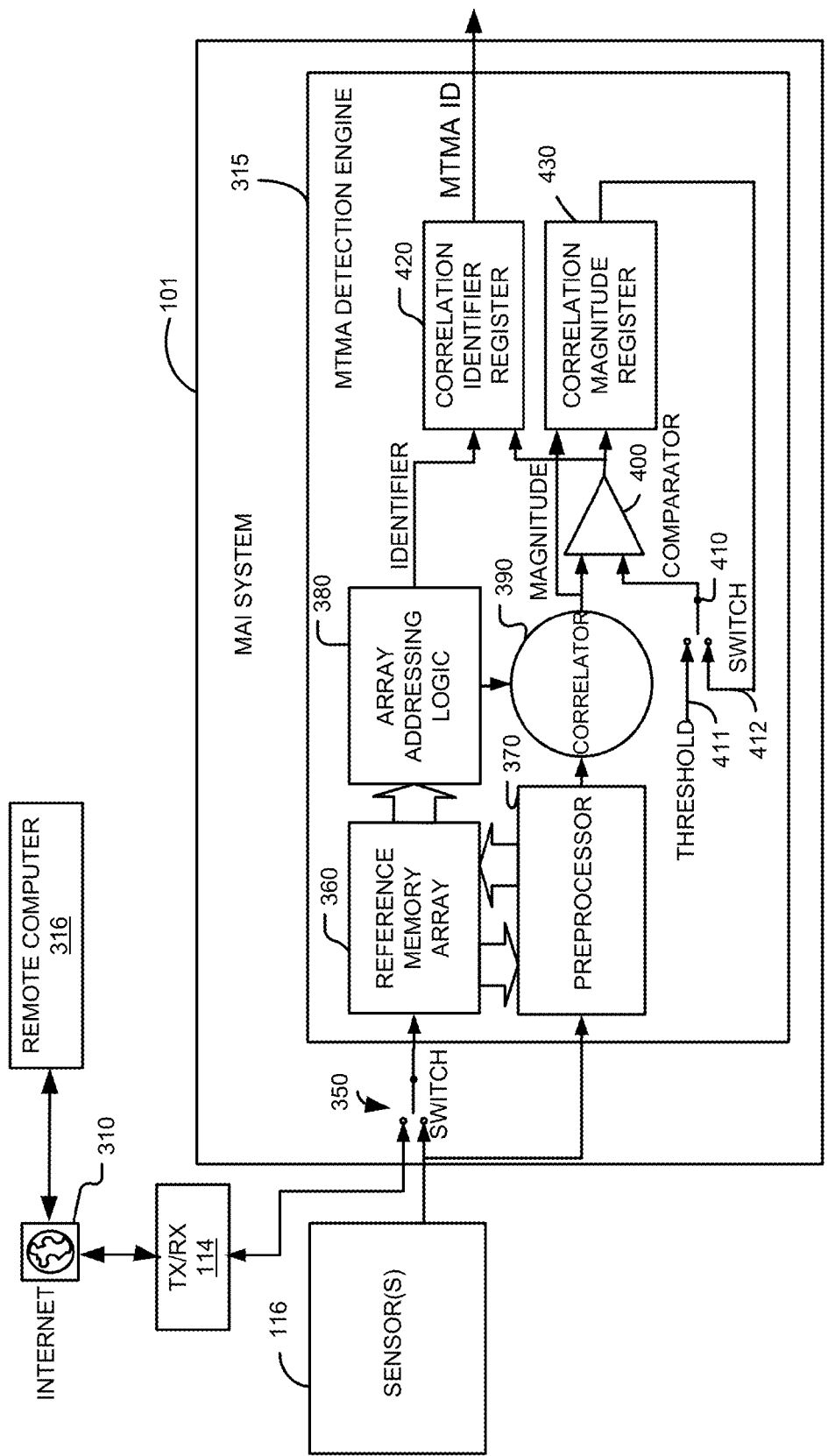

FIG. 14B is a block diagram of an example of a MTMA detection engine that can be employed in the MIA system of FIG. 14A for detecting the MTMA using correlation.

Figure 15A:
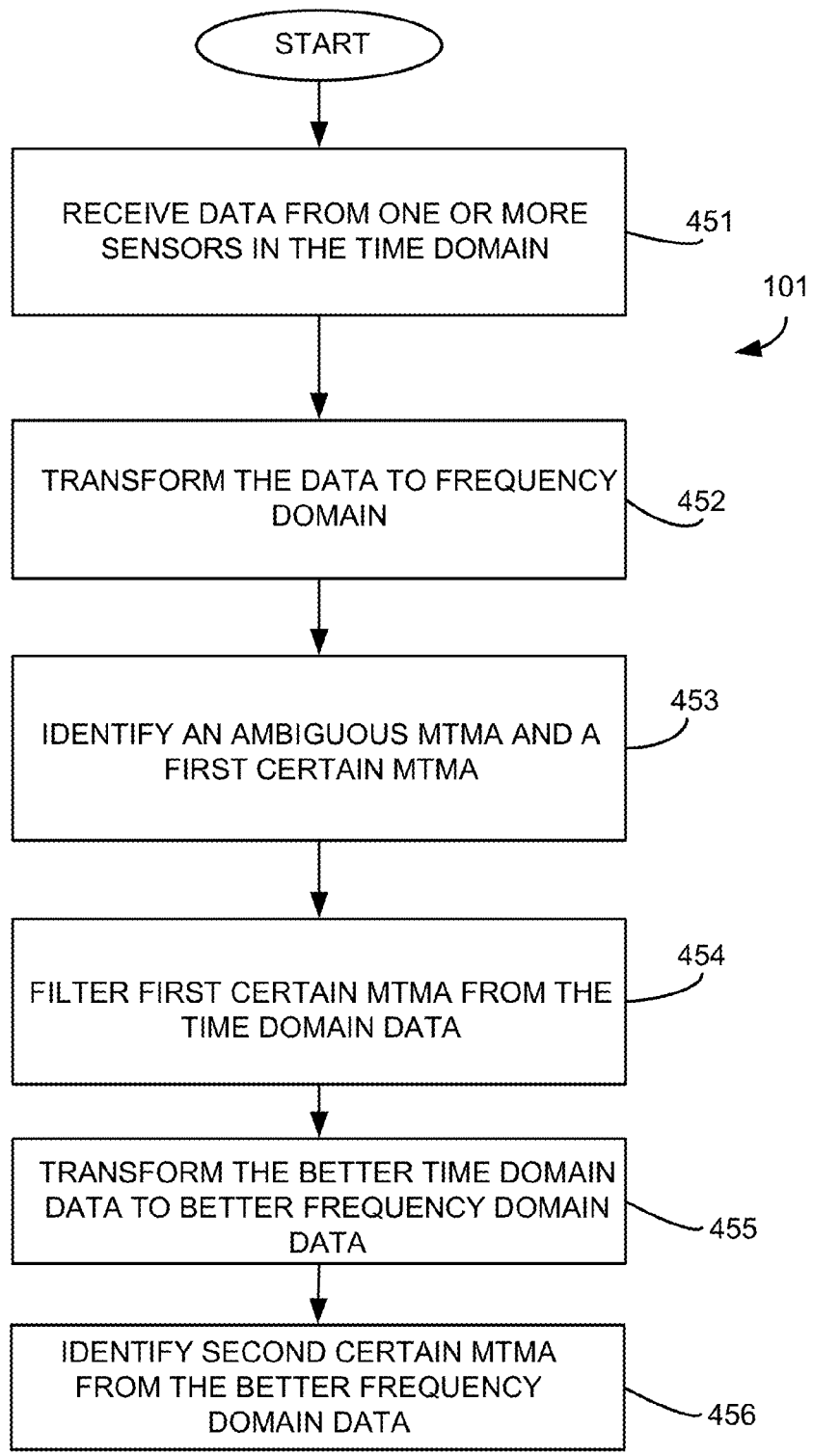

FIG. 15A is a flowchart of an example of a first set of embodiments of the MAI system of FIG. 2D that employs filtering via a filter(s) in order to more accurately identify an MTMA that is among a plurality of MTMAs.

Figure 15B:
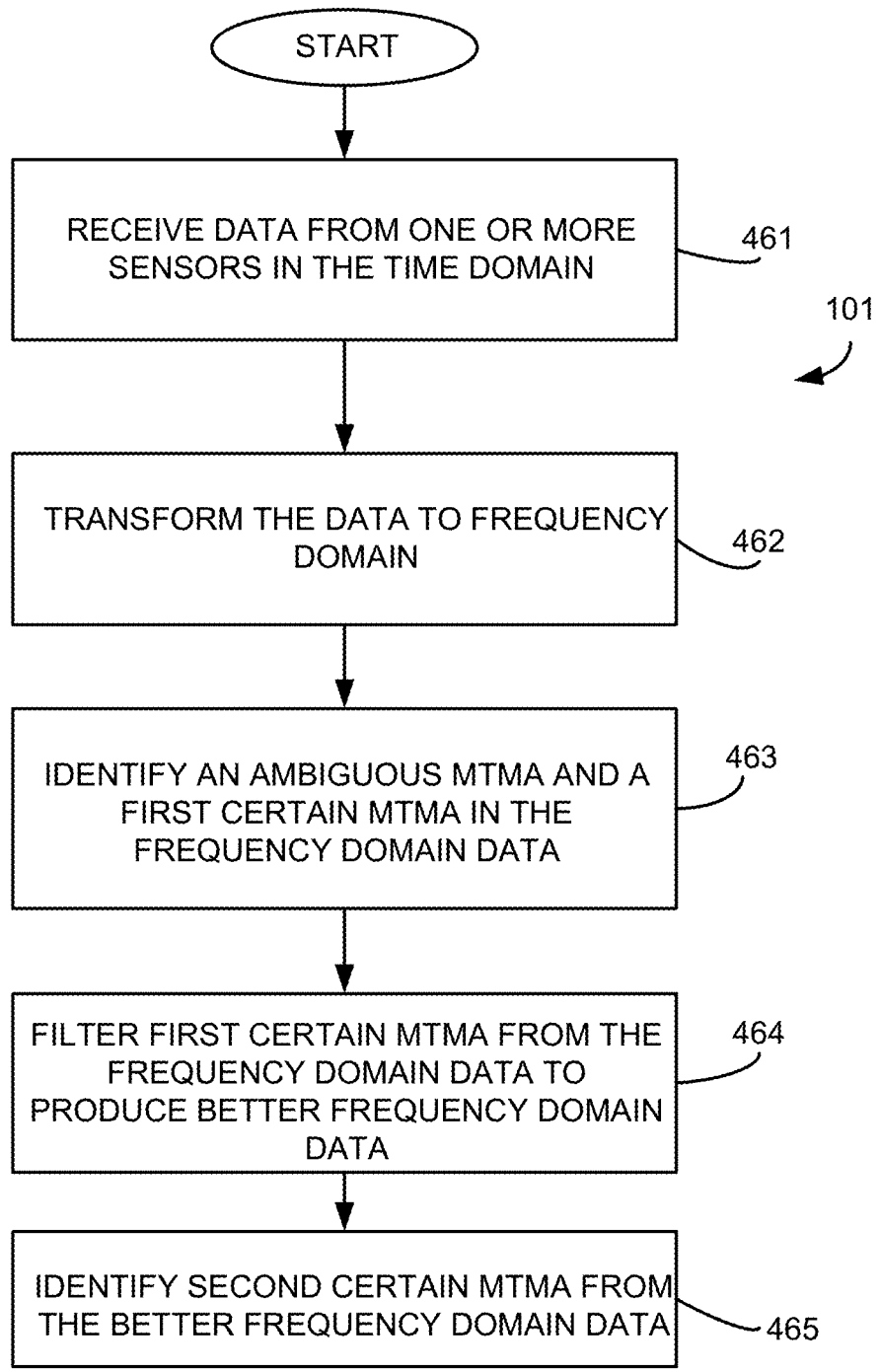

FIG. 15B is a flowchart of an example of a second set of embodiments of the MAI system of FIG. 2D that employs filtering via one or more filters in order to more accurately identify an MTMA that is among a plurality of MTMAs.

Figure 15C:
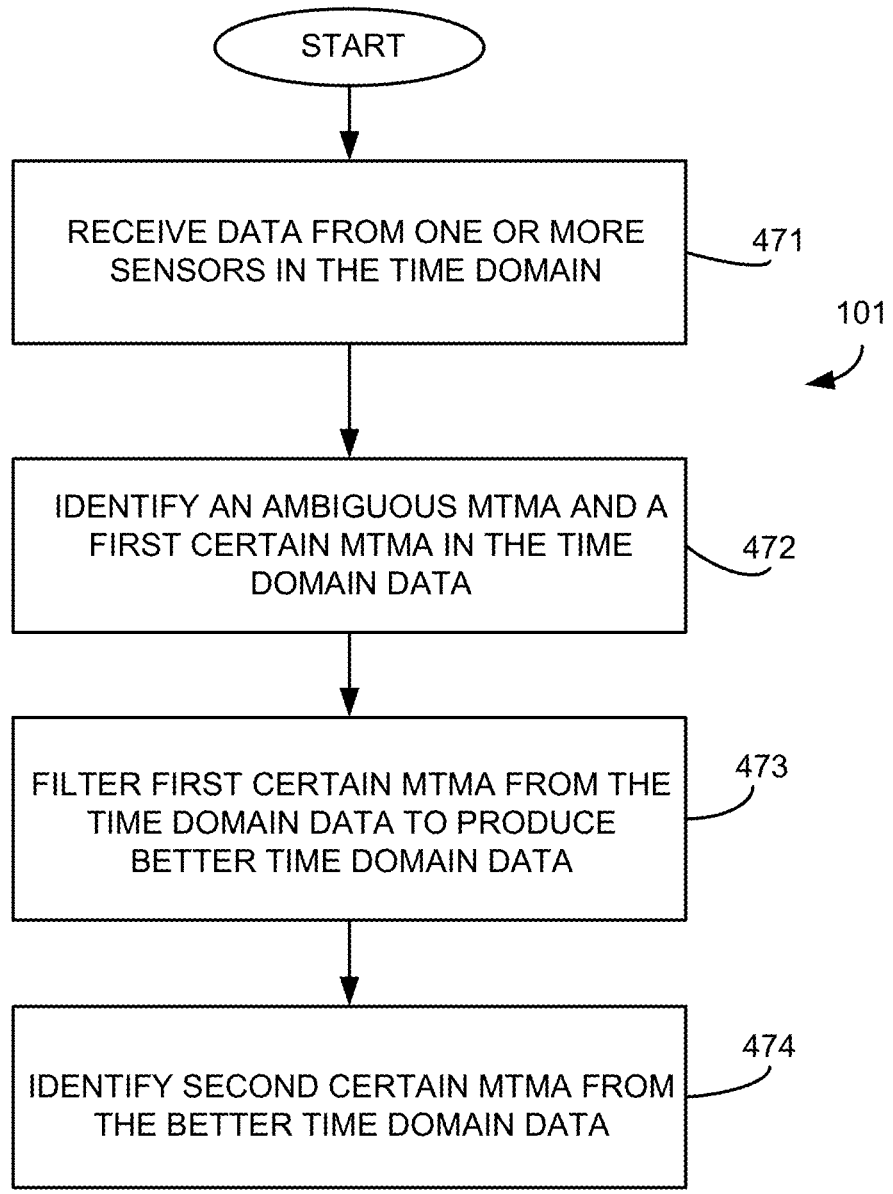

FIG. 15C is a flowchart of an example of a third set of embodiments of the MAI system of FIG. 2D that employs filtering via one or more filters in order to more accurately identify an MTMA that is among a plurality of MTMAs.

Figure 16:
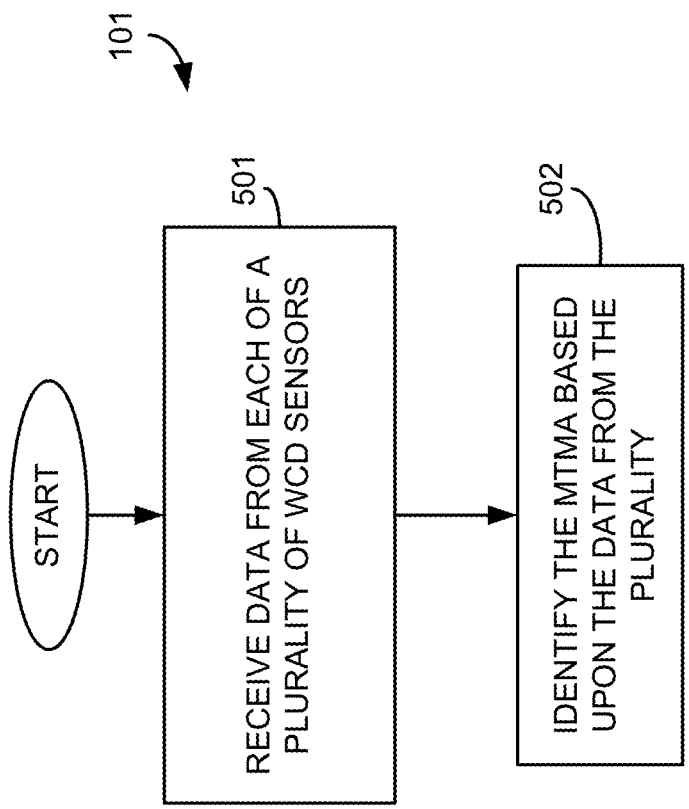

FIG. 16 is a flowchart of an example of a set of embodiments of the MAI system of FIG. 2D that uses data from a plurality of sensors in order to more accurately determine the MTMA.

Figure 17:
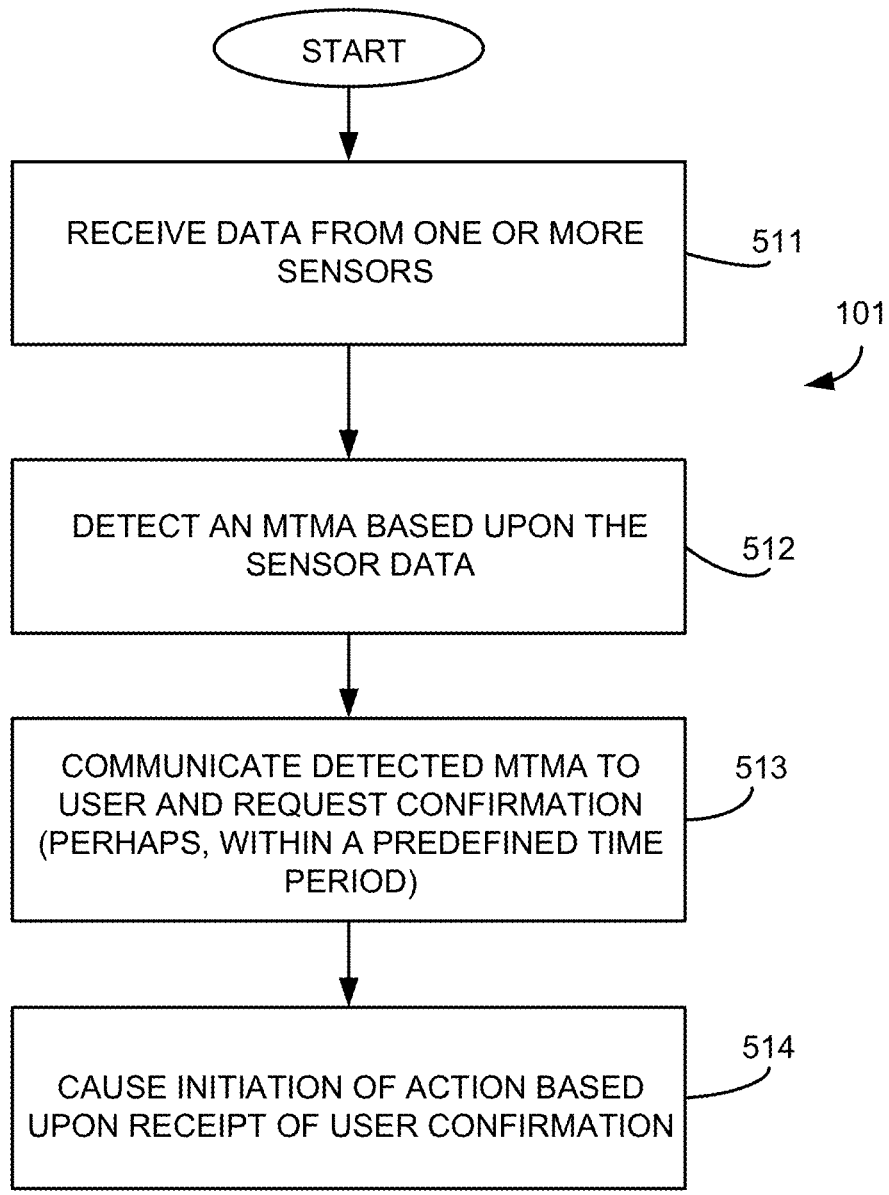

FIG. 17 is a flowchart of an example of a set of embodiments of the MAI system of FIG. 2D that employ a request for confirmation from the WCD user.

Figure 18A:
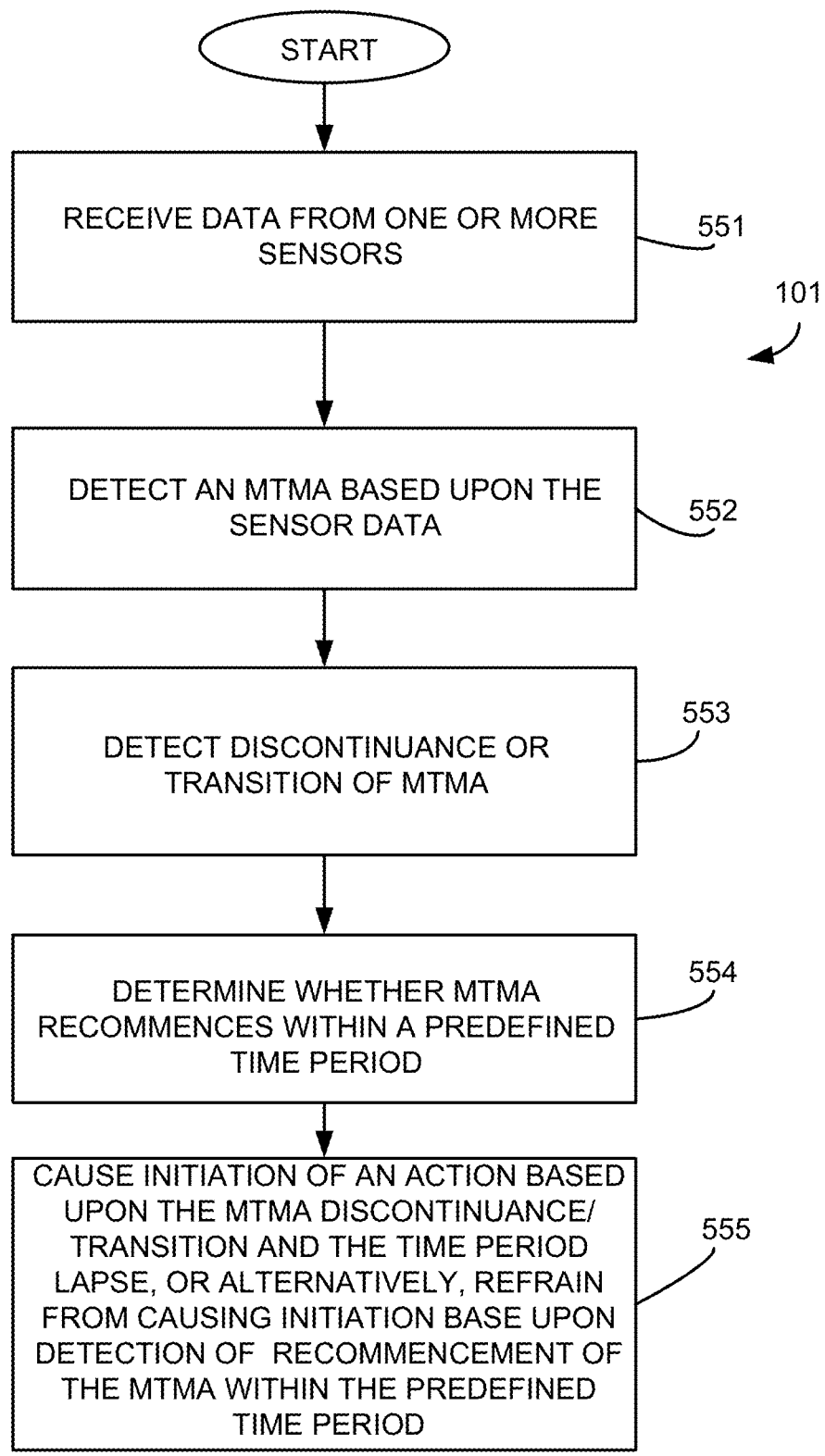

FIG. 18A is a flowchart of an example of a first set of embodiments of the MAI system of FIG. 2D that employs MTMA exceptions.

Figure 18B:
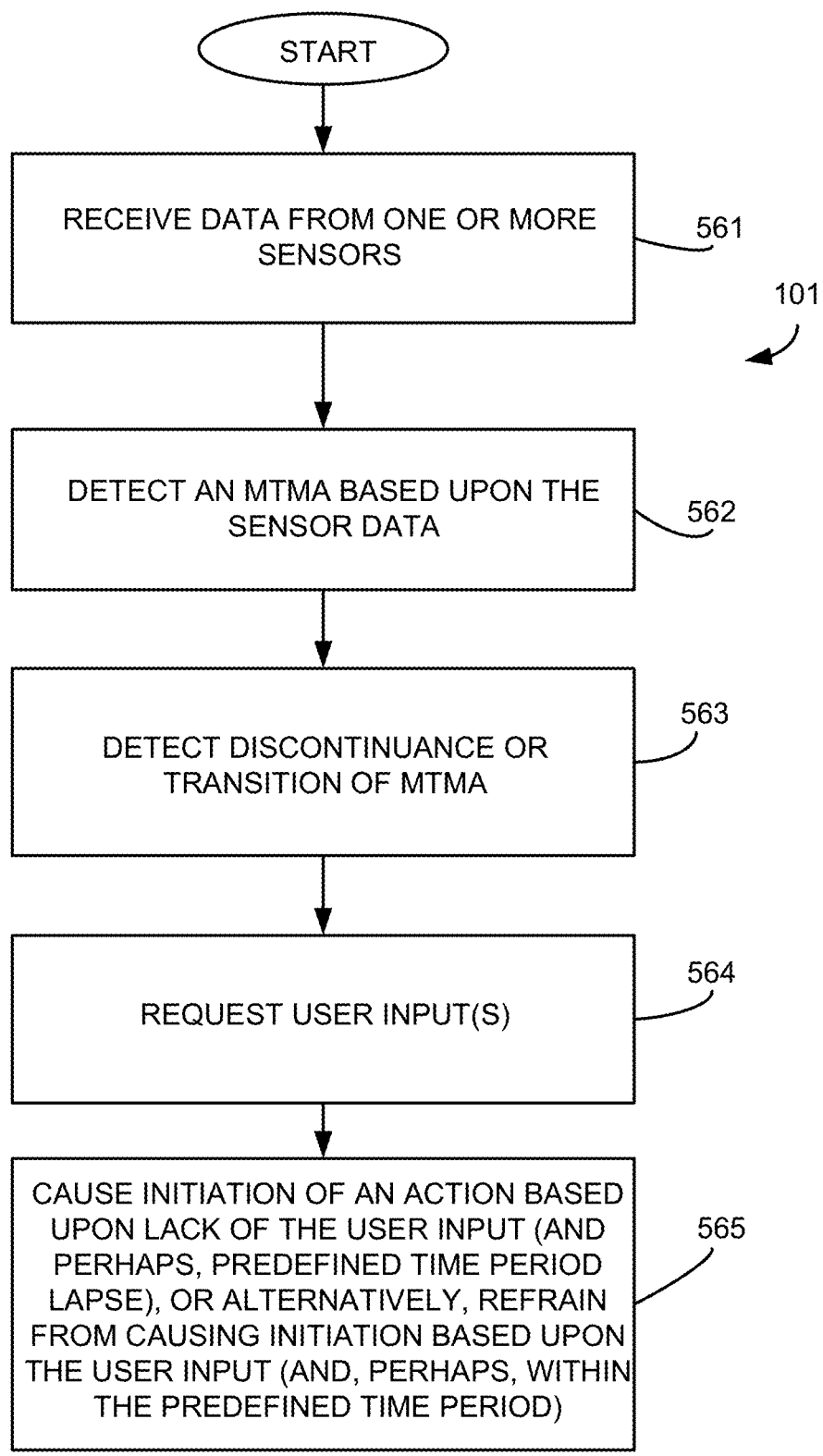

FIG. 18B is a flowchart of an example of a second set of embodiments of the MAI system of FIG. 2D that employs MTMA exceptions.

Figure 18C:
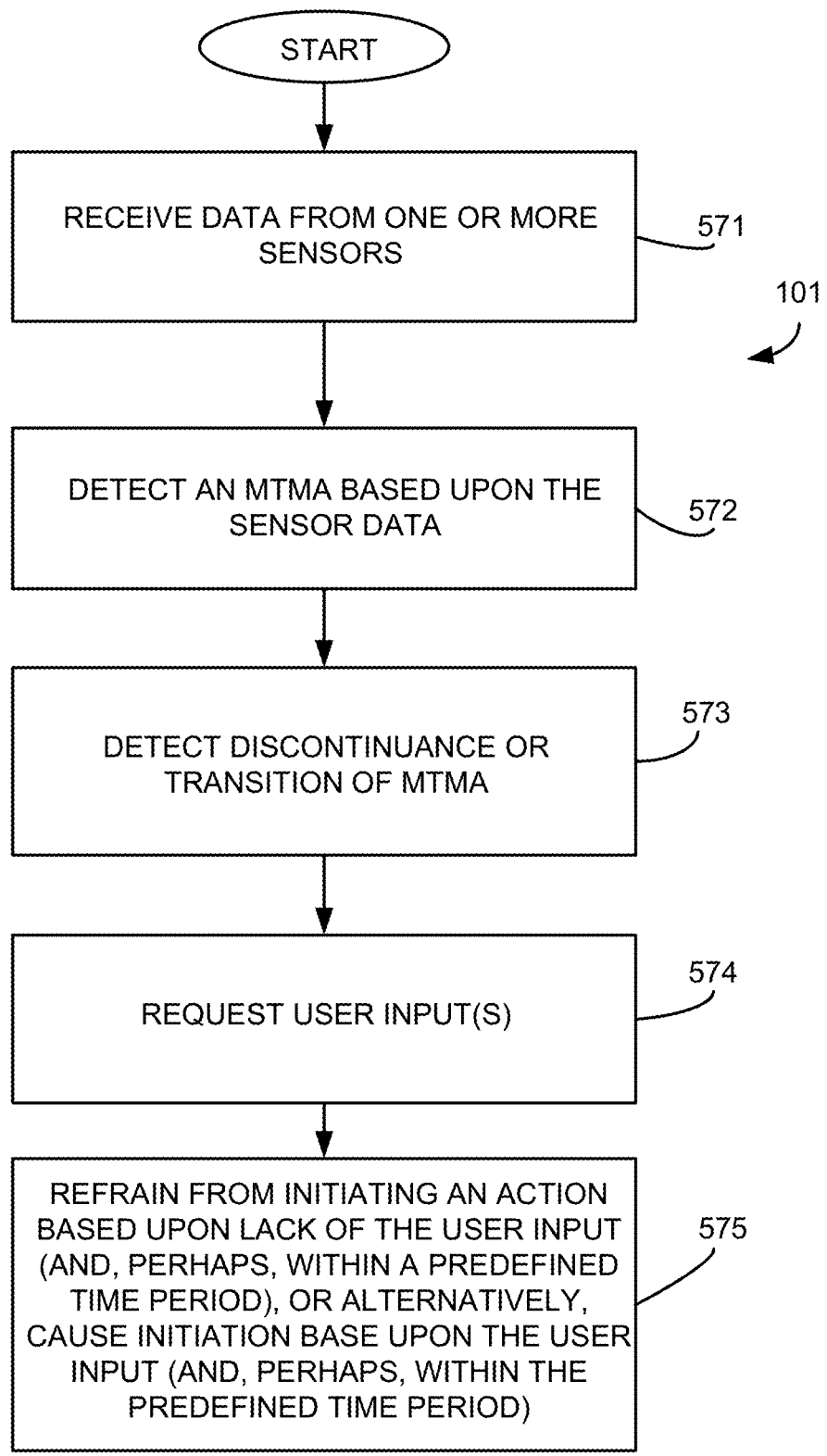

FIG. 18C is a flowchart of an example of a third set of embodiments of the MAI system of FIG. 2D that employs MTMA exceptions.

Figure 18D:
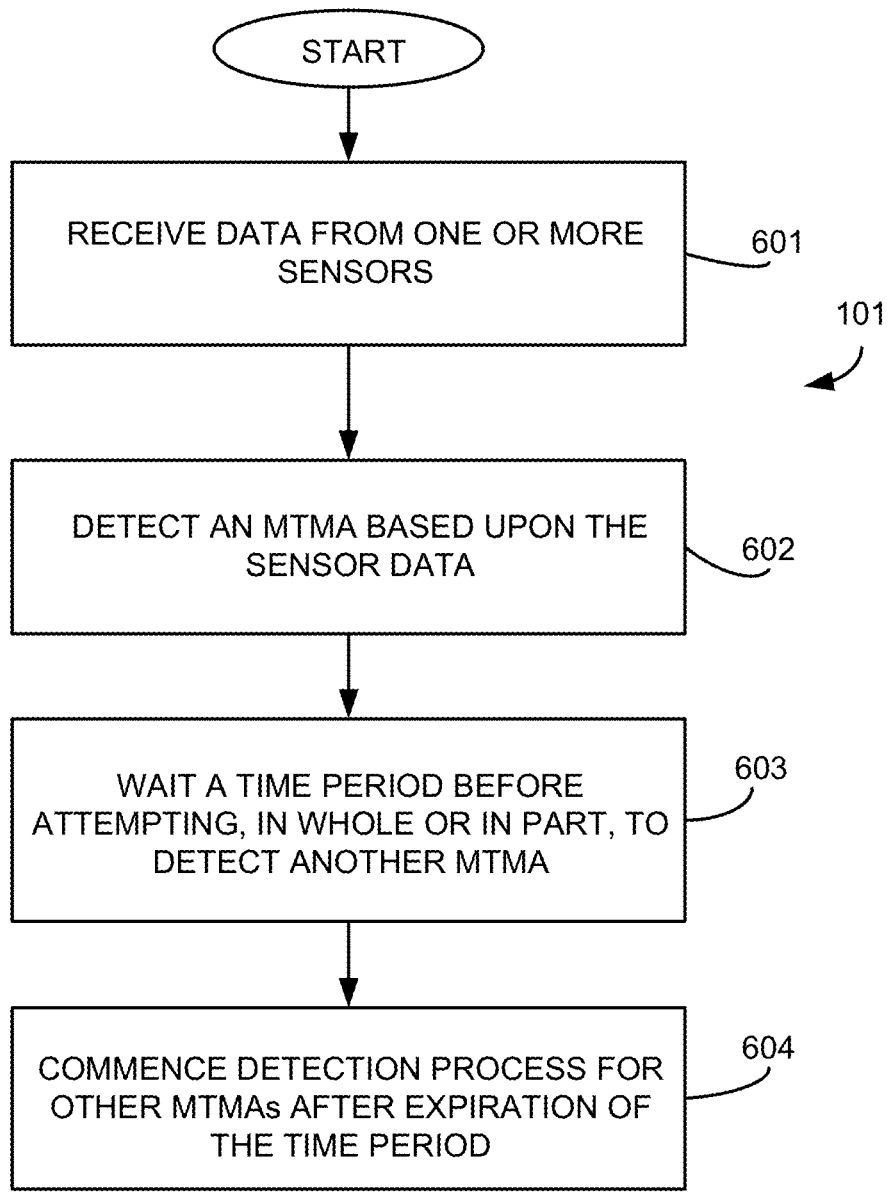

FIG. 18D is a flowchart of an example of a fourth set of embodiments of the MAI system of FIG. 2D that employs MTMA exceptions.

FIG. 19A is a flowchart of an example of a first set of embodiments of the MAI system of FIG. 2D that employs an algorithm(s) that takes into consideration historical data when attempting to identify a new MTMA.

FIG. 19B is a flowchart of an example of a second set of embodiments of the MAI system of FIG. 2D that employs an algorithm(s) that takes into consideration historical data when attempting to identify a new MTMA.

Figures 19C, 19D:
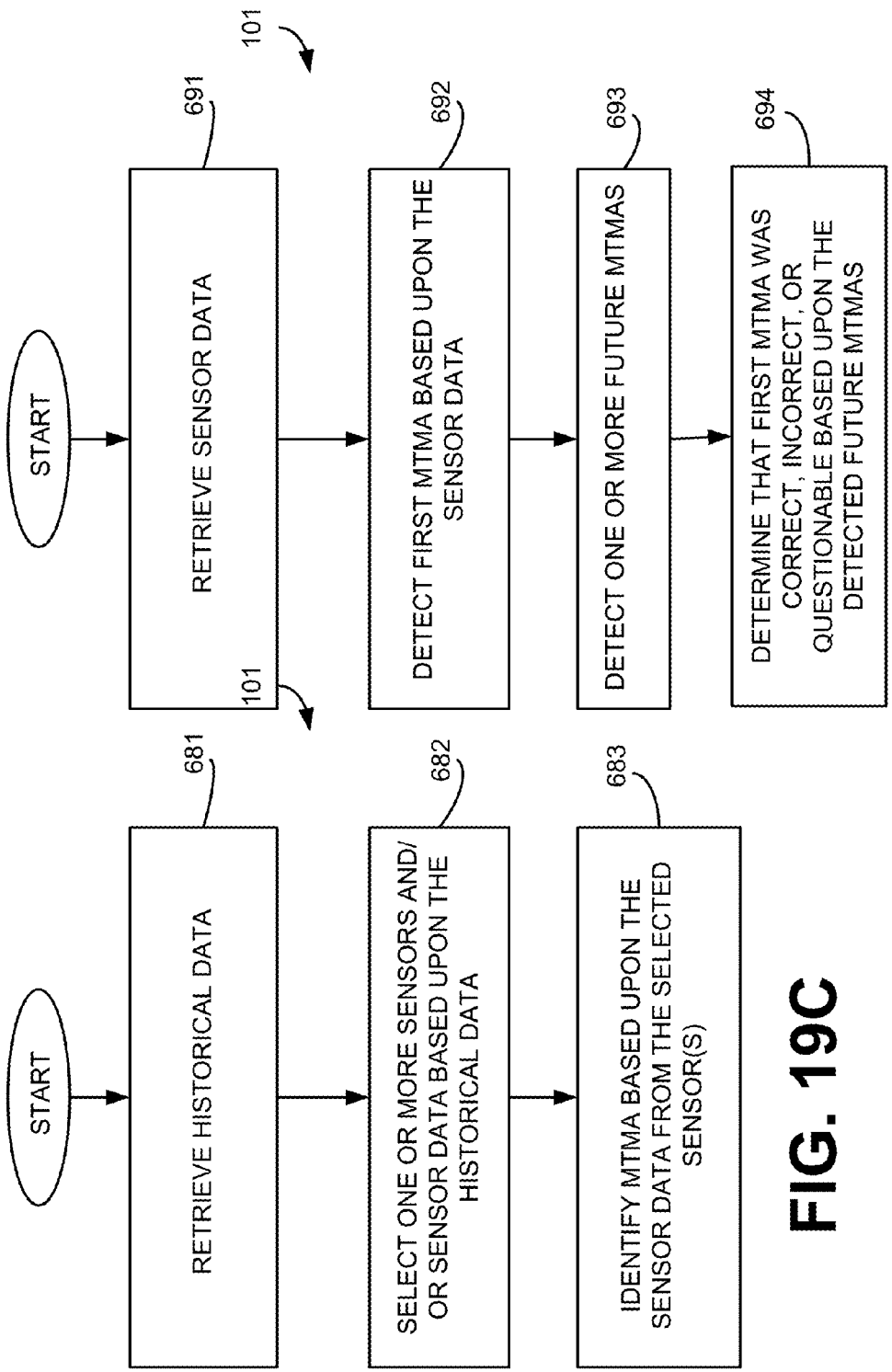

FIG. 19C is a flowchart of an example of a third set of embodiments of the MAI system of FIG. 2D that employs an algorithm(s) that takes into consideration historical data when attempting to identify a new MTMA.

FIG. 19D is a flowchart of an example of a fourth set of embodiments of the MAI system of FIG. 2D that employs an algorithm(s) that takes into consideration historical data when attempting to identify a new MTMA.

Figure 20B:
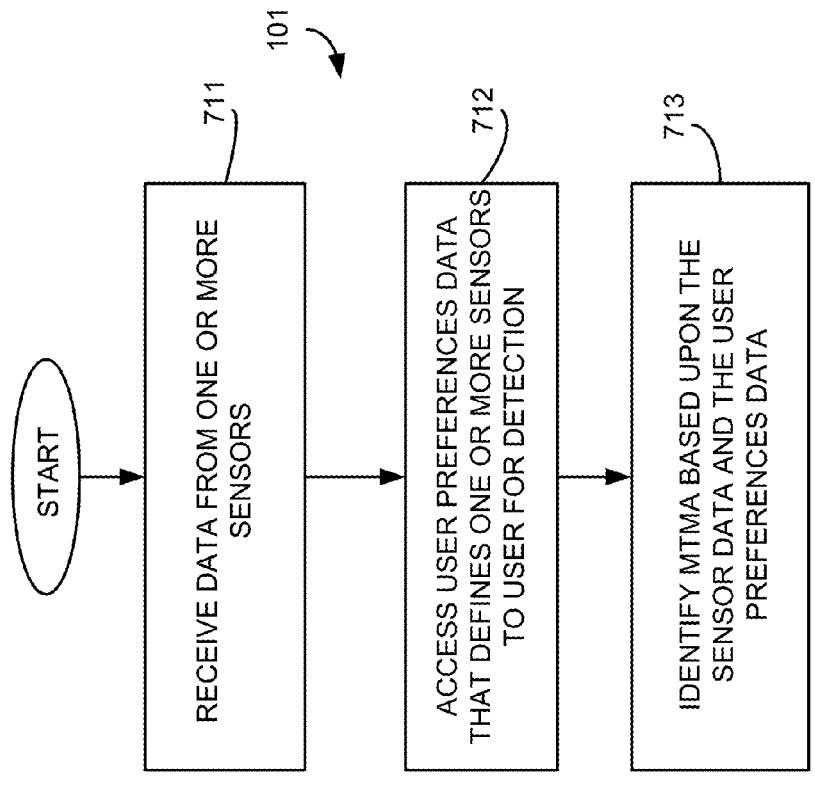
Figure 20A:
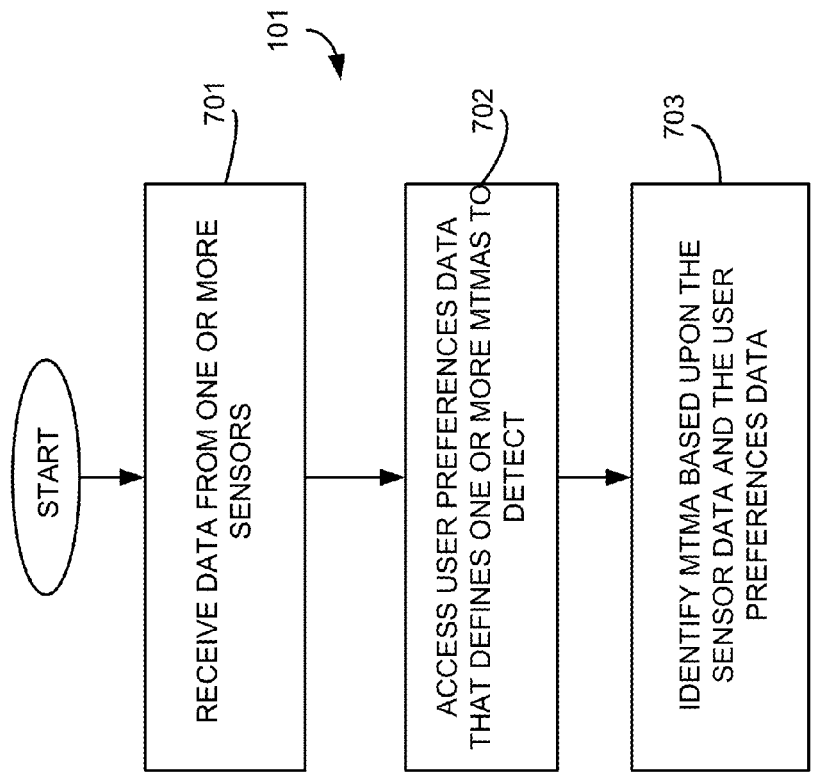

FIG. 20A is a flowchart of an example of a first set of embodiments of the MAI system of FIG. 2D that employs user preferences data.

FIG. 20B is a flowchart of an example of a second set of embodiments of the MAI system of FIG. 2D that employs user preferences data.

Figure 21A:
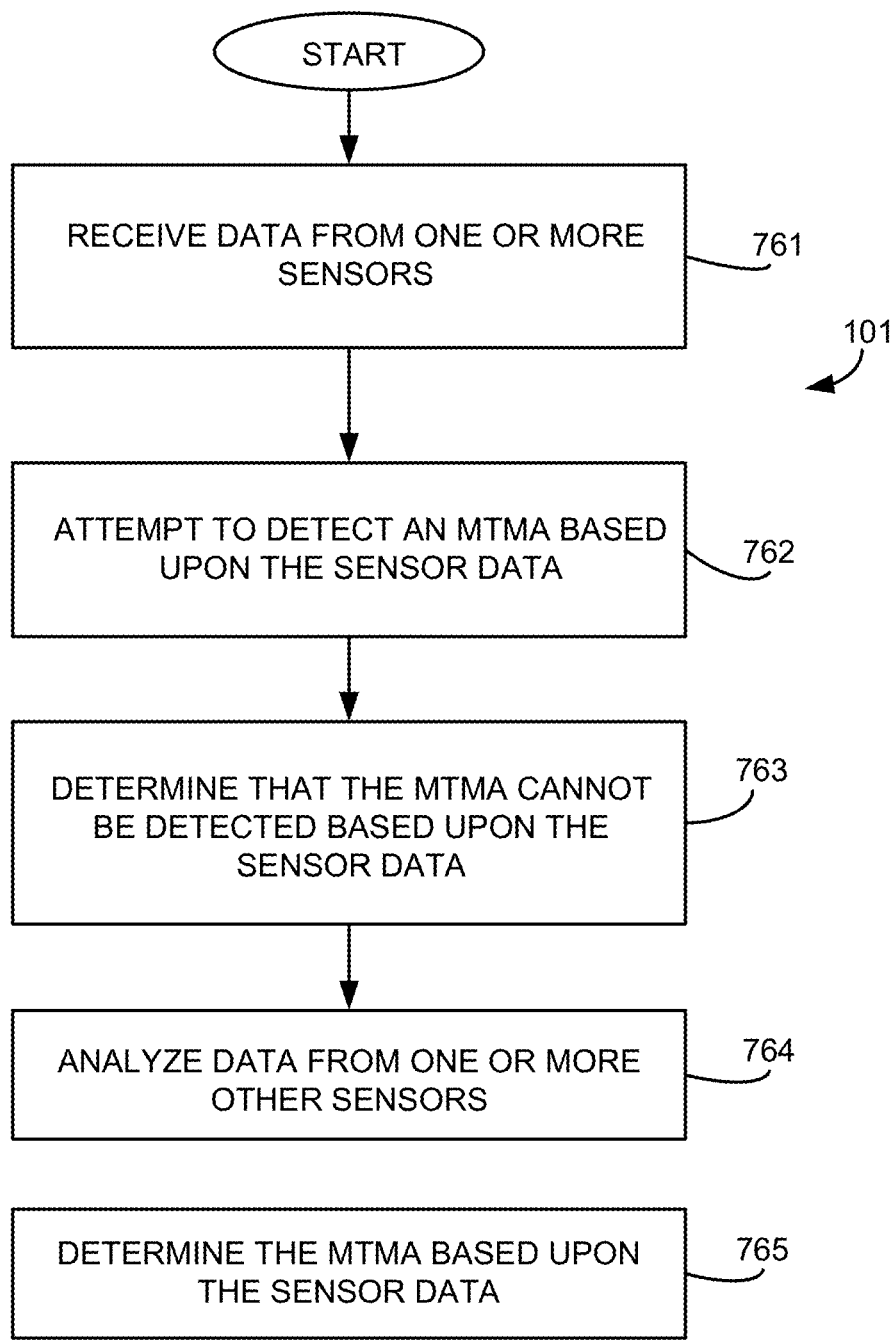

FIG. 21A is a flowchart of an example of a first set of embodiments of the MAI system of FIG. 2D that employs a sensor data selection algorithm in order to assist with identifying an MTMA.

Figure 21B:
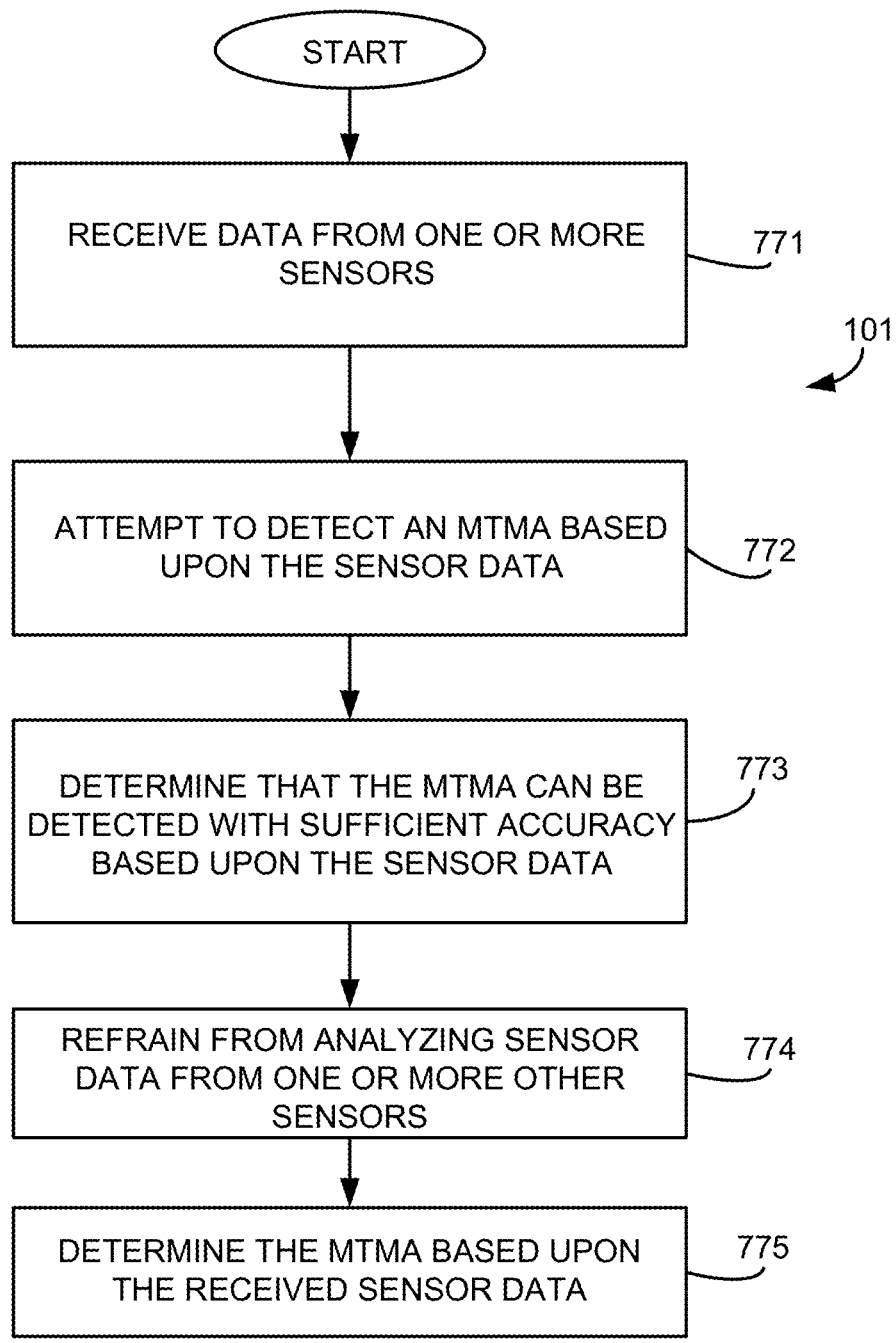

FIG. 21B is a flowchart of an example of a second set of embodiments of the MAI system of FIG. 2D that employs a sensor data selection algorithm in order to assist with identifying an MTMA.

FIG. 21C is a flowchart of an example of a third set of embodiments of the MAI system of FIG. 2D that employs a sensor data selection algorithm in order to assist with identifying an MTMA.

FIG. 21D is a flowchart of an example of a fourth set of embodiments of the MAI system of FIG. 2D that employs a sensor data selection algorithm in order to assist with identifying an MTMA.

Figure 22A:
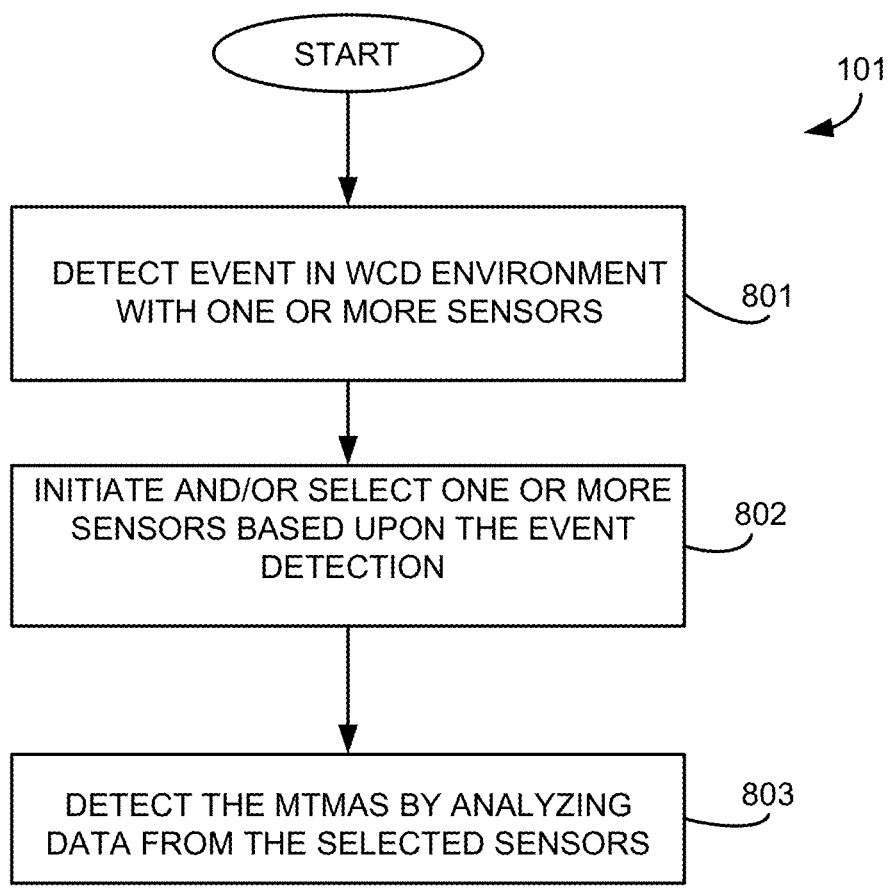

FIG. 22A is a flowchart of an example of a first set of embodiments of the MAI system of FIG. 2D that employs an environmental event detection algorithm in order to assist with identifying an MTMA.

Figure 22B:
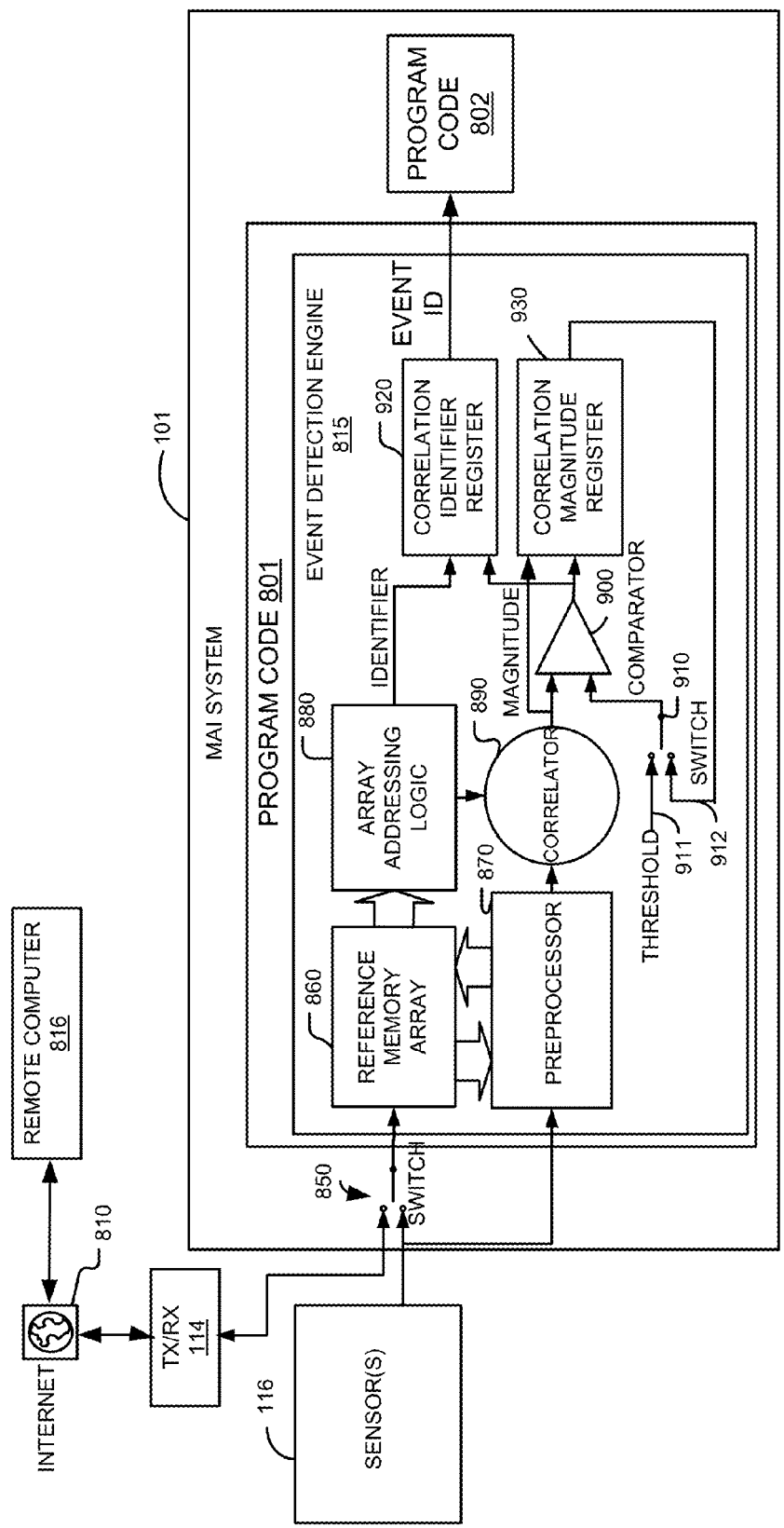

FIG. 22B is a block diagram of an example of an event detection engine that can be used in the MAI system of FIG. 22A to detect an event in the WCD environment.

FIG. 22C is a flowchart of an example of a second set of embodiments of the MAI system of FIG. 2D that employs an environmental event detection algorithm in order to assist with identifying an MTMA.

FIG. 22D is a flowchart of an example of a third set of embodiments of the MAI system of FIG. 2D that employs an environmental event detection algorithm in order to assist with identifying an MTMA.

Figure 22E:
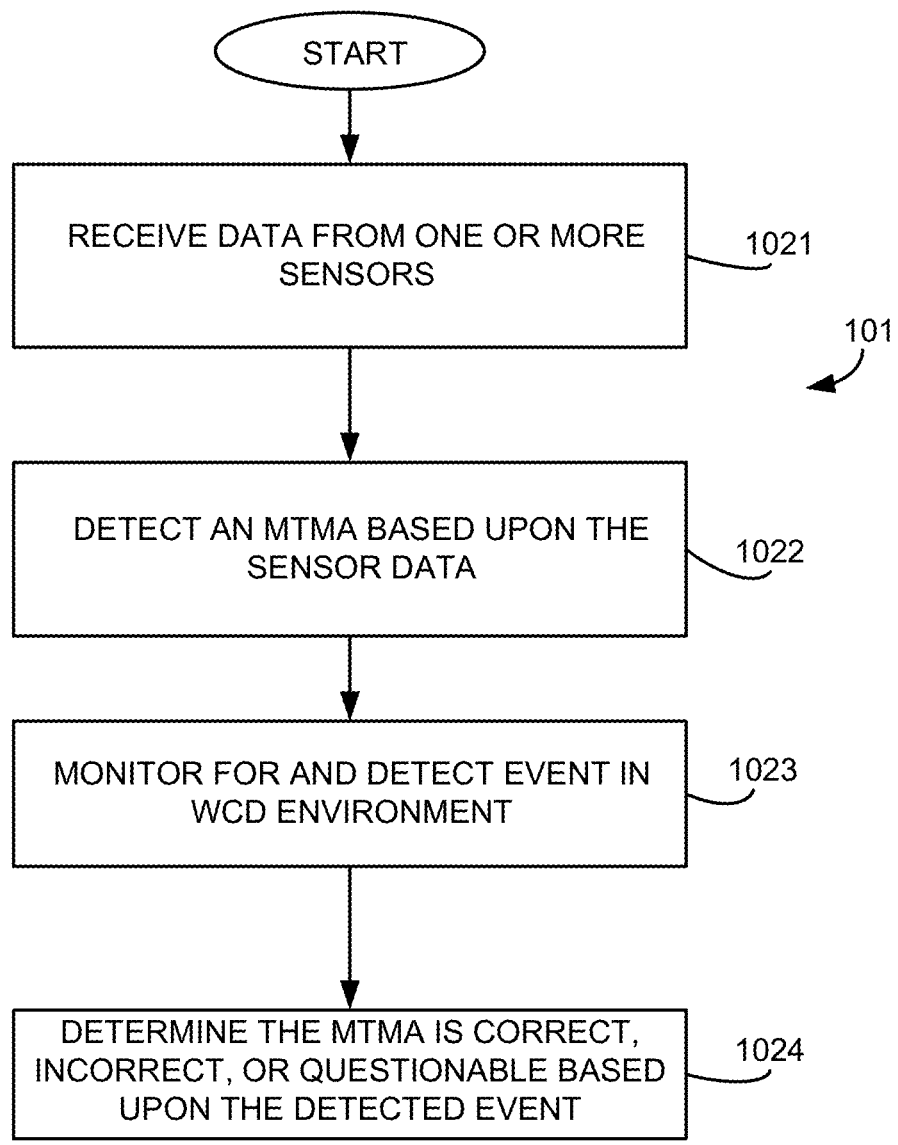

FIG. 22E is a flowchart of an example of a fourth set of embodiments of the MAI system of FIG. 2D that employs an environmental event detection algorithm in order to assist with identifying an MTMA.

Figure 22F:
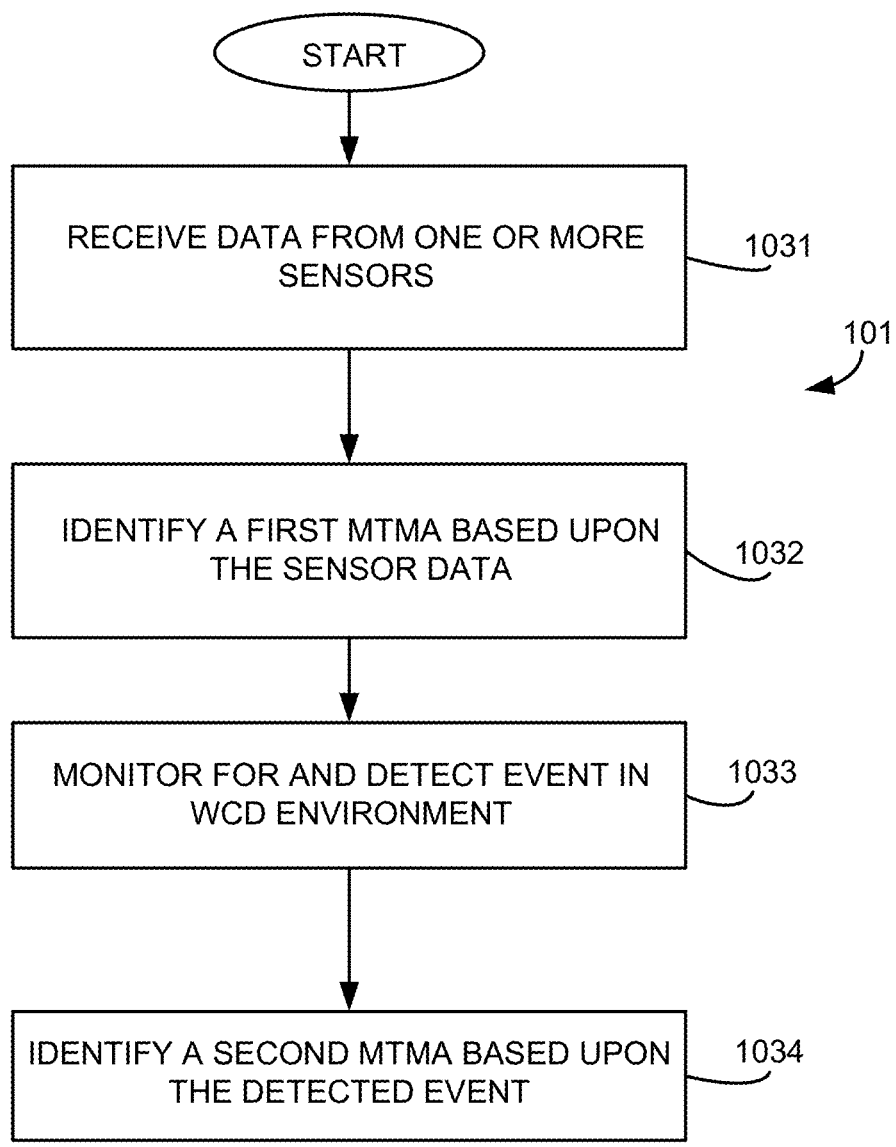

FIG. 22F is a flowchart of an example of a fifth set of embodiments of the MAI system of FIG. 2D that employs an environmental event detection algorithm in order to assist with identifying an MTMA.

Figure 23A:
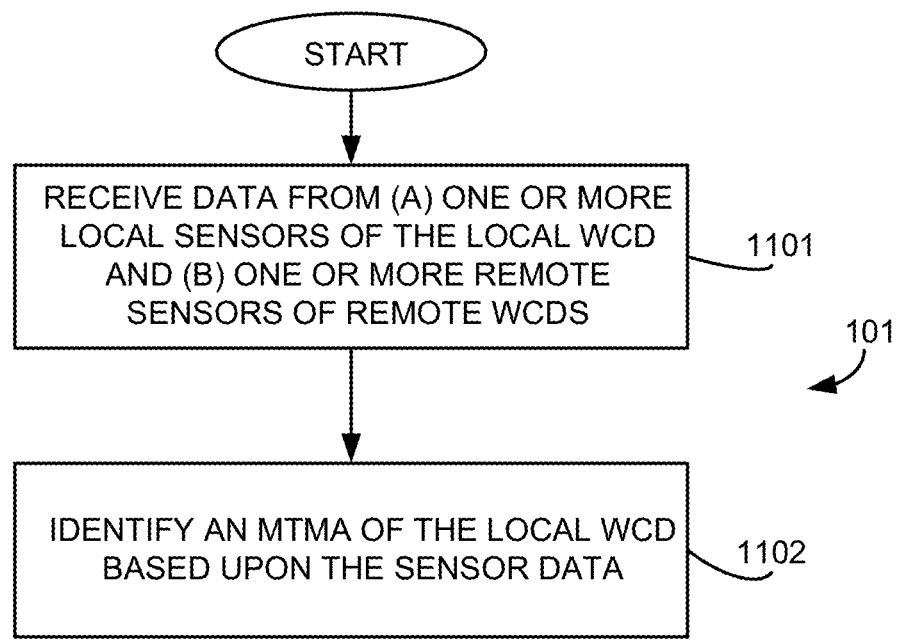

FIG. 23A is a flowchart of an example of a first set of embodiments of the MAI system of FIG. 2D that analyzes data associated with a plurality of WCDs in order to identify an MTMA.

Figure 23B:
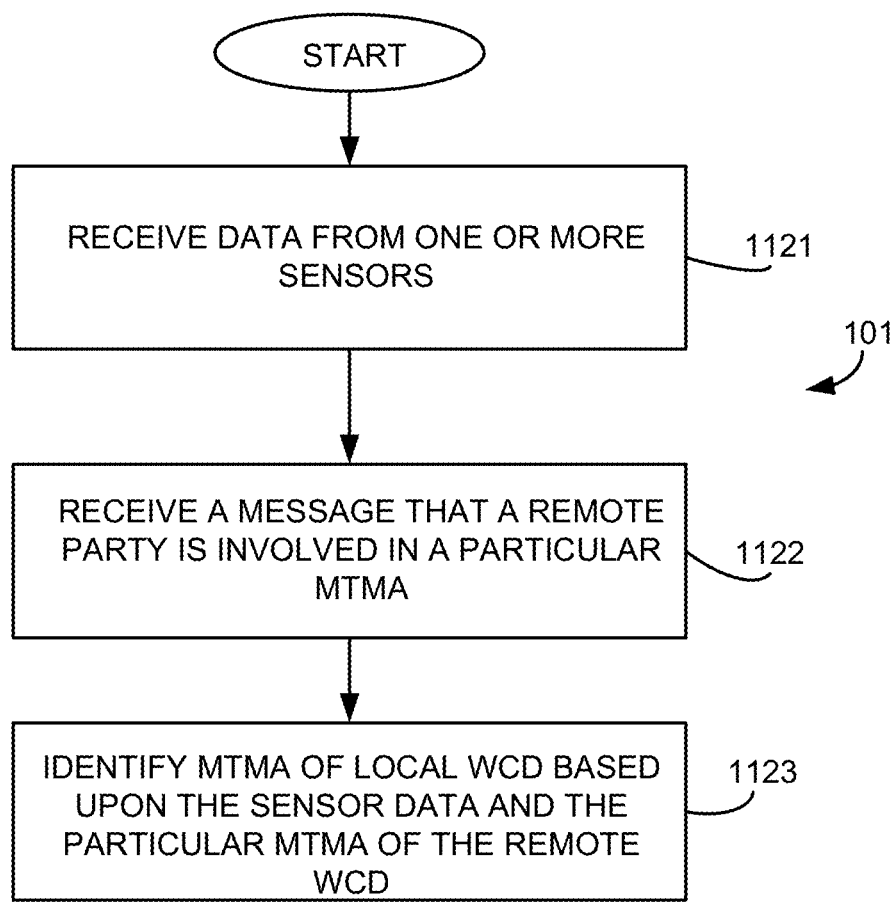

FIG. 23B is a flowchart of an example of a second set of embodiments of the MAI system of FIG. 2D that analyzes data associated with a plurality of WCDs in order to identify an MTMA.

Figure 23C:
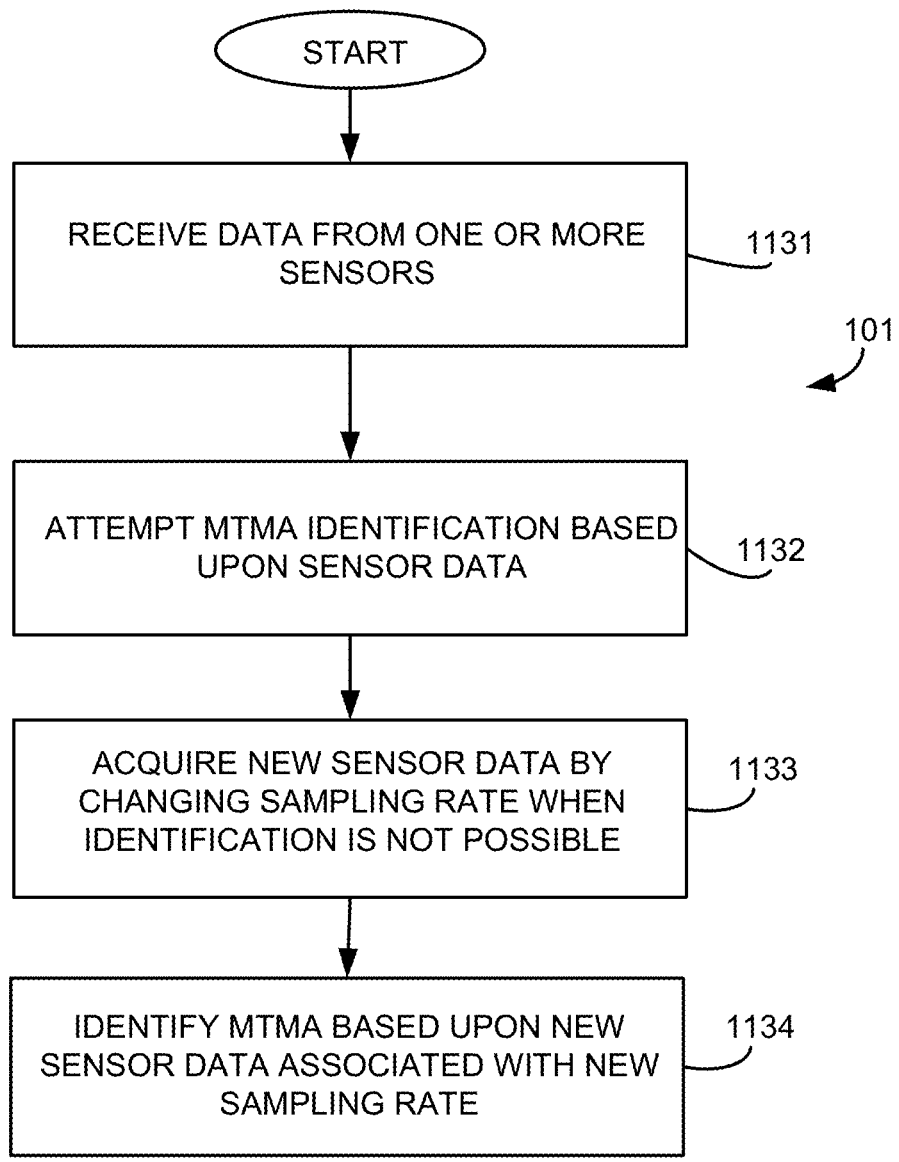

FIG. 23C is a flowchart of an example of a set of embodiments of the MAI system of FIG. 2D that employs a change in the sampling rate in order to enhance MTMA detection.

Figure 24A:
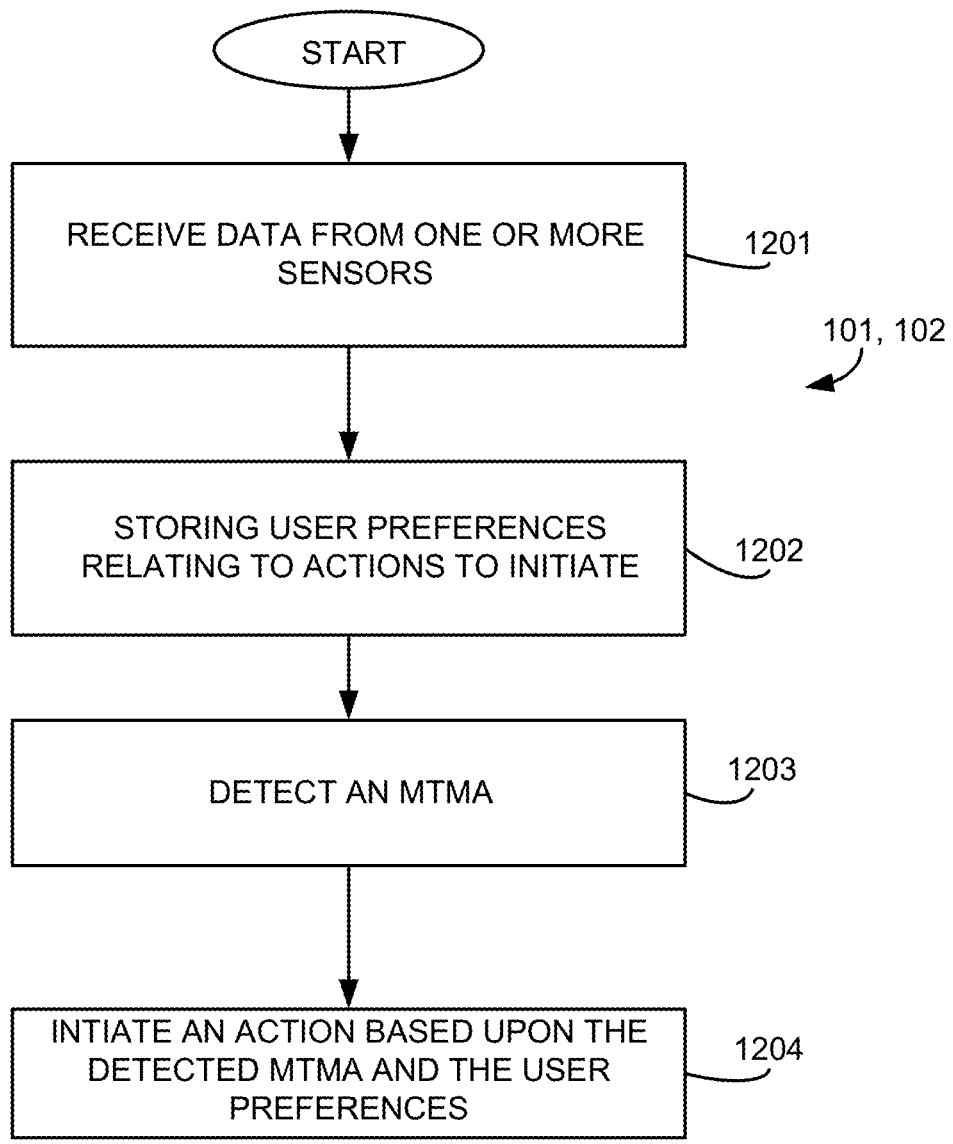

FIG. 24A is a flowchart of an example of a first set of embodiments that employ both the MAI system of FIG. 2D, in whole or in part, and the AD system of FIG. 2D, in whole or in part, in order to detect an MTMA and then initiate one or more intelligent activity based actions.

Figure 24B:
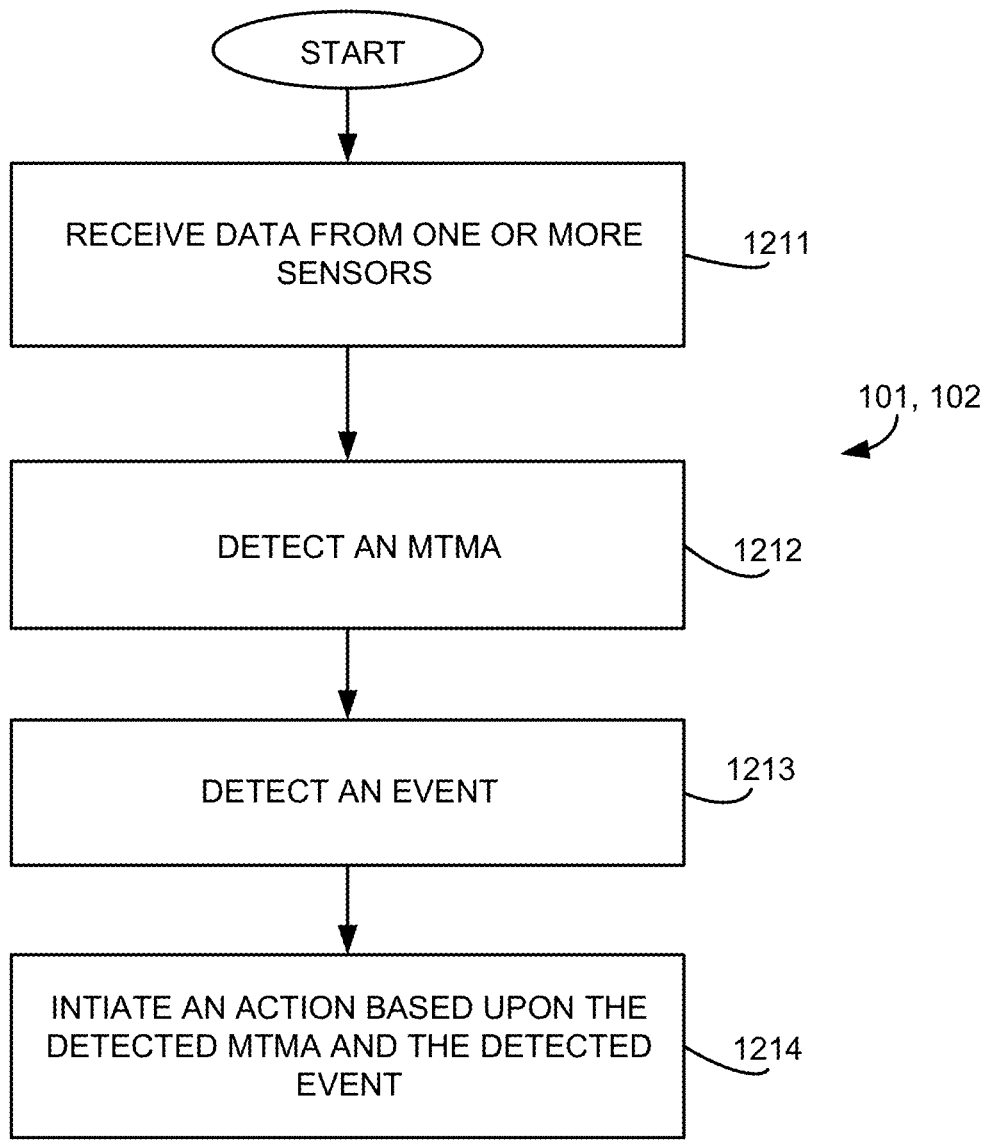

FIG. 24B is a flowchart of an example of a second set of embodiments that employ both the MAI system of FIG. 2D, in whole or in part, and the AD system of FIG. 2D, in whole or in part, in order to detect an MTMA and then initiate one or more intelligent activity based actions.

Figure 24C:
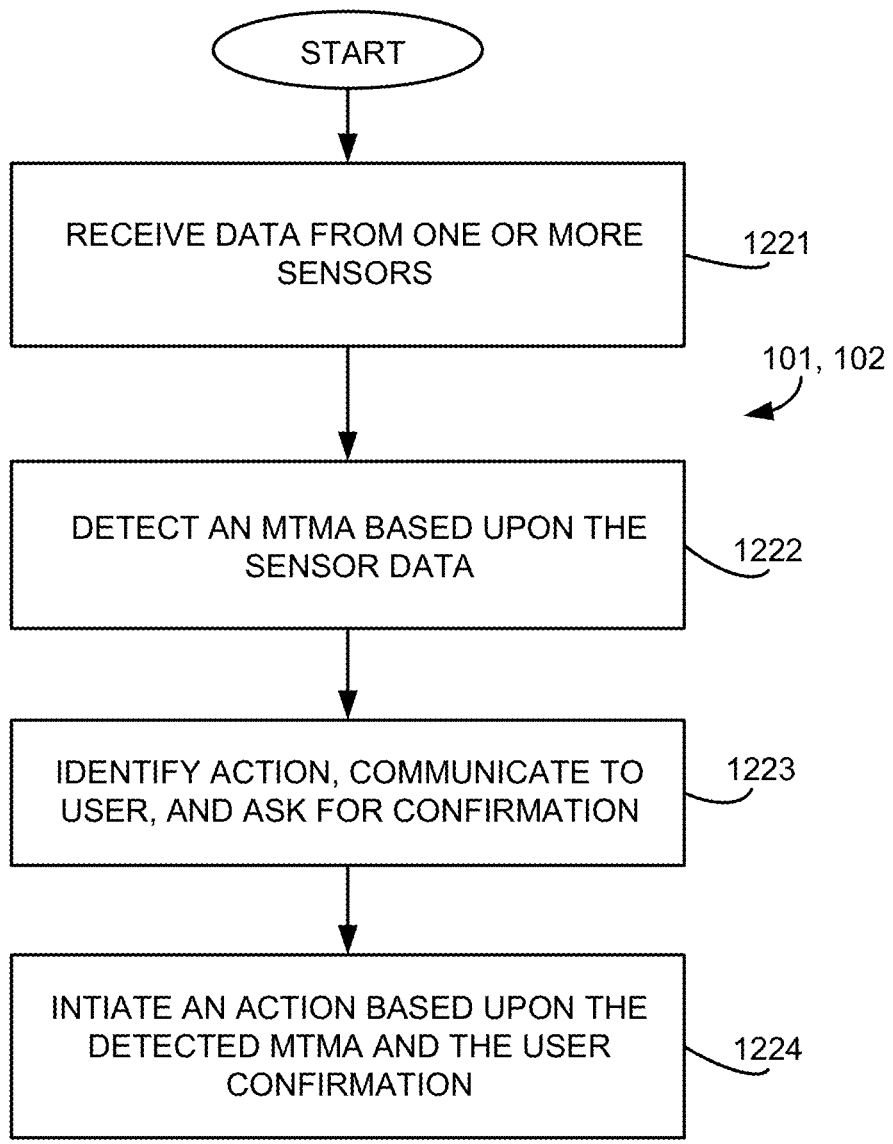

FIG. 24C is a flowchart of an example of a third set of embodiments that employ both the MAI system of FIG. 2D, in whole or in part, and the AD system of FIG. 2D, in whole or in part, in order to detect an MTMA and then initiate one or more intelligent activity based actions.

Figure 24D:
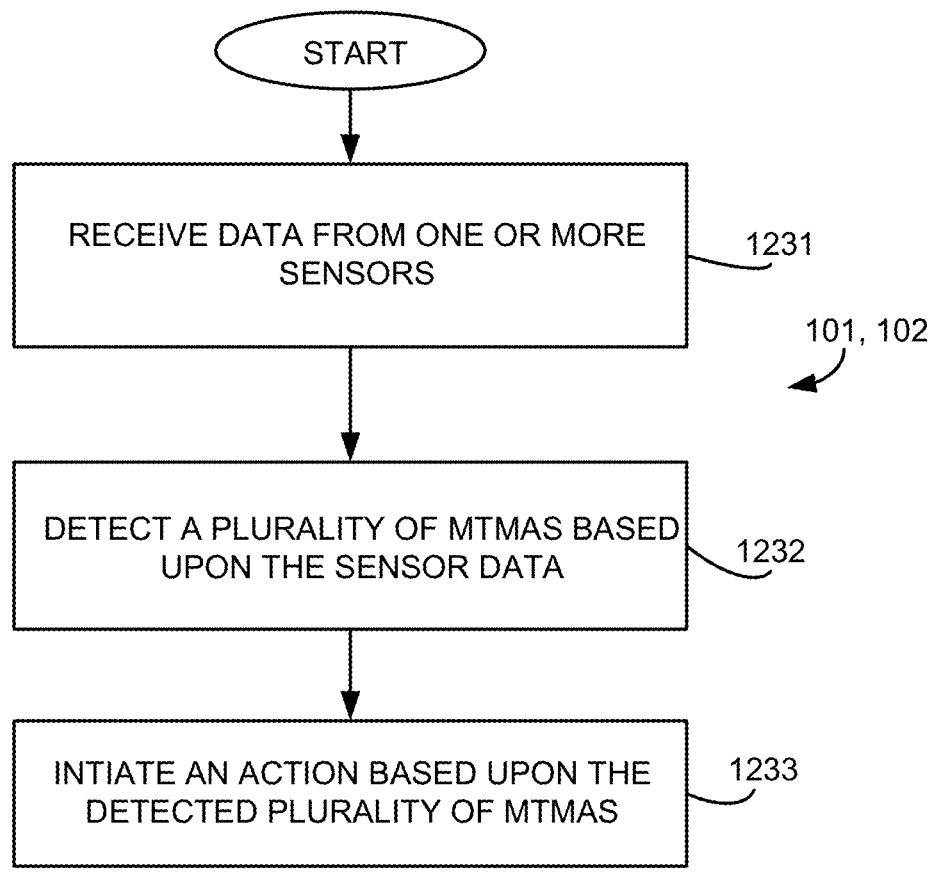

FIG. 24D is a flowchart of an example of a fourth set of embodiments that employ both the MAI system of FIG. 2D, in whole or in part, and the AD system of FIG. 2D, in whole or in part, in order to detect an MTMA and then initiate one or more intelligent activity based actions.

Figure 24E:
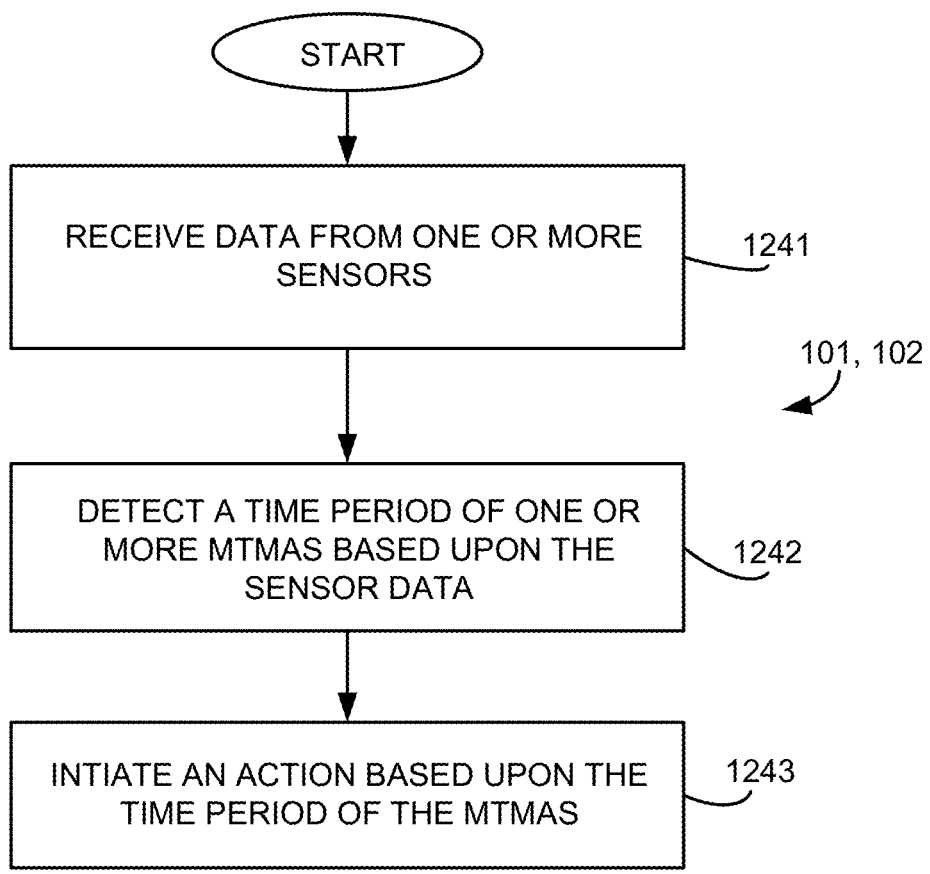

FIG. 24E is a flowchart of an example of a fifth set of embodiments that employ both the MAI system of FIG. 2D, in whole or in part, and the AD system of FIG. 2D, in whole or in part, in order to detect an MTMA and then initiate one or more intelligent activity based actions.

Figure 24F:
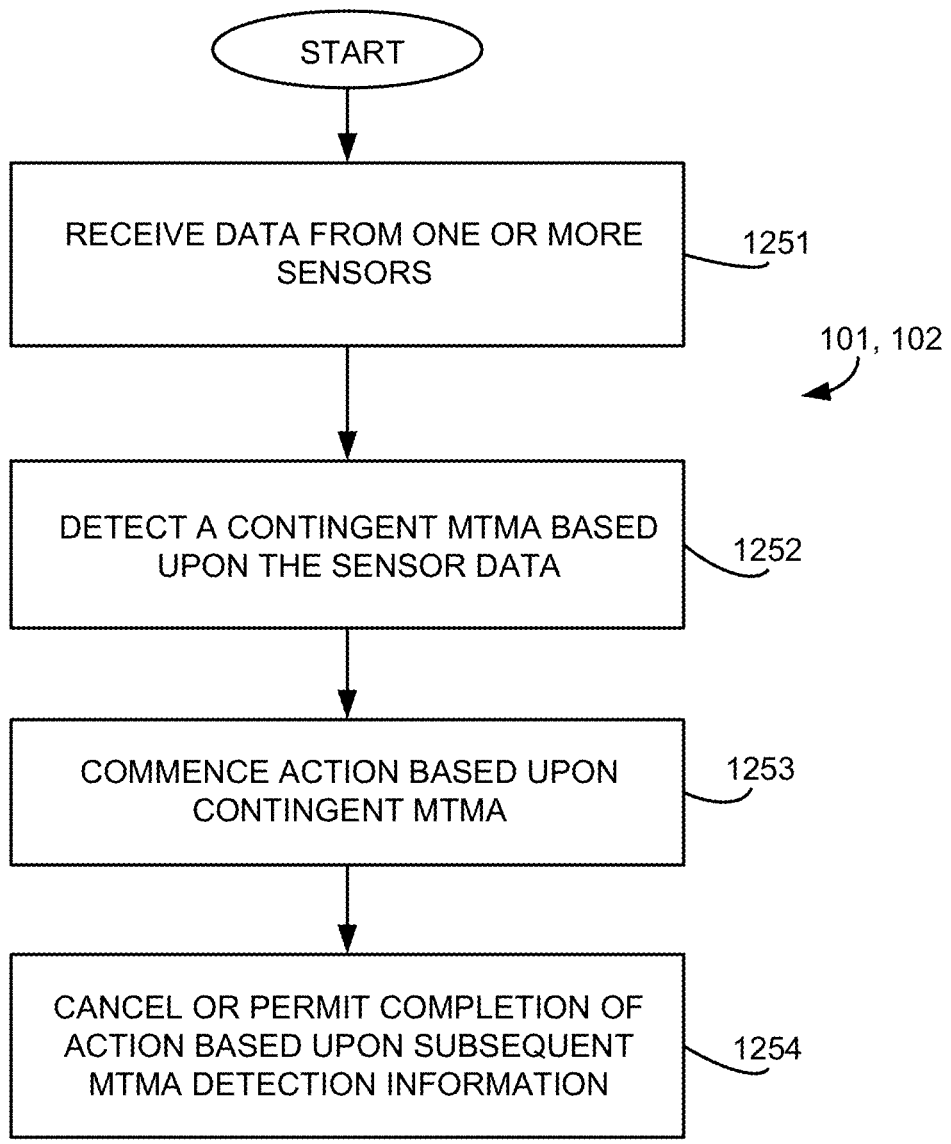

FIG. 24F is a flowchart of an example of a sixth set of embodiments that employ both the MAI system of FIG. 2D, in whole or in part, and the AD system of FIG. 2D, in whole or in part, in order to detect an MTMA and then initiate one or more intelligent activity based actions.

Figure 24G:
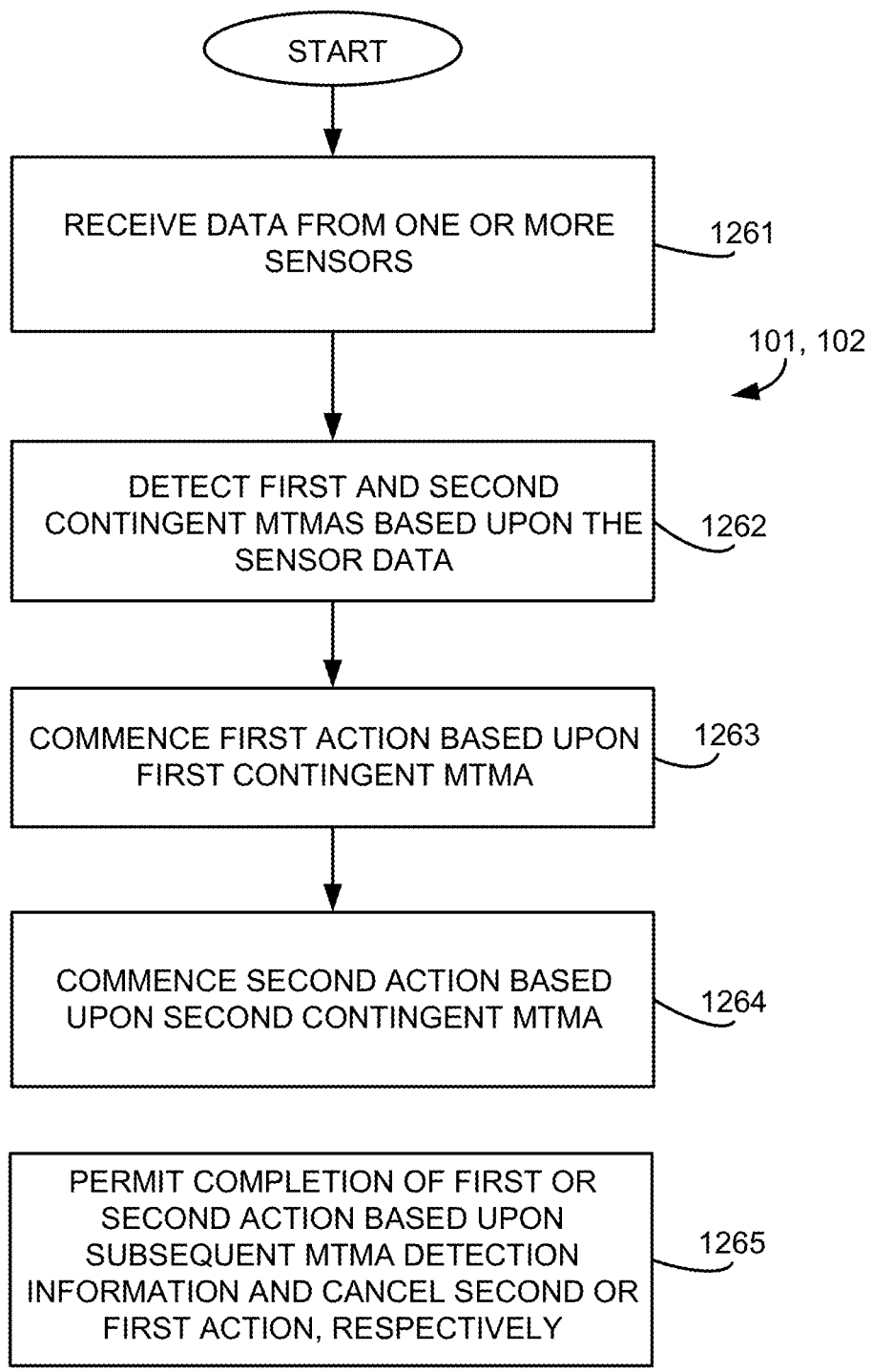

FIG. 24G is a flowchart of an example of a seventh set of embodiments that employ both the MAI system of FIG. 2D, in whole or in part, and the AD system of FIG. 2D, in whole or in part, in order to detect an MTMA and then initiate one or more intelligent activity based actions.

Figure 24H:
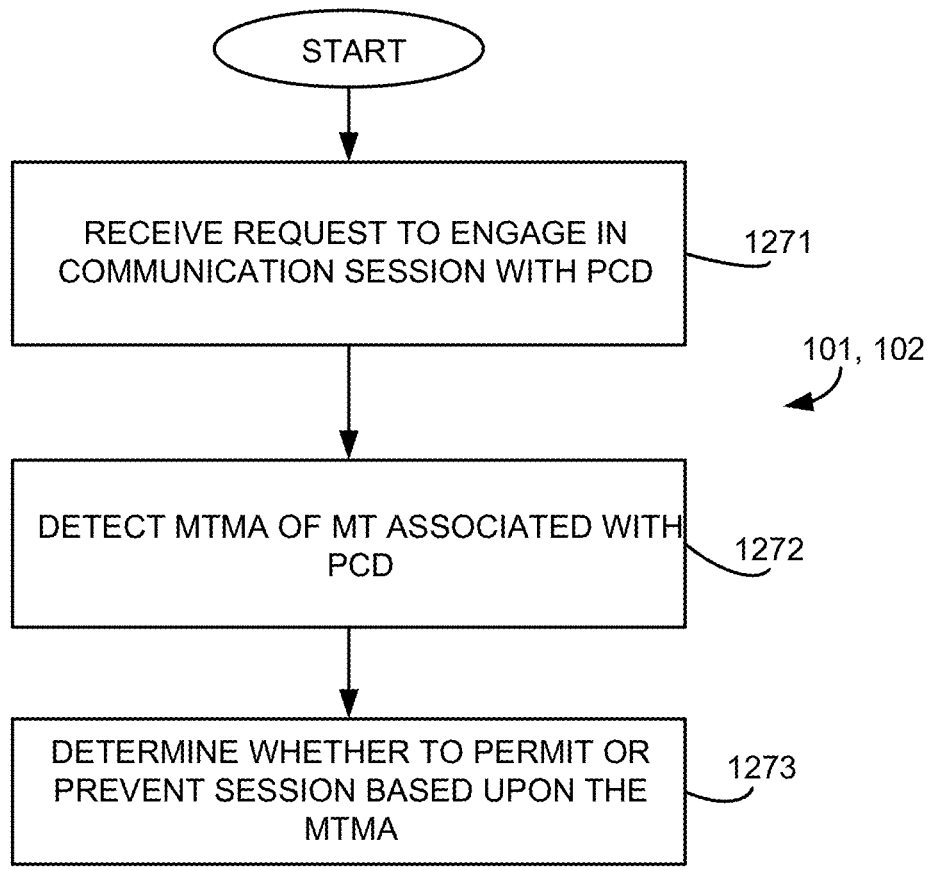

FIG. 24H is a flowchart of an example of an eighth set of embodiments that employ both the MAI system of FIG. 2D, in whole or in part, and the AD system of FIG. 2D, in whole or in part, in order to detect an MTMA and then initiate one or more intelligent activity based actions.

Figure 24I:
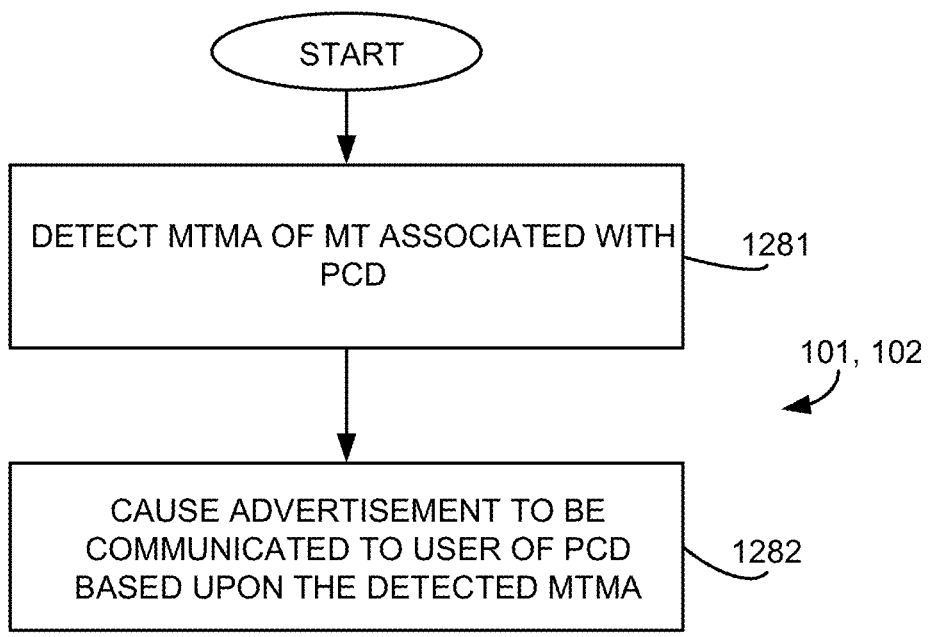

FIG. 24I is a flowchart of an example of a ninth set of embodiments that employ both the MAI system of FIG. 2D, in whole or in part, and the AD system of FIG. 2D, in whole or in part, in order to detect an MTMA and then initiate one or more intelligent activity based actions.

Figure 24J:
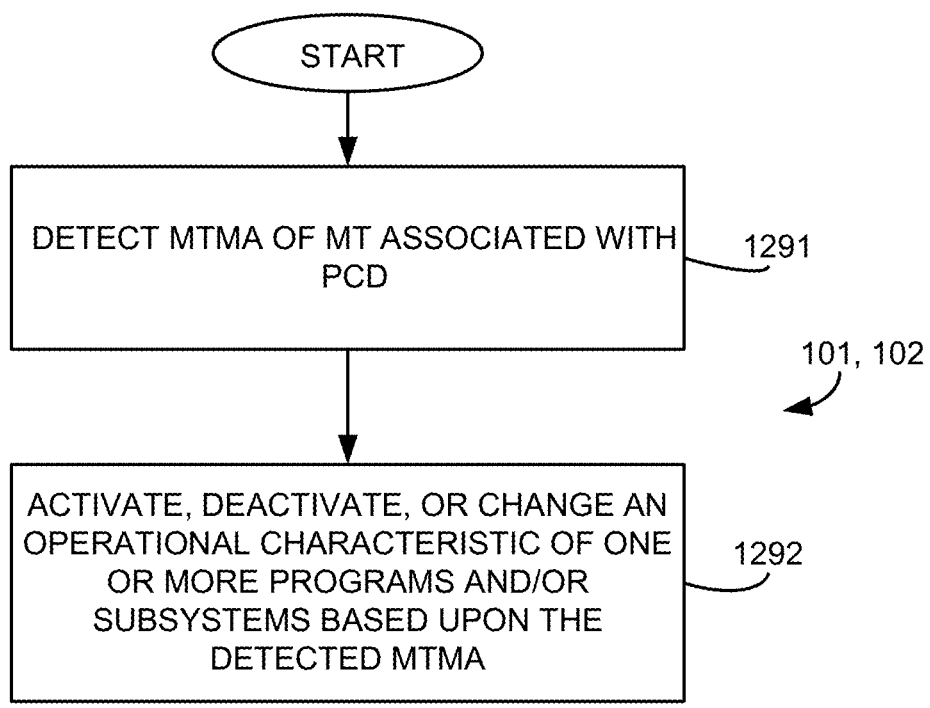

FIG. 24J is a flowchart of an example of a tenth set of embodiments that employ both the MAI system of FIG. 2D, in whole or in part, and the AD system of FIG. 2D, in whole or in part, in order to detect an MTMA and then initiate one or more intelligent activity based actions.

DETAILED DESCRIPTION OF EMBODIMENTS

Table of Contents

A. MTMA Identification/Action System
B. MAI System Overview
C. Overview of Mathematical Techniques That can be used by MAI System
  1. Fourier Transform
D. Normalization (Rotating) Method
  1. Determining Rotation Angle Θ
  2. Code Description for rotating One Data Point
E. Computer Based WCD With Software Based MAI System and AD System
F. Sensor Output Data Structures
G. MAI System
  1. First Set of Embodiments
  2. Second Set of Embodiments
  3. Third Set of Embodiments
  4. Fourth Set of Embodiments
    a. Rotation of the Axes
    b. Statistical Parameters
      i. Basic parameters
      ii. Advanced Parameters
      iii. Fourier Transform (FT)
    c. Architecture/Operation
      i. Analysis for Stationary (Stopped, Standing)
      ii. Analysis for Running (First Time)
      iii. Analysis for Driving (First Time)
      iv. Analysis for Running (Second Time)
      v. Identifying Most Probable MTMA with Comparative Analysis
      vi. Analysis for Walking (First Time)
      vii. Analysis for Running (Third Time)
      viii Analysis for Driving (Second Time)
      ix Analysis for Biking (First Time)
  5. Fifth Set of Embodiments
  6. Sixth Set of Embodiments
H. Embodiments of MIA Systems That Employ Correlation
  1. First Mode
  2. Second Mode
  3. Third Mode
  4. Fourth Mode
I. Embodiments of MIA Systems that Utilize Filtering
  1. First Set of Embodiments
  2. Second Set of Embodiments
  3. Third Set of Embodiments
J. Embodiments of MIA Systems that Utilize Sensor Data
K. Embodiments of MIA Systems that Employ Requests for User Confirmation
L. Embodiments of MIA Systems that Employ MTMA Exception
  1. First Set of Embodiments
  2. Second Set of Embodiments
  3. Third Set of Embodiments
  4. Fourth Set of Embodiments
M. Embodiments of MIA Systems that Employ Historical Data Algorithms
  1. First Set of Embodiments
  2. Second Set of Embodiments
  3. Third Set of Embodiments
  4. Fourth Set of Embodiments
N. Embodiments of MIA Systems that Employ User Preferences
  1. First Set of Embodiments
  2. Second Set of Embodiments
O. Embodiments of MIA Systems that Employ Sensor Data Selection
  1. First Set of Embodiments
  2. Second Set of Embodiments
  3. Third Set of Embodiments
  4. Fourth Set of Embodiments
P. Embodiments of MIA Systems that Employ Environmental Event Detection
  1. First Set of Embodiments
    a. Event Detection Logic
      i. First Mode
      ii. Second Mode
      iii. Third Mode
      iv. Fourth Mode
    b. Sensor Selection Logic
    c. MTMA Identification Logic
  2. Second Set of Embodiments
  3. Third Set of Embodiments
  4. Fourth Set of Embodiments
  5. Fifth Set of Embodiments
Q. Embodiments of MIA Systems that Employ Data From Multiple WCDs
  1. First Set of Embodiments
  2. Second Set of Embodiments
R. Embodiments of MIA Systems that Employ Sampling Rate Changes to Enhance MTMA Detection
S. Embodiments of Action Determination (AD) Systems
T. Embodiments Employing MAI System and AD System
  1. First Set of Embodiments
  2. Second Set of Embodiments
  3. Third Set of Embodiments
  4. Fourth Set of Embodiments
  5. Fifth Set of Embodiments
  6. Sixth Set of Embodiments
  7. Seventh Set of Embodiments
  8. Eighth Set of Embodiments
  9. Ninth Set of Embodiments
  10. Tenth Set of Embodiments
U. Variations, Modifications, and Other Possible Applications
V. Appendix The present disclosure provides systems, methods, and apparatus for accurately identifying a mobile thing motion activity (MTMA) associated with a mobile thing (MT), such as a person, by analyzing data produced by one or more sensors associated with a wireless communication device (WCD) transported (e.g., carried, moved, etc.) by the MT, so as to enable or initiate a further one or more intelligent activity based actions, for example, but not limited to, generation of a report, creation and communication of a message to another communication device, actuation of a local WCD function, etc. The MTMAs can include, for example but not limited to, standing, walking, running, driving, skiing, sleeping, snoring, hiking, skateboarding, sky diving, bicycling, unicycling, golfing, falling down, swimming, riding a ski lift, a motor vehicle, a motorcycle, an airplane, a train, or a water vessel, accelerating or decelerating in a motor vehicle, motorcycle, train, airplane, or water vessel, vibrating, propagating through a medium, rotating, riding in a wheelchair, looking or not looking or looking at an angle at a WCD display, assuming a position relative to the WCD, etc. The MT can be a person or other vehicle capable of mobility and of transporting the WCD. The WCD can be any device that is transportable by the MT that can wirelessly communicate accelerometer information, identified MTMA information, and/or action determination (AD) information in order to enable implementation of an intelligent action based upon the identified MTMA. Nonlimiting examples of a WCD include a wireless telephone, a wireless smartphone, etc.

A. MTMA Identification/Action System

Figure 1:
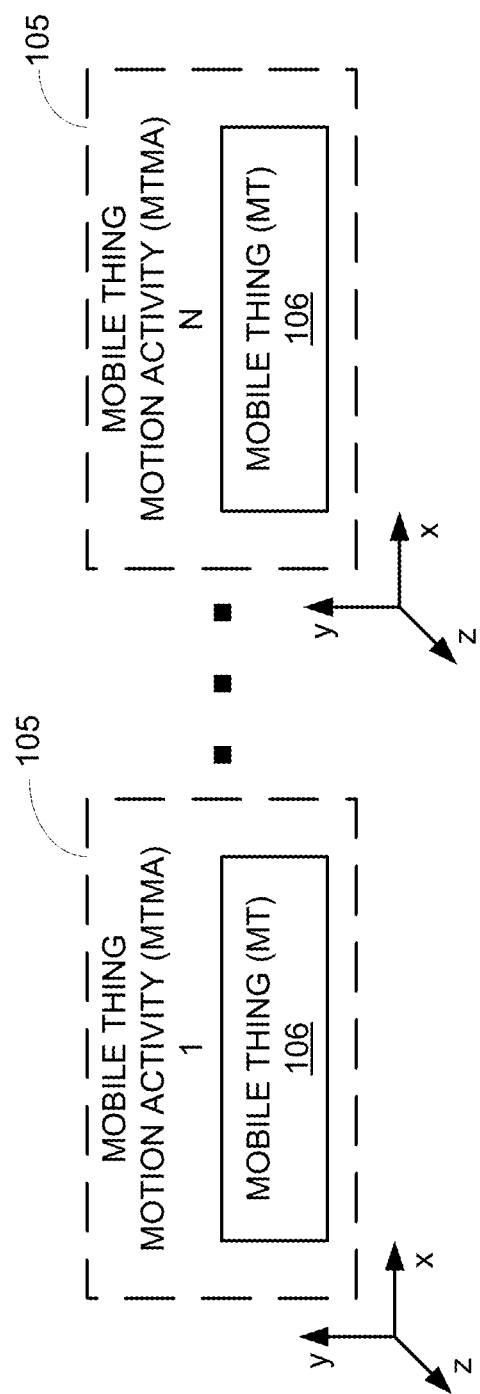
FIG. 1 is a block diagram illustrating that a mobile thing (MT) can be involved in a plurality of mobile thing motion activities (MTMAs) 1 to N, where the number of activities, N, may be adjusted to specific user needs.

FIG. 1 is a block diagram illustrating that the MT 106 can be involved in one or more, many times a plurality of MTMAs 105, denoted 1 to N, where N is any number. In order to practice activity based messaging, the MTMA 105 in which the MT 106 is involved needs to be identified.

FIGS. 2C, 2B, and 2C show block diagrams illustrating exemplary first, second, and third sets of embodiments 100a, 100b, 100c of an MTMA identification/action system, respectively.

With reference to FIG. 2A, in the first set of embodiments 100a, a motion activity identification (MAI) system 101 that identifies the MTMA 105 from the accelerometer data and an action determination (AD) system 102 that determines an intelligent activity based action to initiate based upon the MTMA are both remotely situated from the WCD 104 of the MT 106. The MAI system 101 and the AD system 102 may reside in the same or different systems/apparatus, situated locally or remotely. The WCD 104, the MAI system 101, and the AD system 102 can be communicatively coupled via any suitable communication scheme. Furthermore, the MAI system 101 and the AD system 102 of FIGS. 2A, 2B, and 2C can be implemented in computer software, hardware circuitry, or a combination thereof. As an example, each of the MAI system 101 and the AD system 102 could be implemented separately in one or more computer systems. In this embodiment, the WCD 104 can be designed to communicate pure accelerometer data 120 (FIG. 3), preprocessed accelerometer data, and/or a derivative of either of the foregoing to the MAI system 101 in order to enable the MAI system 101 to identify the MTMA 105. In this embodiment, the MAI system 101 can be designed to communicate an MTMA identity, preprocessed MTMA identity information, and/or a derivative of either of the foregoing to the AD system 102 in order to enable the AD system 102 to take an action or to make a decision regarding an action.

With reference to FIG. 2B, in the second set of embodiments 100b, the MAI system 101 that identifies the MTMA from the accelerometer data is situated in the WCD 104 and the AD system 102 that determines an action to initiate based upon the MTMA 105 is remotely situated from the WCD 104 of the MT 106. The WCD 104 with the MAI system 101 can be communicatively coupled to the AD system 102 via any suitable communication scheme. In this embodiment, the MAI system 101 can be designed to communicate an MTMA identity, preprocessed MTMA identity information, and/or a derivative of either of the foregoing to the AD system 102 in order to enable the AS system 102 to take an action or to make a decision regarding an action.

With reference to FIG. 2C, in the third set of embodiments 100c, both the MAI system 101 that identifies the MTMA 105 from the accelerometer data and the AD system 102 that determines an action to initiate based upon the MTMA 105 are locally situated in the WCD 104 of the MT 106.

B. MAI System Overview

In the preferred embodiment, which is an example among other possible embodiments, the MAI system 101 is designed to identify the following five MTMAs 105: (1) standing, (2) walking, (3) running, (4) biking, and (5) riding.

The MTMA 105 is identified by the MAI system 101 by analyzing sensor data from one or more sensors 116 associated with the WCD 104.

The WCD 104 may be positioned anywhere on the body, such as in any pocket, in hand, or otherwise transported or attached. It may also be inside a bag, including but not limited to, a backpack, purse, or fanny pack. The WCD 104 can also be attached to an object moving with the body, such as attached to a bike during the MTMA 105, placed in a cup holder of a motor vehicle, or attached to a movement assistance device (walker, wheelchair, etc.).

C. Overview of Mathematical Techniques That can be Used by MAI System

The following is a list of some of the methods used in calculations in the preferred embodiment and includes some commentary on possible alternative ways to get a similar result.

The coordinates are rotated so that the downward direction is along the z-axis in an x-y-z orthogonal coordinate system.

The first identification is performed via average and standard deviation (SD). If the MTMA 105 is almost still, then the values are close to constant. In the case of running, the average is much lower and SD is high. The 'average/mean' and 'variance/SD' are most commonly used in previous research on human MTMA 105. The MAI system 101 currently uses average and SD of the vertical acceleration and net horizontal acceleration.

Note that the MAI system 101 could also use median (the middle point rather than average) instead of the mean, and it can use variance instead of SD (square of SD), or another measure of data diversity/variability. These two parameters may be used on the net magnitude vector or components individually.

The MAI system 101 also uses higher order moments about mean or zero (equivalent of root means square (RMS)). This helps to distinguish between certain biking and walking cases of MTMA 105. Moreover, the MAI system 101 of the preferred embodiment uses a 4th order moment of vertical force about zero and 3rd order moment of vertical force about mean.

The current implementation uses two of the higher order moments of the vertical acceleration component. Several other higher order moments were studies, but were determined to be not necessary with respect to the MTMAs this early in the implementation. It is likely that as the number of activities increases, the number of higher order moments used will increase as well.

The MAI system 101 also makes use of average square sum integral of the net acceleration from all three directions. Higher values indicate more volatile MTMA 105 such as running or walking. This is sometimes referred to as "signal vector magnitude." See Figo, et al., "Preprocessing Techniques for Context Recognition from Accelerometer Data," *Personal and Ubiquitous Computing,* 14(7): 645-662 (2010), which is incorporated herein by reference in its entirety.

1. Fourier Transform

The MAI system 101 makes use of the Fourier Transform in order to transform the data from time domain representation into frequency domain representation. Once the data is converted to a discrete function of frequency as opposed to time, it becomes straightforward to extract information about all the modes of vibrations, such as amplitudes, frequencies and phases, present in the motion. Thus, it becomes possible to identify aspects such as engine vibrations of a car, frequency of steps during walking or running, pedaling and etc. This information can theoretically be obtained without performing the Fourier Transform, for example, by simply counting the number of peaks in a time domain data sample or curve fitting the data to a sinusoidal function, but these processes are not as commonly used due to higher complexity and increased computation costs.

The use of Fourier Transform can also allow for filtering and removing noise from the data.

In the preferred embodiment, the FT of the vertical direction proved to be more useful than the FT of the horizontal direction.

The first information that the MAI system 101 extracts from the FT is the amplitude and position of all the peaks. The maximum peak (its height being the amplitude) and its corresponding frequency are used to identify presence of a dominant oscillatory motion in the MTMA 105. Smaller peaks of comparable height indicate secondary modes of vibration in the MTMA 105.

The MAI system 101 also focuses on identifying a single peak versus multiple peaks of comparable height. Walking tends to have multiple frequencies, which show up as several peaks. The case of a single tall isolated peak typically indicates that the MTMA is more likely to be the biking motion activity.

The MAI system 101 also compares the average of the FT with the average amplitude at higher frequencies (whether the main weight of the FT is concentrated at the very beginning or if there is MTMA 105 at higher frequencies as well). This comparison is what separates a significant portion of walking and running from biking and driving. The latter two tend to have higher frequencies, whereas walking and running give almost exclusively low frequencies.

The approach described above of comparing the overall average to the average of a subinterval, or comparing parameter values from one interval to those of another may be utilized in both time and frequency domains. The approach may be applied to averages, as well as SD or other computed values used to describe a data as set or subset.

Another important feature of the motion is the total signal strength or the integral square sum. In the present embodiment the total signal strength calculated in the vertical direction proved useful in identifying MTMA 105. Note that by Parseval's theorem, this calculation can be done in either the frequency or the time domain and both will give a similar result (within machine rounding errors).

D. Normalization (Rotating) Method

In some embodiments, including the preferred embodiment, in order to perform accurate MTMA analysis, the MAI system 101 is designed to perform a normalization process in the form of rotation method upon the sampled data. This normalization process is implemented by the algorithms 113 (FIG. 2D), which will be described in detail hereafter. The normalization process enables more accurate statistical analysis of the accelerometer data 120. The rotation method uses the standard matrix rotation. Example of a rotation about the x-axis by angle θ:

$$\begin{bmatrix} x_{rotated} \\ y_{rotated} \\ z_{rotated} \end{bmatrix} = \begin{bmatrix} 1 & 0 & 0 \\ 0 & \cos(\theta) & -\sin(\theta) \\ 0 & \sin(\theta) & \cos(\theta) \end{bmatrix} \begin{bmatrix} x \\ y \\ z \end{bmatrix}$$

The code performs two rotations: First about the x-axis (making the y coordinate to 0), then about the y-axis (making the x coordinate to 0).

1. Determining Rotation Angle θ

The angle of rotation is determined by finding effectively stationary points during the MTMA 105. The stationary points are the ones that have the net force of magnitude 1, that is, Earth gravity, so we know the direction of the force is straight down. A point is considered stationary if the magnitude is within 6=0.02 of 1.

$$|1-\sqrt{x^2+y^2+z^2}|<0.02$$

This stationary point is then used to identify the direction of gravity and to compute a rotation matrix, which will rotate the subsequent data points. When the next stationary point is found, a new rotation matrix is generated.

In the preferred embodiment, the matrix is updated on average 4 times per second with sampling frequency of 60 data structures, as shown in FIG. 3, per second.

2. Code Description For Rotating One Data Point

The function takes in a data point (x, y, z) and rotates it. First introduce the tolerance parameter δ or del in the code. This means that if $$|1-\sqrt{x^2+y^2+z^2}|<\delta$$

Equivalent of:

$$\delta L < x^2+y^2+z^2 < \delta U$$

then the data point satisfying this inequality is assumed to be a "stationary point" and is used to compute the rotation matrix.

```
float del = 0.02;
float delU = (1+del)*(1+del);
float delL = (1-del)*(1-del);
float rsize;
```

Perform the rotation about the x-axis. This means the x-coordinate does not change, while the y-coordinate is rotated to 0 (or machine epsilon if the coordinate is computed from the rotation rather than being set to 0 manually).

Calculate the sin(sx) and cos(cx) of the angle θ=arctan y/z.

$$\sin\theta = \frac{y}{\sqrt{y^2+z^2}} \cos\theta = \frac{z}{\sqrt{y^2+z^2}}$$

```
rsize = x*x + y*y + z*z;
if ((rsize > delL) && (rsize < delU))
{
    dA = 1/sqrt(y*y + z*z);
    cx = z*dA;
    sx = y*dA;
```

Use the values in the rotation matrix:

$$m = \begin{bmatrix} 1 & 0 & 0 \\ 0 & cx & -sx \\ 0 & sx & cx \end{bmatrix} \begin{bmatrix} x \\ y \\ z \end{bmatrix} = \begin{bmatrix} x \\ c_x y - s_x z \\ s_x y + c_x z \end{bmatrix}$$

$z2 = sx * y + cx * z;$ $y = cx * y - sx * z;$

Repeat this for rotation around the y-axis, but now the angle we are looking at is $2\pi$–arctan x/z=–arctan x/z (by symmetry), where z is the already once rotated value. So, $$\sin\theta = -\frac{x}{\sqrt{x^2 + z^2}} \quad \cos\theta = \frac{z}{\sqrt{x^2 - z^2}}$$

$$m = \begin{bmatrix} cy & 0 & sy \\ 0 & 1 & -0 \\ sy & 0 & cy \end{bmatrix} \begin{bmatrix} x \\ y \\ z \end{bmatrix} = \begin{bmatrix} c_y x + s_y z \\ y \\ -s_y x + c_y z \end{bmatrix}$$

$dA = 1 / sqrt(x*x + z2*z2);$  // repeat the rotation about the y-axis $cy = z2 * dA;$ $sy = -x * dA;$                  // note the negative $x2 = x * cy + sy * z2;$ $z = -sy * x + cy * z2;$ $x = x2;$ The update the total matrix rotation entries:

$$\begin{bmatrix} 1 & 0 & 0 \\ 0 & cx & -sx \\ 0 & sx & cx \end{bmatrix} \begin{bmatrix} cy & 0 & sy \\ 0 & 1 & 0 \\ -sy & 0 & cy \end{bmatrix} = \begin{bmatrix} cy & sxsy & sycx \\ 0 & cx & -sx \\ -sy & cysx & cycx \end{bmatrix}$$

$sxsy = sx * sy; \quad cxcy = cx * cy;$ $cxsy = cx * sy; \quad sxcy = sx * cy;$

If the rotation matrix was not updated, use the one from the previous data point (values for it are stored globally.)

$$\begin{bmatrix} cy & sxsy & sycx \\ 0 & cx & -sx \\ -sy & cysx & cycx \end{bmatrix} \begin{bmatrix} x \\ y \\ z \end{bmatrix} = \begin{bmatrix} c_y x + s_x s_y y + x_x s_y z \\ c_x y - s_x z \\ -s_y x + s_x c_y y + c_x c_y z \end{bmatrix}$$

else

{

$x2 = cy * x + sxsy * y + cxsy * z;$ $z2 = -sy * x + sxcy * y + cxcy * z;$ $y = cx * y - sx * z;$ $x = x2; z = z2;$

}

E. Computer Based WCD With Software Based MAI System and AD System

FIG. 2D is a block diagram illustrating an example of a WCD 104 with a computer based architecture that employs the architecture of FIG. 2C. In this embodiment, the MAI system 101 and the AD system 102 are implemented in computer software within the WCD 104.

With reference to FIG. 2D, the WCD 104 includes at least a processor(s) 110, such as a microprocessor, a memory (ies) 112, a transmitter(s) and perhaps a receiver(s) (TX/RX(s)) 114, and a sensor(s) 116, for example but not limited to, an accelerometer, a gyroscope, a magnetometer, a pressure sensor, a GPS receiver, a microphone, an altimeter, a heat sensor, a humidity sensor, barometer, gas sensor, air quality sensor, chemical sensor, radiation sensor (dosimeter), light sensor, proximity sensor, etc. All of the foregoing are communicatively coupled via a local interface(s) 118.

In terms of hardware, the memory 112 comprises all volatile and non-volatile memory elements, including but not limited to, RAM, ROM, etc. In terms of software, the memory 112 comprises at least the following software: an operating system (O/S) 111, the MAI system 101, and the AD system 102. The computer program code (instructions) associated with the software in memory 112 is executed by the processor 110 in order to perform the methodologies of the present disclosure.

The MAI system 101 and/or the AD system 102 (as well as the other computer software and software logic described in this document), which comprises an ordered listing of executable instructions for implementing logical functions, can be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable medium" can be any means that can contain or store the program for use by or in connection with the instruction execution system, apparatus, or device. The non-transitory computer readable medium can be, for example but not limited to, an electronic, magnetic, optical, electromagnetic, infrared, or semiconductor system, apparatus, or device. More specific examples (a non-exhaustive list) of the non-transitory computer-readable medium would include the following: a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) or DVD (optical).

The transmitter (TX) 114 may be part of a transceiver (TX/RX) that has both a transmitter and a receiver. In either case, the transmitter is connected to an antenna(s) for transmitting accelerometer information, MTMA information, and/or action determination information, depending upon the implementation.

Optionally, the WCD 104 may be equipped with a user input device(s), a user output device, or a combination thereof, denoted by I/O device(s) 120. For example, the WCD 104 may be equipped with a keyboard (soft or hard), a display, etc.

The accelerometer 116 can be one that is designed to output data with respect to one, two, or three axes, depending upon the MTMAs to be identified. In the preferred embodiment, the accelerometer 116 produces acceleration data with respect to three axes (arbitrarily identified by an x, y, z coordinate system).

F. Sensor Output Data Structures

Inertial sensors 116 that can be used in connection with the present disclosure include, for example, an accelerometer to measure linear acceleration and earth gravity vectors, a gyroscope to measure angular velocity, a magnetometer to measure earth's magnetic fields for heading determinations, or a combination thereof. These sensors can be one, two, or three axis devices. The devices can be integrated together in the same device. For example, the model ADIS16400/ADIS16405 iSensor, which is commercially available microelectromechanical system (MEMS) from Analog Devices, Inc., U.S.A., has a triaxial gyroscope, a triaxial accelerometer, and a triaxial magnetometer. Simply put, to achieve better accuracy, information should be analyzed in connection with as many degrees of freedom (DOF) as possible.

Furthermore, a sensor 116 in the form of a pressure sensor that can measure air pressure can be used to directly determine altitude.

FIG. 3A is an example of an output data structure from the three-axis accelerometer 116 that can be employed as one of the sensors of FIG. 2D. The accelerometer 116 can be a commercially available MEMS device. As shown, the accelerometer output data 120 includes a time stamp value 120a, an acceleration value 120b along an x-axis, an acceleration value 120c along a y-axis, and an acceleration 120d along a z-axis. The aforementioned values are typically produced as an output from an analog-to-digital convertor (ADC). The x, y, and z axes are orthogonal. Acceleration g in connection with an axis is equal to the rate of change of velocity along the axis.

In some embodiments, it would be possible to determine the MTMA 105 with an accelerometer 116 alone that produces acceleration data along one axis. For example, if the only relevant MTMAs are standing and moving, then identification could be accomplished with such an accelerometer 116. Furthermore, the data only need be analyzed in the time domain to make the identification.

FIG. 3B is an example of an output data structure from a three-axis gyroscope 116 that can be employed as one of the sensors of FIG. 2D. The gyroscope 116 can be a commercially available microelectromechanical system (MEMS) device. As shown, the gyroscope output data 121 includes a time stamp value 121a, an angular rate of change (velocity) value 121b about an x-axis, an angular rate of change value 121c about a y-axis, and an angular rate of change value 121d about a z-axis. The aforementioned values are typically produced as an output from an analog-to-digital convertor (ADC). The x, y, and z axes are orthogonal.

In some embodiments, it would be possible to determine the MTMA 105 with a gyroscope 116 alone that produces data about one axis. For example, if the only relevant MTMAs are standing and moving, then identification could be accomplished with such a gyroscope 116. Furthermore, the data only need be analyzed in the time domain to make the identification.

FIG. 3C is an example of an output data structure from a three-axis magnetometer 116 that can be employed as one of the sensors of FIG. 2D. The magnetometer 116 can be a commercially available microelectromechanical system (MEMS) device. As shown, the magnetometer output data 122 includes a time stamp value 122a, a magnetic field strength value 122b along an x-axis, a magnetic field strength value 122c along a y-axis, and a magnetic field strength value 122d along a z-axis. The aforementioned values are typically produced as an output from an analog-to-digital convertor (ADC). The x, y, and z axes are orthogonal.

In some embodiments, it would be possible to determine the MTMA 105 with a magnetometer 116 alone that produces data along one axis. For example, if the only relevant MTMAs are standing and moving, then identification could be accomplished with such a magnetometer 116. Furthermore, the data only need be analyzed in the time domain to make the identification.

G. MAI System

1. First Set of Embodiments

Figure 4A:
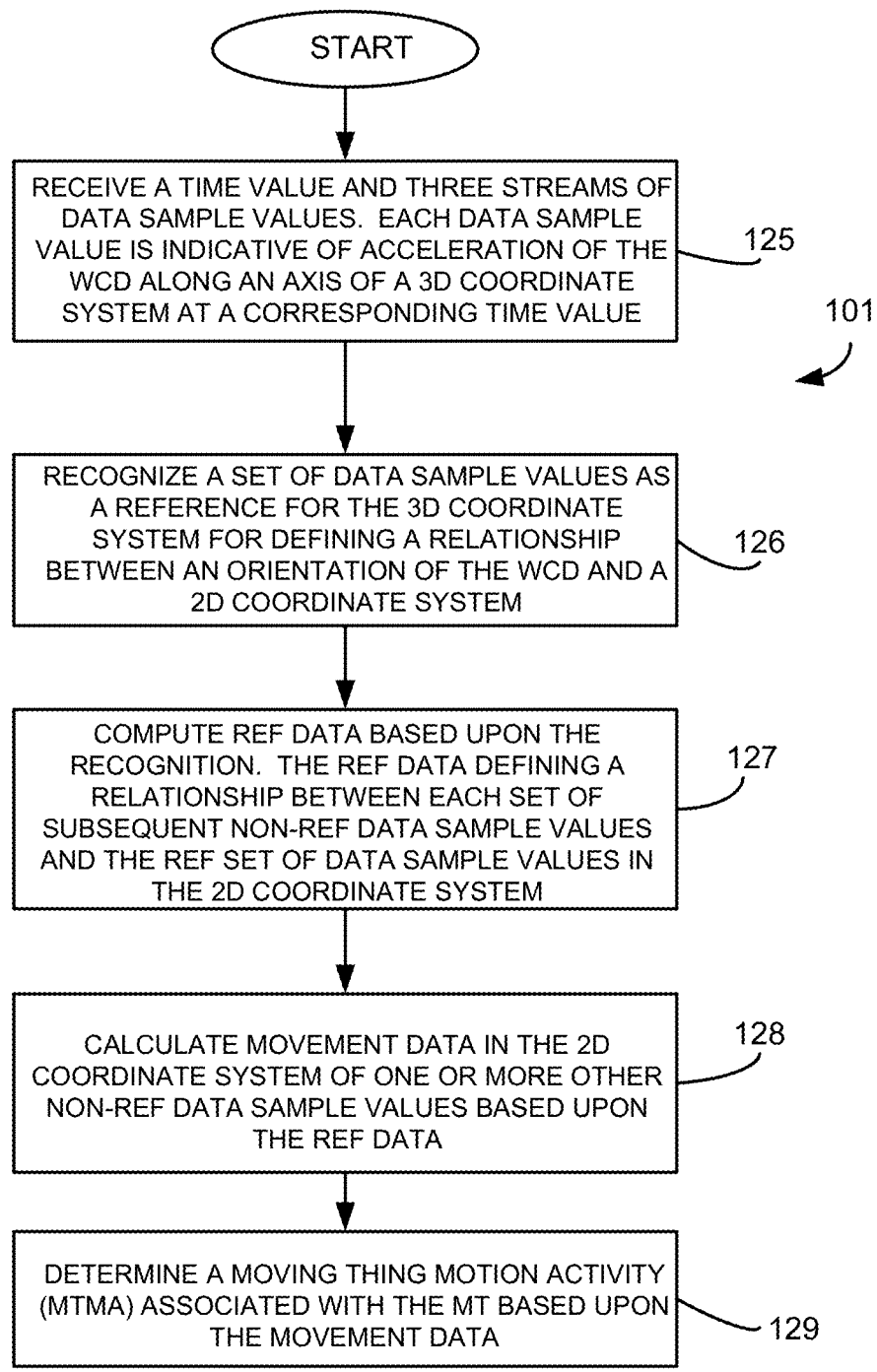
FIG. 4A is a flowchart of an example of a first set of embodiments of the MAI system of FIG. 2D.

FIG. 4A is a flowchart of an example of a first set of embodiments of the MAI system 101 of FIG. 2D. In these embodiments, as shown in FIG. 4A, the MAI system 101 includes at least the following program code (or logic): program code 125 that receives a time value 121 (FIG. 3) and three streams of data sample values 122, 123, 124 (FIG. 3) from the accelerometer 116 (FIG. 2D) of the WCD 104 that is transported by the MT 104, each data sample value 122, 123, 124 indicative of acceleration of the WCD 104 along an axis of a three dimensional (3D) coordinate system at a corresponding time value 121; program code 126 that recognizes a particular set (vector) of data sample values as a reference in the 3D coordinate system for defining a relationship between an orientation of the WCD 104 and a two dimensional (2D) coordinate system; program code 127 that computes reference data (e.g., a rotation matrix) based upon the recognition of the particular set, the reference data defining a relationship between each set of subsequent non-reference data sample values and the particular reference set of data sample values in the 2D coordinate system; program code 128 that calculates movement data in the 2D coordinate system of one or more other non-reference data sample values based upon the reference data; and program code 129 that determines the MTMA 105 associated with the MT 104 based upon analyzing the movement data.

In some embodiments, the program code 126 identifies the reference set 120 (FIG. 3) as the set 120 of data sample values that when treated as a 3D vector and mathematically combined to compute the magnitude, results in a resultant magnitude value that is indicative of a relationship to Earth gravity, e.g., the resultant magnitude value is equal to one within a predefined range of error (e.g., the range of 1+0.02 and 1−0.02). In essence, this set 120 of acceleration values is recognized as a vector pointing toward Earth gravity. Reference data (e.g., a rotation matrix) is computed based upon this Earth gravity vector in 3D space so that data sample values can be analyzed in 2D space. Said another way, a vector pointing toward Earth gravity is aligned with the z-axis. So, the two dimensions in space that are defined are the z-axis and the x-y plane for MTMA analysis and identification. As will be further discussed in this document, magnitudes of the data sample values are determined in the two dimensions of space and then statistical metrics are computed based upon the magnitudes, in the time and frequency domains.

Furthermore, in the preferred embodiment, the reference data is updated each time the particular reference set 120 of data samples 121, 122, 123, 124 is recognized. This could be performed less frequently, if desired, depending upon the implementation.

In the preferred embodiments, the reference data is a rotation matrix that rotates new data so that the data is normalized in the 2D space. However, in some embodiments, the reference data can be represented by vector information that is different than a rotation matrix.

In some embodiments, the program code 128 that generates the movement data may be designed to generate the movement data in the form of a vertical magnitude along the z axis and a horizontal magnitude in the x, y plane, both derived from a rotated vector, the rotated vector equal to the rotation matrix M multiplied by the vector associated with the other non-reference data sample values x, y, z. Furthermore, the program code 128 may be designed to transform the movement data to the frequency domain (FD) to produce FD data and to compute one or more FD statistical metrics from the FD data, so that the program code 129 can identify the MTMA 105 is based at least in part upon the FD statistical metrics.

In some embodiments, the MTMA 105 may be identified from a set of known MTMAs 105. In these embodiments, the program code 129 can perform a comparative analysis in order to help determine the MTMA 105. As an example, the program code 129 may be designed to compute a score for each MTMA 105 of the known set and to compare the scores to accurately identify the MTMA 105.

2. Second Set of Embodiments

Figures 4B, 4C:
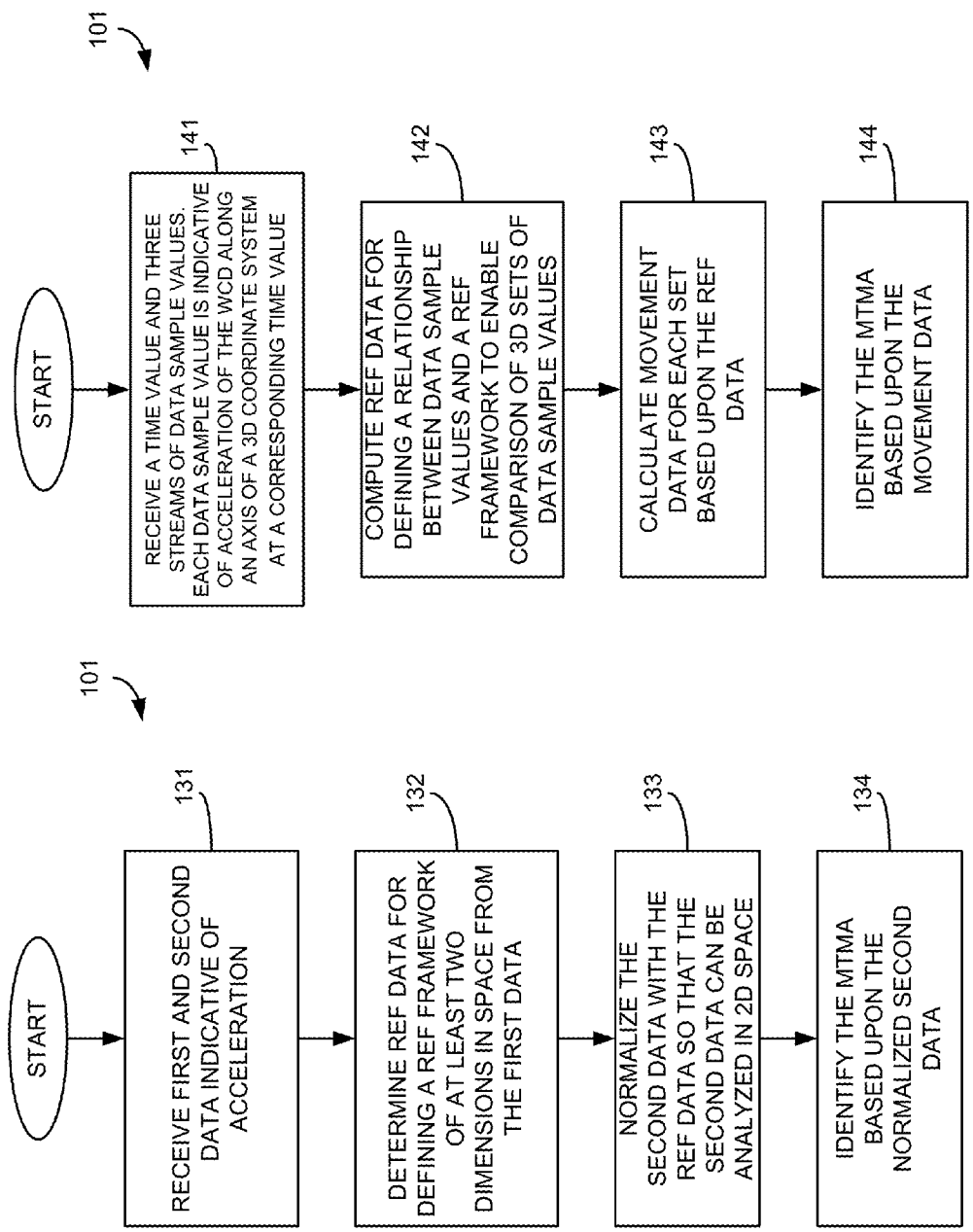
FIG. 4B is a flowchart of an example of a second set of embodiments of the MAI system of FIG. 2D.
FIG. 4C is a flowchart of an example of a third set of embodiments of the MAI system of FIG. 2D.

FIG. 4B is a flowchart of an example of a second set of embodiments of the MAI system 101 of FIG. 2D. In these embodiments, as shown in FIG. 4B, the MAI system 101 includes at least the following program code (or logic): program code 131 designed to receive first and second data indicative of acceleration of the WCD 104; program code 132 designed to determine reference data (e.g., a rotation matrix) for defining a reference framework in two dimensions (2D) of space from the first data; program code 133 designed to normalize (e.g., rotating) the second data with the reference data so that the second data can be analyzed in the 2D space; and program code 134 designed to identify the MTMA 105 based upon the normalized second data. The second data may comprise a series of periodic sets 120 of data values.

In the preferred embodiment, the first data is the data structure 120 (FIG. 3) having a combined magnitude equal to one within a predefined range of error (i.e., the range of 1+0.02 and 1−0.02). Moreover, the reference data is preferably a rotation matrix that is frequently updated and that is used to normalize second data samples so that all samples are aligned with Earth gravity and can be more accurately analyzed in 2D space. However, as previously described, in some embodiments, the reference data can be represented by vector information that is different than a rotation matrix.

In some embodiments, including the preferred embodiment, the program code 133 and/or the program code 134 may be designed to calculate a vertical magnitude along the z-axis and a horizontal magnitude in the x-y plane in the time domain, and may be designed to statistically analyze these values to assist in identifying the most probable MTMA 105. The time domain values that can be analyzed, among others, are as follows: an average magnitude along the z-axis, an SD of the z-axis magnitude, an average magnitude in the x-y plane, and SD of the x-y plane magnitude.

In some embodiments, including the preferred embodiment, the program code 133 and/or the program code 134 may be designed to transform the normalized second data from time domain data to frequency domain data using FT, and may be designed to analyze the frequency domain data along with the time domain data in order to accurately identify the MTMA 105.

In some embodiments, the MTMA 105 may be identified from a set of known MTMAs 105. In these embodiments, the program code 134 can perform a comparative analysis in order to help determine the MTMA 105. As an example, the program code 133 and/or program code 134 may be designed to compute a score for each MTMA 105 of the known set and to compare the scores to accurately identify the MTMA 105.

3. Third Set of Embodiments

FIG. 4C is a flowchart of an example of a third set of embodiments of the MAI system 101 of FIG. 2D. In these embodiments, as shown in FIG. 4C, the MAI system 101 includes at least the following program code (or logic): program code 141 designed to receive a time value and three streams of data sample values from the accelerometer 116 of the WCD 104 that is transported by the MT 106, each data sample value indicative of an acceleration of the WCD 104 along an axis of a three dimensional (3D) coordinate system at a corresponding time value; program code 142 designed to compute reference data, the reference data defining a relationship between data sample values and a reference framework to enable comparison of 3D sets 120 of data sample values; program code 143 designed to calculate movement data for each set 120 based upon the reference data; and program code 144 designed to determine the MTMA 105 associated with the MT 106 based upon the movement data.

In some embodiments, the program code 142 identifies the reference set 120 (FIG. 3) as the set 120 of data sample values that when treated as a 3D vector and mathematically combined to compute the magnitude, results in a resultant magnitude value that is indicative of a relationship to Earth gravity, e.g., the resultant magnitude value is equal to one within a predefined range of error (e.g., the range of 1+0.02 and 1−0.02. However, as previously described, in some embodiments, the reference data can be represented by vector information that is different than a rotation matrix.

Furthermore, in the preferred embodiment, the reference data is updated by the program code 142 each time the particular reference set 120 of data samples 121, 122, 123, 124 is recognized. This could be performed less frequently, if desired, depending upon the implementation.

In some embodiments, the program code 143 that generates the movement data may be designed to generate the movement data in the form of a vertical magnitude along the z axis and a horizontal magnitude in the x, y plane, both derived from a rotated vector, the rotated vector equal to the rotation matrix M multiplied by the vector associated with the other non-reference data sample values (x, y, z). Furthermore, the program code 143 may be designed to transform the movement data to the frequency domain (FD) to produce FD data and to compute one or more FD statistical metrics from the FD data, so that the program code 144 can identify the MTMA 105 is based at least in part upon the FD statistical metrics.

In some embodiments, the MTMA 105 may be identified from a set of known MTMAs 105. In these embodiments, the program code 143 and/or program code 144 can be designed to perform a comparative analysis in order to help determine the MTMA 105. As an example, the program code 143 and/or the program code 144 may be designed to compute a score for each MTMA 105 of the known set and to compare the scores so that the program code 144 can accurately identify the MTMA 105.

4. Fourth Set of Embodiments

Figure 7:
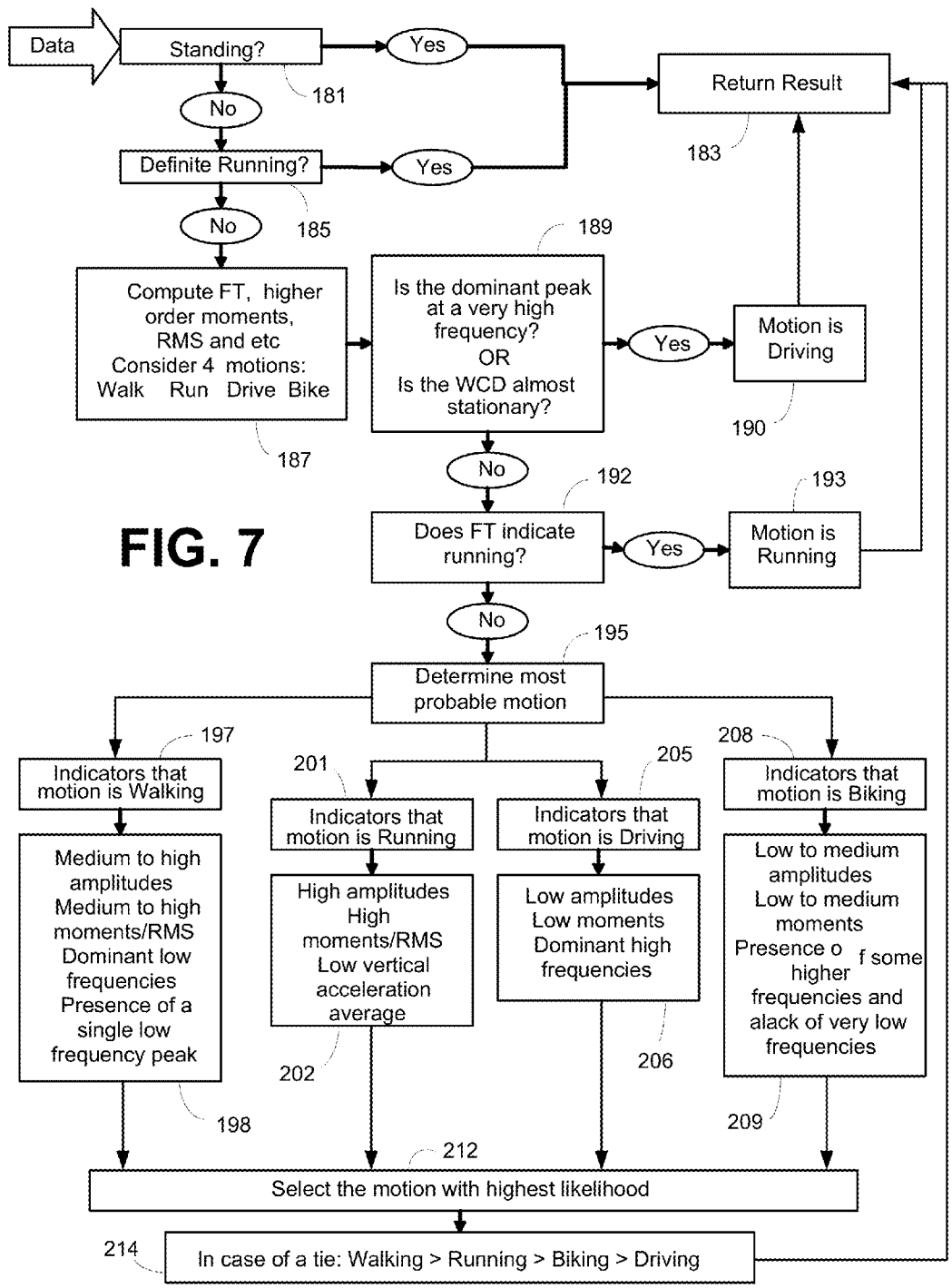
FIG. 7 is a flowchart showing an example of a fourth set of embodiments of the MAI system of FIG. 2D, wherein the MAI system is used to identify a most probable MTMA from a set of 5 MTMAs, including (1) standing, (2) walking, (3) running, (4) biking, and (5) driving (including travel in a motorized vehicle, such as, but not limited to, an automobile, public transit, etc.).

A fourth set of embodiments of the MAI system 101, which is the preferred set, will now be described with reference to FIGS. 5-7. A normalization process (rotation of coordinate system will be described with respect to FIG. 5. Some statistical parameters that are used in the analysis will be described in connection with FIG. 6. Furthermore, FIG. 7 is a flowchart showing an example of the third set of embodiments of the MAI system of FIG. 2D, wherein the MAI system is used to identify a most probable MTMA from a set of 5 MTMAs, including (1) standing, (2) walking, (3) running, (4) biking, and (5) driving.

a. Rotation of the Axes

FIG. 5 is an example of a methodology that can be used by the MAI system 101 to establish a reference framework in two dimensions of space (essentially a cylindrical coordinate system, wherein the reference framework enables normalization of sampled data so that sampled data can be intelligently compared. As shown in FIG. 5, the process for rotating the coordinate system with respect to gravity is as follows in the preferred embodiment:

1. Earth gravity has net magnitude of 1, and the direction is always downward.

2. Earth gravity is always present, so if the net acceleration magnitude is not 1, then the other forces are present in the system (motion of the body).

3. If the net acceleration magnitude is detected to be 1, then only gravity is felt at that point and, therefore, the direction of the vector is the downward direction.

4. These, effectively stationary, points can be found by selecting data points with magnitude sufficiently close to 1. For example, within 6=0.02 of one. Use this direction of this vector as the positive z-axis.

5. Experimentally, these points are found 3-6 times per second, in the preferred embodiment. Thus, even if a point is falsely classified as stationary, the MAI system 101 will quickly self-correct.

6. Compute the rotation matrix which will rotate the position of this reference point (x, y, z) to be on the positive z-axis, point (0, 0, 1).

7. This rotation matrix is determined in two steps: (1) Rotate about the x-axis so that the y-coordinate is zero; and (2) Rotate about the y-axis so that the x-coordinate is zero.

8. The two steps can be done in reverse to obtain a different rotation matrix, which would still orient the vector along positive z-axis.

9. For the subsequent points which are not within 6 of one, the same rotation matrix is used, since the WCD 104 cannot significantly change orientation that frequently.

10. There is more than one unique matrix which ensures that the gravity is oriented along the vertical axis (positive or negative direction).

11. The x and y coordinates of non-stationary points would be different depending on how the rotation is performed.

12. The magnitude of the net horizontal acceleration will be the same regardless of which matrix that is used.

13. The vector may also be rotated about the z-axis in the xy-plane. In some embodiments, this may rely on data from gyroscope, compass, etc.

14. When the next point within 6 of one is reached, a new rotation matrix is generated.

15. The old rotation matrix is updated

An example of a vector used to determine gravity is as follows:

$$V_{start}=(0.3, 0.8, 0.52)$$

Since $\sqrt{0.3^2+0.8^2+0.52^2}=\sqrt{1.0004}\approx 1.0002$ is within 0.02 of 1, then the vector is rotated to be oriented along the positive vertical axis:

$$V_{rot}=(0,0,1.0002)$$

And a matrix M is created so that:

$$V_{rot}=M V_{start}$$

After rotation, the other two coordinates x, y are 0 (or on the order of machine epsilon, depending on how the rotation is implemented). Current C++ code merely sets them to be zero, but with a MATLAB implementation, which actually does the matrix multiplication, the x, y coordinate are on the order of 1e-16 due to internal rounding errors.

This matrix M is then used to rotate the subsequent data points until a new matrix is found. It is also possible for the number of the subsequent points using this matrix M to be as little as zero if there are two consecutive stationary points, but typically, approximately 10-20 points are rotated before the matrix is updated.

b. Statistical Parameters

FIG. 6 is a description of statistical parameters in the time domain and the frequency domain that can be utilized by the MAI system of FIG. 2D to identify a most probable MTMA.

i. Basic Parameters

With reference to FIG. 6, the basic parameters that are used by the MAI system 101 in the time domain are as follows:

1. Average, mean, and/or median of the data set. These are a measure of where the data is centered.

2. SD and/or variance. These are a measure of how wide the data is distributed.

3. The foregoing parameters can be calculated from the whole interval or a partial interval. For example, an average of the first half of data points or an average of only one (or more) components can be computed and used in the analysis.

4. The MAI system 101 can also calculate average/variance of sets of points selected from the data, such as the average of peak values. Also, the MAI system 101 can average several data intervals over a prolonged period of time.

5. Averaging and variance alone can obtain a certain degree of accuracy, requiring very little computation time and in some cases are sufficient.

6. It is possible to apply these basic methods without rotating the data.

7. After a certain accuracy is obtained with average and variance alone, it is very difficult to improve it without resorting to more sophisticated methods.

ii. Advanced Parameters

With reference to FIG. 6, the advanced parameters that are used by the MAI system 101 in the time domain are as follows:

1. Higher order moments, calculated about mean, zero, and/or other value. An example of a higher order moment, say $4^{th}$ order moment about its mean, is proportional to:

$$\sum_{i=1}^{n}(v_i-\mu)^4$$

Where n is the number of data points, $v_1$ to $v_n$ are the data values and $\mu$ is the mean.

2. Root mean square (RMS; also can be used as an alternative to SD) or generalized mean.

3. Signal magnitude area, that is, the area encompassed by the magnitude of the signal.

iii. Fourier Transform (FT)

With reference to FIG. 6, the parameters that are analyzed by the MAI system 101 in the frequency domain are as follows:

1. The MAI system 101 identifies the peaks, which give the amplitude and frequency of all the oscillatory motions present in the data.

2. The human motion activity, such as walking or running, tends to have lower frequencies and motion activity with a transport (car, bike, etc.) has higher frequencies. Thus, the above techniques (averaging, computing RMS, etc.) are applied in higher and lower frequency regions to compare their strength.

c. Architecture/Operation

FIG. 7 is a flowchart showing an example of the architecture and operation of the third set of embodiments of the MAI system of FIG. 2D, wherein the MAI system is used to identify a most probable MTMA from a set of 5 MTMAs, including (1) standing, (2) walking, (3) running, (4) biking, and (5) driving. This set of embodiments is essentially an even more specific version of the first set of embodiments (FIG. 4A).

i. Analysis for Stationary (Stopped, Standing)

Figure 8:
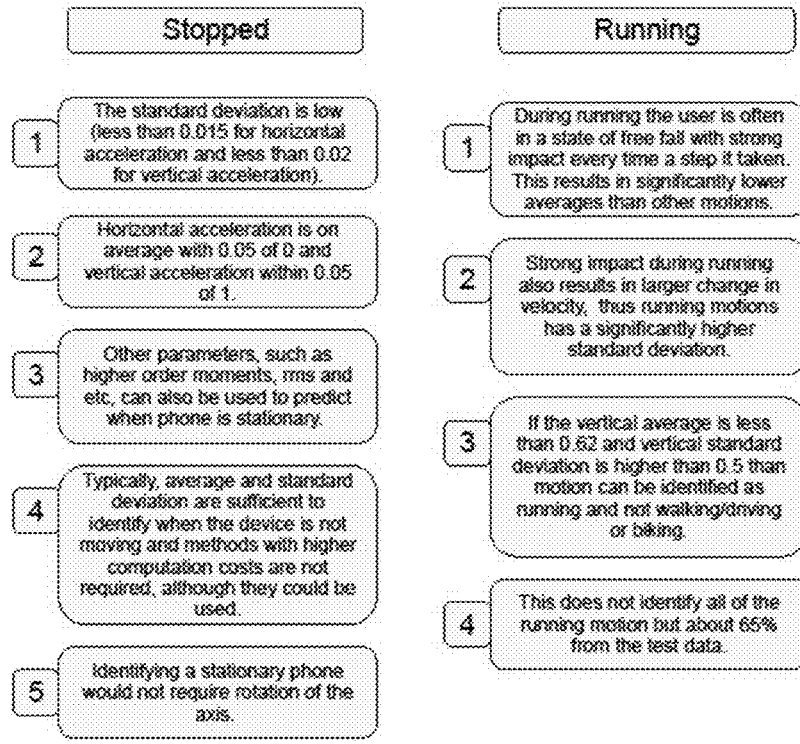
FIG. 8 is a description of parameters/methodology in the time domain, which relies on basic parameters only (see FIG. 6), that can be used by the MAI system of FIG. 2D to quickly identify whether the MTMA is stopped or is running (as these MTMAs are more sometimes easily identified than the others) in the exemplary methodology of FIG. 7.

With reference to FIG. 7, as shown at block 181, a determination is made by the logic as to whether the WCD 104 is stationary (stopped, standing). FIG. 8 illustrates the process that is utilized to make this determination, as follows:

1. The SD is sufficiently low (one possible threshold used is less than 0.015 for horizontal acceleration and less than 0.02 for vertical acceleration).

2. Horizontal acceleration is on average sufficiently close to zero (for example, within 0.05 of 0) and vertical acceleration is on average sufficiently close to one (for example, within 0.05 of 1).

3. Other parameters, such as higher order moments, RMS, etc, can also be used to predict when WCD 104 is stationary.

4. Typically, average and SD are sufficient to identify when the WCD 104 is not moving and methods with higher computation costs are not required, although they could be used.

5. Identifying a stationary WCD 104 would not require rotation of the axis.

When a determination is made that the WCD 104 is stationary, then the MAI system 101 will return this as the result, as indicated by block 183 of FIG. 7. However, when a determination is made that the WCD 104 is not stationary, then the MAI system 101 will attempt to determine if the MT 106 associated with the WCD 104 is running, as shown at block 185.

ii. Analysis for Running (First Time)

As shown in FIG. 8, the analysis performed at block 185 is as follows:

1. During running, the user is often in a state of free fall with strong impact every time a step it taken. This results in significantly lower averages than other motion activities.

2. Strong impact during running also results in larger change in velocity. Thus, the running motion activity has a significantly higher SD.

3. One possible embodiment is the vertical average less than 0.62 and the vertical SD higher than 0.5, then the MTMA 105 can be identified as running and not walking/driving or biking.

4. This does not identify all of the running motion activities but about 65% of the test group data.

When a determination is made that the WCD 104 is running, then the MAI system 101 will return this as the result, as indicated by block 183 of FIG. 7. However, when a determination is made that it cannot be concluded with sufficient probability that the MT 106 associated with the WCD 104 is running, then the MAI system 101 will transform the horizontal and vertical magnitudes from the time domain to the frequency domain using the FT, as shown at block 187, so that all 4 motion activities can be considered.

iii. Analysis for Driving (First Time)

At this point, the MAI system 101 will attempt to determine if the MTMA 105 is driving with the analysis set forth in block 189 of FIG. 7. A first inquiry is made as to whether the dominant peak is at a very high frequency. If so, then the MAI system 101 concludes that the MTMA 105 is driving, as indicated at block 190 and the result or a variant thereof is communicated to the action determination system 102, as indicated by block 183. If not, then the MAI system 101 will make a second inquiry.

The second inquiry involves determining if the WCD 104 is almost stationary. This is accomplished by identifying low SD in both vertical and horizontal directions, identifying on average a sufficiently small horizontal acceleration and determining that FT shows no peaks or peaks with very low amplitude. If so, then the MAI system 101 concludes that the MTMA 105 is driving, as indicated at block 190, and the result or a variant thereof is communicated to the action determination system 102, as indicated by block 183.

iv. Analysis for Running (Second Time)

If not, then the logic of the MTMA system 101 makes a determination as to whether the frequency domain magnitudes indicate running, as indicated by block 192. This is accomplished by identifying a low frequency peak with sufficiently high amplitude. If so, then the MAI system 101 concludes that the MTMA 105 is running, as indicated by block 193, and the result or a variant thereof is communicated to the action determination system 102, as indicated by block 183.

If not, then the logic of the MTMA system 101 will attempt to determine the MTMA 105 with comparative analysis, as is shown by block 195. Parameters that are considered for walking are indicated at blocks 197, 198. Parameters that are considered for running are indicated at blocks 201, 202. Parameters that are considered for driving are indicated at blocks 205, 206. Parameters that are considered for biking are indicated at blocks 208, 209. As indicated by block 212 in FIG. 7, the MTMA 105 with the highest likelihood is ultimately selected. If there is a tie in terms of scores or probabilities, then the following preference scheme is used in the preferred embodiment, as is shown at block 214: walking is selected over running, biking, and driving; running is selected over biking and driving; and biking is selected over driving. This hierarchy is based on the experimental test group for the five motions and may be different when the number of motions is increased. Finally, the result of the comparative analysis is reported by the MAI system 101 to the AD system 102, as indicated at block 183.

v. Identifying Most Probable MTMA with Comparative Analysis

Figure 9:
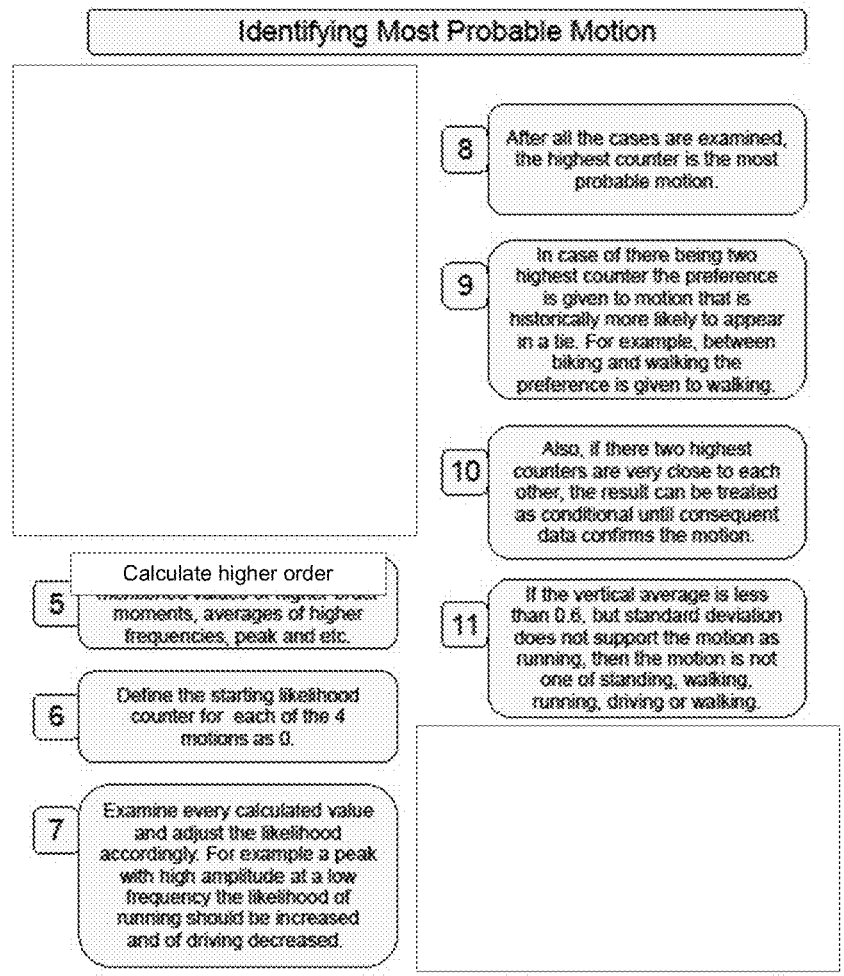
FIG. 9 is a description of parameters/methodology in the time domain and frequency domain that can be used by the MAI system of FIG. 2D to identify the most probable MTMA from the set of MTMAs in the exemplary methodology of FIG. 7.

FIG. 9 shows the methodology that the MAI system 101 utilizes for identifying a most probable MTMA 105 based upon a comparative analysis (comparing probabilities). Previously, the MAI system 101 attempted to identify cases of the WCD 104 being stationary based on average and SD. If the WCD 104 is involved in a motion activity, then the MAI system 101 checks if the MT 106 is running based on low average and high SD. If the vertical average is higher than 0.6, and the data was not identified as stationary, then the motion activity could be walking, running, driving, or biking. So, Fourier transforms of the acceleration components and several higher order moments were computed and the data will now be analyzed, as follows.

1. Calculate the previously mentioned values of higher order moments, averages of higher frequencies, FT, etc.

2. Define the starting likelihood counter for each of the 4 motion activities as 0.

3. Examine every calculated parameter and adjust the likelihood of each motion, accordingly. For example, if there is a peak with high amplitude at a low frequency the likelihood of running should be increased and of driving decreased.

4. After all the cases are examined, the highest counter indicates the most probable motion activity.

5. In a case where there are two or more highest counters, the preference is given to motion activity that is historically more likely to appear in a tie. For example, between biking and walking the preference is given to walking.

6. Also, if two highest counters are very close to each other, the result can be treated as conditional until later data confirms the motion activity.

7. If the vertical average is less than 0.6, but the SD does not support the motion activity as running, then the MTMA 105 is not one of standing, walking, running, driving or walking. This result may happen when the device is dropped, picked up, or the user made a sudden motion while in possession of device. Sudden movements as such may affect the average but since they are not repetitive, they will not significantly increase SD or significantly affect the FT. This case is rare and identified as none of the 5 motions.

The methodology employed in 195 computes the likelihood of each motion based on comparing each parameter value to a set of threshold values. For example, high standard deviation significantly increases the likelihood that MTMA is running, somewhat increases the likelihood that MTMA is walking, decreases the likelihood of biking and significantly decreases the likelihood of driving. Once all the parameters are compared, the result is four numbers, which may be positive or negative, indicating the likelihood of each motion, from which the MTMA is identified.

It is possible to compute a confidence value for the identified MTMA based on how close the four likelihood counters are. One possible non-unique implementation of this is to calculate the differences between the counters and the value one below the lowest counter. Then compute the percentages of each difference out of the total. For example, if the counters for walking, running, driving and biking are 4, 3, −2 and 7 respectively, then MTMA is identified as biking, and then the confidence percentage can be computed as follows:

$$\text{Total difference: } (4-(-3)) + (3-(-3)) + (-2-(-3)) + (7-(-3)) =$$
$$7 + 6 + 1 + 10 = 24$$

Percentage Walking $4/24 = 16.7\%$

Percentage Running $1/24 = 12.5\%$

Percentage Driving $1/24 = 4.2\%$

Percentage Biking $10/24 = 41.7\%$

The percentage values can be used to determine confidence of the MTMA identification. If the certainty is insufficiently high, the result can be treated as conditional until the subsequent data confirms the MTMA.

The aforementioned cases of stopped (181), running (185, 192) and driving (189) could be identified from the MTMA comparative analysis as well. The purpose of examining the cases earlier is to save on computational cost and time. If the complexity of the algorithm is changed/adjusted to accommodate new types of motion, it is likely those cases will be subject to change.

vi. Analysis for Walking (First Time)

FIG. 10A illustrates the methodology and parameters in the time domain and frequency domain that can be used by the MAI system 101 to analyze whether the MTMA 105 is walking.

FIG. 10B is an example of time domain and frequency domain graphs, in connection with walking, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

Overall, walking can be characterized by dominant low frequency motion activities and low frequency peaks.

One nonlimiting example of the methodology is shown in FIG. 10A and is as follows:

1. If 3rd order moment of horizontal acceleration about zero is above a certain threshold, reduce walking likelihood by one.

2. If the average of FT is significantly higher than the average higher frequency, then increase the likelihood of walking.

3. If RMS of the net acceleration vector is sufficiently high, then increase likelihood of walking accordingly.

4. If 4th order moment about zero is too low, reduce the likelihood of walking and if the moment is sufficiently high, increase it.

5. If FT only shows motions with very low amplitude and there is very little motion, and low SD (a case resembling standing), then reduce likelihood of walking by two.

6. If RMS of the vertical acceleration is above a certain threshold, then reduce likelihood of walking accordingly.

7. If there are no peaks present in FT, reduce likelihood of walking.

8. If the highest peak is at a slightly higher frequency and has sufficiently low amplitude, reduce likelihood of walking.

9. If there is a prominent peak at low frequency, then increase the likelihood of walking.

vii. Analysis for Running (Third Time)

FIG. 11A illustrates the methodology and parameters in the time domain and frequency domain that can be used by the MAI system 101 to analyze running.

FIG. 11B is an example of time domain and frequency domain graphs, in connection with running, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

One nonlimiting example of the methodology is shown in FIG. 11A and is as follows:

1. About 65% of running can be identified based on average and SD alone.

2. Running is still a possible motion activity if the average is high.

3. If there is presence of high amplitude at a low frequency and the average vertical acceleration is still less than one, then the motion is identified as running and analysis terminated (192).

4. If the average of FT is less than twice the average higher frequency, then reduce the likelihood of running. If it is greater than 2.5 times the higher frequency, then increase the likelihood slightly.

5. If the SDs (both vertical and horizontal) are significantly high, then increase the likelihood of running.

6. If the 4th order moment of the vertical acceleration about zero is above two, increase the likelihood by one.

7. If there is very little activity (low SD, lack of peaks in the Fourier transform) then running is almost certainly not the motion activity.

8. If the RMS of the vertical acceleration about zero is sufficiently high, increase the likelihood of running.

viii. Analysis for Driving (Second Time)

FIG. 12A is a description of methodology and parameters in the time domain and frequency domain that can be used by the MAI system 101 to analyze driving.

FIG. 12B is an example of time domain and frequency domain graphs, in connection with driving, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

One nonlimiting example of the methodology is shown in FIG. 12A and is as follows:

1. If 3rd order moments of horizontal and vertical accelerations about zero are sufficiently high, then reduce driving likelihood.

2. If 3rd order moment of horizontal acceleration about its mean is above a certain threshold, reduce driving likelihood.

3. If the average of FT is less than twice the average higher frequency, then increase the likelihood of driving (amount of increase depends on how significant the difference is).

4. If the average of FT is significantly higher than the average of higher frequency, then reduce likelihood of driving.

5. If SD (for both vertical and horizontal accelerations) is significantly high, reduce the likelihood of driving.

6. If RMS of the net acceleration vector is large, then reduce likelihood of driving accordingly.

7. If 4th order moment about zero is small enough, increase the likelihood of driving and if the moment is large, reduce it.

8. If FT only shows motions with very low amplitude, and there is very little motion, low SD (a case resembling standing), then increase driving likelihood significantly.

9. If the highest amplitude present is at a very high frequency, then the motion activity should be driving and method can be terminated with results returned (189).

10. A singular peak tends to correspond to the motion activity of biking and in order to reduce the false biking identification during driving, if that singular has relatively low amplitude, then increase likelihood of driving as well.

11. If the highest peak has low amplitude or there are no peaks found, then increase likelihood of driving by 1.

12. Driving can be characterized by limited motion, presence (or dominance) of high frequencies.

ix. Analysis for Biking (First Time)

FIG. 13A is a description of parameters/methodology in the time domain and frequency domain that can be used by the MAI system of FIG. 2D to analyze biking.

FIG. 13B is an example of time domain and frequency domain graphs, in connection with biking, that shows an example of each of the following (left to right, top then bottom): (1) acceleration versus time along the vertical axis (z-axis) of the reference coordinated system over a time period, (2) acceleration versus time in the horizontal plane (x-y plane) of the reference coordinate system over the same time period, (3) amplitude versus frequency along the vertical axis (z-axis) of the reference coordinate system over the same time period, (4) amplitude versus frequency in the horizontal plane (x-y plane) of the reference coordinate system over the same time period.

One nonlimiting example of the methodology is shown in FIG. 13A and is as follows:

1. If the average of FT is less than 2.5 times the average higher frequency, then increase the likelihood of biking (amount of increase depends on how significant the difference is).

2. If RMS of the net acceleration vector is above a certain threshold, then reduce likelihood of biking.

3. If the horizontal SD is significantly high, then reduce the likelihood of biking.

4. If the 4th order moment of vertical acceleration about zero is less than a certain threshold, increase the likelihood of biking.

5. If the RMS of the vertical acceleration is sufficiently small, increase the likelihood of biking, and if it is sufficiently high, reduce it.

6. If the peaks is of low to medium amplitude and is at a sufficiently high frequency, increase likelihood of biking.

7. If FT analysis yields a singular peak, much more dominant than the rest, increase likelihood of biking.

5. Fifth Set of Embodiments

FIG. 4D is a flowchart of an example of a fifth set of embodiments of the MAI system 101 of FIG. 2D. In these embodiments, as shown in FIG. 4D, the MAI system 101 includes at least the following program code (or logic): program code 151 designed to receive a plurality of data streams from a respective plurality of sensors 116 of a WCD 104 that is transported by an MT 106; program code 152 designed to normalize each data stream with respect to a reference; program code 153 designed to mathematically combine the normalized data streams; and program code 154 designed to identify an MTMA 105 associated with the MT 106 based upon the combined normalized data streams.

In some embodiments, the program code 152 can be designed with code to create a rotation matrix to translate data relative to the reference and to achieve normalization by rotating incoming data with the rotation matrix. The reference can be Earth gravity, the direction North, etc.

In some embodiments, the sensors 116 can include both an accelerometer and a gyroscope. The accelerometer data can be mathematically combined with the gyroscope data, after normalization, in order to construct a better more accurate framework for identifying the MTMA 105. As an example of how the data can be combined, see "A Guide To Using (Accelerometer and Gyroscope Devices) In Embedded Applications," http://www.starline.com/imu_guide.html (Dec. 29, 2009), which is entirely incorporated herein by reference. Another example of a methodology for combining the data is described in Colton, "The Balance Filter," Chief Delphi white paper (Jun. 25, 2007), which is incorporated herein by reference in its entirety. Furthermore, an example of a commercially available MEMS device that has both a triaxial accelerometer and a triaxial gyroscope and that can be used in the WCD 104 is the model MPU-6000/605 Six-Axis MEMS MotionTracking Device, which is available from InvenSense, Inc, U.S.A.

In some embodiments, the sensors 116 may include a magnetometer(s), which can assist in determining the direction North. As mentioned, the direction North can be used as the reference for the rotation matrix.

In some embodiments, the sensors 116 include an accelerometer, a gyroscope, and a magnetometer. As an example, the WCD 104 may employ the model ADIS16400/ADIS16405 iSensor, which is commercially available microelectromechanical system (MEMS) from Analog Devices, Inc., U.S.A. This device has a triaxial gyroscope, a triaxial accelerometer, and a triaxial magnetometer. An accurate rotation matrix based upon either Earth gravity or direction North can be computed and used to normalize data.

In some embodiments, the sensors 116 may include a pressure sensor, which can be used to extrapolate altitude based upon measured air pressure. An algorithm 113 (FIG. 2D) can be employed to tentatively identify an MTMA 105 based upon the other sensors 116 and then check the pressure sensor to determine if the tentatively identified MTMA 105 makes sense. For example, if it is determined that the MT 106 is flying, then the measured air pressure should correspond with a pressure at a high altitude.

In some embodiments, the sensors 116 may include a GPS receiver, which produces location data that can also be used to also help more accurately identify the MTMA 105. In these embodiments, the WCD 104 has access to map data (stored locally or fetched remotely) so that the WCD map location can be determined based upon the GPS data and map data. An algorithm 113 (FIG. 2D) can be employed to identify an MTMA 105 based upon the other sensor data (indicative of physical movement) along with the WCD map location. As an example, the MTMA 105 cannot be swimming if the MT 106 is located on a known roadway.

In some embodiments, the sensors 116 may include a microphone, which produces audio data that can be used to more accurately determine the MTMA 105. An algorithm 113 (FIG. 2D) can be employed to identify an MTMA 105 based upon the other sensor data (indicative of physical movement) along with the microphone measured audio data. As an example, if the MT 105 is driving, then an analysis of the audio data could help determine that the MTMA 105 is driving. The sound of a motor vehicle that is driving can be detected with the correlation techniques, which are described later in this document.

Further note that, in some embodiments, the normalizing and combining steps may be performed concurrently by the same logic. In other words, the logic 152 and the logic 153 would be the same code segment.

6. Sixth Set of Embodiments

FIG. 4E is a flowchart of an example of a sixth set of embodiments of the MAI system 101 of FIG. 2D. In these embodiments, as shown in FIG. 4E, the MAI system 101 includes at least the following program code (or logic): program code 161 designed to receive a plurality of data streams from a respective plurality of sensors 116 of a WCD 104 that is transported by an MT 106, the data indicative of movement of the WCD 104; program code 162 designed to combine the data streams; program code 163 designed to normalize the combined data stream with respect to a reference; and program code 164 designed to identify an MTMA 105 associated with the MT 106 based upon the normalized combined data streams.

The combining process and the normalization process that can be utilized was described in the previous section of this document as well as other sections, and those discussions are incorporated herein by reference.

Furthermore, the sensors 116 may include an accelerometer, a gyroscope, a magnetometer, a pressure sensor, a GPS receiver, a microphone, etc., as discussed in more detail in the previous section of this document.

Further note that, in some embodiments, the combining and normalizing steps may be performed concurrently by the same or substantially the same logic. In other words, the logic 152 and the logic 153 would be the same or substantially the same code.

III. Embodiments of MIA Systems That Employ Correlation

In these possible embodiments, the MAI system 101 uses a mathematical correlation process to identify the MTMA 105. As shown in FIG. 14A, the MAI system 101 has logic 301 designed to receive data from one or more sensors 116 of the WCD 104 that is transported by the MT 106; logic 302 designed to correlate the movement data with a reference signature; and logic 303 designed to identify the MTMA 105 associated with the MT 106 based upon the correlation.

In some embodiments, the MAI system 101 may be designed with logic for storing identification information relating to a plurality of MTMAs 105 and with logic for enabling the user to select which of the MTMAs 105 will be detected.

With reference to FIG. 14B, the MAI system 101 is designed to include an MTMA detection engine 315, which detects MTMAs 105 using correlation, as will be further described hereafter. FIG. 14B shows the one or more sensors 116, such as but not limited to, an accelerometer, a gyroscope, an audio microphone, etc., for receiving one or more MTMA reference signatures 117a (FIG. 2E) that are used to identify MTMAs 105. The MTMA detection engine 315 may also be designed to also access and receive reference signatures from a remote computer 316 via the TX/RX 114 and the Internet 310.

The MTMA detection engine 315 stores the one or more MTMA reference signatures 117a in memory 102 (FIG. 2E) that are used to identify MTMAs 105, correlates sensed signal data with the reference signatures 117a, and detects occurrences of the MTMAs 105. A non-limiting example of such a detection engine 315 is described in U.S. Pat. No. 7,872,574, which is incorporated herein by reference in its entirety. The discussion hereafter will describe incorporation of the latter detection engine 315 in the architecture of the present disclosure.

The MTMA event detection engine 315 is designed to be operated in several modes. The architecture and operation of the MTMA detection engine 215 will be apparent as each of these modes is described in detail hereafter.

1. First Mode

In a first mode, the remote computer 316 is connected to a reference memory array 360 by a switch 350. One or more reference signatures 117a are collected by the remote computer 316 and loaded into the reference memory array 360.

Reference signatures, such as data indicative of the MTMA 105 can be collected from the remote computer 316. These can be stored locally on the WCD 104 and uses for future comparisons, or these can be requested in real time when a sensed signature is being analyzed to identify an MTMA 105.

The preprocessor 370 extracts the reference signature data from the reference memory array 360 and reformats the data to facilitate rapid correlation. The frequency domain is a preferred format, but time domain correlation or a combination thereof can also be employed. The preprocessor 370 analyzes each signature by a sequence of Fourier transforms taken repeatedly over a period of time corresponding to the duration of the signature. The Fourier transform is preferably a two-dimensional vector, but a single measure of amplitude versus frequency is sufficient. In the preferred embodiment, among many possible embodiments, the MTMA detection engine 315 processes a 3-dimensional array of amplitude, frequency, and time. The transformed signature arrays are stored back into a reference memory array 360 for subsequent rapid correlation. Preferably, each reference signature array includes an identifier field associated with the signature. As an example, for an MTMA of running, "running" may be the name and a picture/image of a running man may be associated with the signature 117a.

2. Second Mode

In a second mode of operation, MTMA detection engine 315 can acquire the reference signature data 117a directly from the local environment via a sensor(s) 116. The data sensed by the sensor 116 is selected by the user via the switch 350 and loaded directly into the reference memory array 360. Preferably, several seconds of signal are collected in this particular application. Then, the preprocessor 370 reformats the reference data for rapid correlation, preferably by Fourier transform.

3. Third Mode

In a third mode of operation, the MTMA detection engine 315 monitors the sensor data continuously (at discrete successive short time intervals due to the computer-based architecture) for data that matches those stored in the reference memory array 360. To reduce computational burden, the preprocessor 370 is designed to monitor the sensor 116 for a preset threshold level of signal data before beginning the correlation process. When the signal data exceeds the preset threshold level, the preprocessor 370 begins executing a Fourier transform. After several seconds or a period equal to the period of the reference signatures, the transformed active sensed data is stored at the output of the preprocessor 370. Then, array addressing logic 380 begins selecting one reference signature at a time for correlation. Each reference signature 117a is correlated by a correlator 390 with the active sensed data to determine if the reference signature 117a matches the active sensed data.

A comparator 400 compares the magnitude of the output of the correlator 390 with a threshold to determine a match. When searching for a match, the correlator 390 is compared with a fixed threshold. In this case, the switch 410 selects a fixed threshold 411 for comparison. If the correlation magnitude exceeds the fixed threshold 411, then the comparator 400 has detected a match. The comparator 400 then activates the correlation identifier register 420 and the correlation magnitude register 430. The magnitude of the comparison result is stored in the correlation magnitude register 430, and the identity of the MTMA 105 is stored in the correlation identifier register 420. The fixed threshold 411 can be predefined by a programmer or the user of the WCD 104.

After MTMA detection by the MTMA detection engine 315, the process is stopped and the array addressing logic 380 is reset. A search for new active sensed data then resumes.

4. Fourth Mode

In a fourth mode of operation, the MTMA detection engine 315 searches for the best match for the sensed data. In this case, the correlation magnitude register 430 is first cleared. Then, the switch 410 selects the output 412 of the correlation magnitude register 430 as the threshold input to the comparator 400. The array addressing logic 380 then sequentially selects all stored references of a set for correlation. After each reference in the set is correlated, the comparator 400 compares the result with previous correlations stored in the correlation magnitude register 430. If the new correlation magnitude is higher, then the new correlation magnitude is loaded into the correlation magnitude register 430, and the respective identifier is loaded into the correlation identifier register 420.

In an alternative embodiment, the correlation process can be performed by an associative process, where the active reference is associated directly with the stored references in a parallel operation that is faster than the sequential operation. New device technologies may enable associative processing. For example, reference memory array 360 can utilize content addressable memory devices for associative processing. ASIC devices and devices, such as the Texas Instruments TNETX3151 Ethernet switch incorporate content addressable memory. U.S. Pat. No. 5,216,541, entitled "Optical Associative Identifier with Joint Transform Correlator," which is incorporated herein by reference, describes optical associative correlation that can be utilized.

This correlation process continues until all stored reference signatures 117a in the set under analysis have been correlated. When the correlation process is complete, the correlation identifier register 420 holds the best match of the identity of the source of the active signal. The AD system 102 reads this register 420 and then determines what action to take, if any. In addition, the identity of the MTMA 105 can also be displayed as a photo or text description in a display 120 or as a verbal announcement via a speaker 120. If the final correlation magnitude is lower than a predetermined threshold, then the active signature can be loaded into the reference memory array 360 as a new unknown source.

I. Embodiments of MIA Systems That Utilize Filtering

These embodiments of the MIA system 101 involve using filtering techniques in the time domain, frequency domain, or both, in order to make more accurate identifications of MTMAs 105 in connection with a plurality of MTMAs 105 occurring concurrently. The filters can be hardware, software, or a combination thereof, for example, but not limited to, analog and/or digital filters, finite impulse response (FIR) filters, infinite impulse response (IIR) filters, etc. FIG. 2D shows a filter(s) 108 situated in the MAI system 101.

1. First Set of Embodiments

FIG. 15A is a flowchart of an example of a first set of embodiments of the MAI system 101 of FIG. 2D that employs filtering via a filter(s) 108 in order to more accurately identify an MTMA 105 that is among a plurality of MTMAs 105. In these embodiments, as shown in FIG. 15A, the MAI system 101 includes at least the following program code (or logic): program code 451 designed to receive data from one or more sensors 116, the data indicative of movement of the WCD 104; program code 452 designed to transform the data to frequency domain data using FT, the frequency domain data representing amplitude information in the frequency domain; program code 453 designed to identify an ambiguous MTMA 105 and a first certain MTMA 105 in the frequency domain data; program code 454 designed to filer first certain MTMA data corresponding to the first certain MTMA 105 from the time domain data, in whole or in part, to produce better time domain data for better analyzing the ambiguous MTMA 105; program code 455 designed to transform the better time domain data to better frequency domain data; and program code 456 designed to identify a second certain MTMA 105 from the better frequency domain data.

The ambiguous MTMA 105 can be (a) an MTMA 105 that has been narrowed down to two or more possible MTMAs 105 of a set under analysis, an MTMA 105 that has been tentatively identified but with less certainty than desired (e.g., having a probability below a predefined threshold), an MTMA 105 that has been brought into question based upon detection of an environmental event (the process of which is described elsewhere in this disclosure), etc.

The first and second certain MTMAs 105 can be based upon definitive or highly probable identifications.

2. Second Set of Embodiments

FIG. 15B is a flowchart of an example of a second set of embodiments of the MAI system 101 of FIG. 2D that employs filtering via one or more filters 108 (FIG. 2D) in order to more accurately identify an MTMA 105 that is among a plurality of MTMAs 105. In these embodiments, as shown in FIG. 15B, the MAI system 101 includes at least the following program code (or logic): program code 461 designed to receive data from one or more sensors 116, the data indicative of movement of the WCD 104; program code 462 designed to transform the data to frequency domain data using FT, the frequency domain data representing amplitude information in the frequency domain; program code 463 designed to identify an ambiguous MTMA 105 and a first certain MTMA 105 in the frequency domain data; program code 464 designed to filer first certain MTMA data corresponding to the first certain MTMA 105 from the frequency domain data, in whole or in part, to produce better frequency domain data for better analyzing the ambiguous MTMA 105; and program code 465 designed to identify a second certain MTMA 105 from the better frequency domain data.

3. Third Set of Embodiments

FIG. 15C is a flowchart of an example of a third set of embodiments of the MAI system 101 of FIG. 2D that employs filtering via one or more filters 108 (FIG. 2D) in order to more accurately identify an MTMA 105 that is among a plurality of MTMAs 105. In these embodiments, as shown in FIG. 15C, the MAI system 101 includes at least the following program code (or logic): program code 471 designed to receive data from one or more sensors 116, the data indicative of movement of the WCD 104; program code 472 designed to identify an ambiguous MTMA 105 and a first certain MTMA 105 in the time domain data; program code 473 designed to filer first certain MTMA data corresponding to the first certain MTMA 105 from the time domain data, in whole or in part, to produce better time domain data for better analyzing the ambiguous MTMA 105; and program code 474 designed to identify a second certain MTMA 105 from the better time domain data.

J. Embodiments of MIA Systems That Utilize Multiple Sensor Data

FIG. 16 is a flowchart of an example of a set of embodiments of the MAI system 101 of FIG. 2D that uses data from a plurality of sensors 116 in order to more accurately determine the MTMA 105. In these embodiments, as shown in FIG. 16, the MAI system 101 includes at least the following program code (or logic): program code 501 designed to receive data from each of a plurality of sensors 116 of a WCD 104 that is transported by an MT 106; and program code 502 designed to identify an MTMA 105 associated with the MT 106 based upon the data. The sensors may include an accelerometer, gyroscope, magnetometer, pressure sensor, GPS receiver, microphone, etc.

In some embodiments, the data from two or more of the sensors 116 is mathematically combined and then the MTMA 105 is identified based upon the combined data. Examples processes for mathematically combining the data, at a point before, during, or after a normalization process, has been previously described.

In some embodiments, the data from two or more sensors 116 is mathematically correlated, separately, using the MTMA detection engine 315. In such embodiments, the identification of the MTMA 105 may be based upon all correlation results (or a subset) supporting the same conclusion.

In some embodiments, the data from two or more sensors 116 is mathematically correlated, together, using the MTMA detection engine 315. In such embodiments, the data corresponding to each sensor is allocated a part of the data signature. When the correlation process takes place in the correlator 390 (FIG. 14B), the correlation result is the composite of all sensor data. The identification of the MTMA 105 is based upon composite correlation results.

K. Embodiments of MIA Systems That Employ Requests for User Confirmation

In these embodiments, the MAI system 101 employs a user confirmation algorithm(s) 113 (essentially implemented by program code 513-514 set forth hereafter) that assists in better determining whether an MTMA 105 has been correctly identified, in order to make more accurate decisions about actions to take and/or to help prevent some false MTMA detections.

As shown in FIG. 17, the MAI system 101 includes at least the following program code (or logic): program code 511 designed to receive data from one or more sensors 116; program code 512 designed to identify an MTMA 105 based upon the data; program code 513 designed to communicate the identified MTMA 105 to the user of the WCD 104 and to request confirmation from the user that the identified MTMA 105 is correct; and program code 514 designed to cause initiation of an action when the identified MTMA 105 has been confirmed, and designed to refrain from causing initiation of the action when the identified MTMA 105 is not confirmed.

The confirmation can be passive. For example, the program code 513 may be designed to communicate voice message over a WCD speaker 120, which states: "Walking. To confirm, take no action. If incorrect, press the pound key" or "You have stopped running. If incorrect, please press the star key." In embodiments where voice recognition software is employed in the WCD 104, the user can communicate responses with voice commands.

In some passive embodiments, the program code 514 can be designed to initiate an action based upon the combination of lack of the user input and lapse of a predefined time period, or in the alternative, to refrain from initiating the action if an appropriate user input(s) is in fact received during the predefined time period. A clock can be started upon detection of the MTMA 105 in order to monitor this time period. In these embodiments, the algorithm 113 may be, for example: when the code 512 detects that the MTMA 105 is running, definitively conclude that running is the MTMA 105 when the user does not respond to the user input request within the predefined time period. As another example, the algorithm 113 may be: when the MTMA 105 is detected as running, do not conclude that the MTMA 105 is in fact running when the user responds to the user input request with an appropriate response within the predefined time period.

The confirmation can be active. For example, the program code 513 may be designed to communicate a voice message over a WCD speaker 120, which states: "Please confirm biking by pressing the pound key" or "You have stopped skiing. If correct, please press the star key." In embodiments where voice recognition software is employed in the WCD 104, the user can communicate responses with voice commands.

In some active embodiments, the program code 514 may be designed to refrain from initiating an action based upon the combination of lack of the user input and lapse of a predefined time period, and further designed to initiate the action if an appropriate user input(s) is in fact received during the predefined time period. A clock can be started upon detection of the MTMA 105. In these embodiments, the algorithm 113 may be, for example: when the code 512 detects that the MTMA 105 is running, do not conclude that the MTMA 105 is in fact running until the user confirms with an appropriate user input during the predefined time period. As another example, the algorithm 113 may be: when the MTMA 105 is running as detected by the program code 512, do not conclude that running is the MTMA 105 until the user confirms this with an appropriate user input during the predefined time period.

In some embodiments, the program code 514 of the MAI system 101 may designed to also communicate the action to be taken to the user and a request for a user confirmation that the action is appropriate. In such embodiments, the user can decide whether or not the AD system 102 pursues the action.

The actions that can be taken are numerous and are described in other sections of this disclosure.

L. Embodiments of MIA Systems That Employ MTMA Exceptions

In these embodiments, the MAI system 101 employs an algorithm(s) 113 that assists in better determining whether an MTMA 105 has been discontinued or whether the MTMA 105 has transitioned to another MTMA 105, in order to make more accurate decisions about actions to take and/or to help prevent some false MTMA detections.

1. First Set of Embodiments

FIG. 18A is a flowchart of an example of a first set of embodiments of the MAI system 101 that employs MTMA exceptions. These embodiments implement an algorithm 113 (essentially implemented by program code 553-555 set forth hereafter) that employs monitoring a time period before concluding that an MTMA discontinuance or transition has occurred. As shown in FIG. 18A, the MAI system 101 includes at least the following program code (or logic): program code 551 designed to receive data from one or more sensors 116; program code 552 designed to detect an MTMA 105 associated with the MT 106 transporting the WCD 104, based upon the produced movement data from the one or more sensors 116; program code 553 designed to detect discontinuance (or disruption) of the MTMA 105 or a transition of the MTMA 105 to a different MTMA 105; program code 554 designed to determine whether or not the detected MTMA 105 recommences within a predefined time period; and program code 555 designed to initiate an action or cause the AD system 102 to initiate an action, based upon MTMA discontinuance or transition and lapse of the predefined time period, or in the alternative, to refrain from initiating or causing initiation of the action, if it detects recommencement of the MTMA 105 within the predefined time period.

As an example, the algorithm 113 may be as follows: when the MTMA 105 is running, do not conclude that running has ceased until it has ceased for 5 seconds.

As another example, the algorithm 113 may be as follows: when the MTMA 105 is running and then a transition to walking is detected, do not conclude that the transition from running to walking has occurred if running is again detected within 5 seconds.

2. Second Set of Embodiments

FIG. 18B is a flowchart of an example of a second set of embodiments of the MAI system 101 that employs MTMA exceptions. These embodiments implement an algorithm 113 (essentially implemented by program code 563-565 set forth hereafter) that employs a confirmation request to the user in combination with a "passive" user response before (a) concluding that an MTMA discontinuance or transition has occurred or (b) initiating an action. As shown in FIG. 18B, the MAI system 101 includes at least the following program code (or logic): program code 561 designed to receive data from one or more sensors 116; program code 562 designed to detect an MTMA 105 associated with the MT 106 transporting the WCD 104, based upon the movement data from the one or more sensors 116; program code 563 designed to detect discontinuance or transition of the MTMA 105 or to confirm the desire for an action; program code 564 designed to request a user input(s); and program code 565 designed to initiate the action based upon lack of the user input, or in the alternative, to refrain from initiating the action if an appropriate user input(s) is in fact received.

As examples, the user input request may be an audible message communicated over a WCD speaker 120, which states: "Walking has stopped. Override by pressing the pound key" or "You have stopped running. If incorrect, please press the star key" or "Your shoe order will be initiated unless your predefined code is entered." The predefined code could be any sequence of numbers and/or letters. In embodiments where voice recognition software is employed in the WCD 104, the user can communicate responses with voice commands.

In some embodiments, the user input request may be in the form of a message displayed on a screen associated with the WCD 104.

In some embodiments, the action may include identifying a telephone number to call corresponding to a security organization that is situated in close proximity of the WCD 104.

The algorithm 113 may be, for example: when the MTMA 105 is running and code 563 detects that running has ceased, conclude that running has ceased when the user does not respond to the user input request.

As another example, the algorithm 113 may be: when the MTMA 105 is running and then walking is detected by code 563, do not conclude that the transition from running to walking has occurred when the user responds to the user input request with an appropriate response.

In some embodiments, the program code 565 can be designed to initiate an action based upon lack of the user input and lapse of a predefined time period, or in the alternative, to refrain from initiating the action if an appropriate user input (s) is in fact received during the predefined time period. A clock can be started upon detection of the discontinuance or transition of the MTMA 105 in order to monitor this time period. In these embodiments, the algorithm 113 may be, for example: when the MTMA 105 is running and code 563 detects that running has ceased, conclude that running has ceased when the user does not respond to the user input request within the predefined time period. As another example, the algorithm 113 may be: when the MTMA 105 is running and then walking is detected by code 563, do not conclude that the transition from running to walking has occurred when the user responds to the user input request with an appropriate response within the predefined time period.

3. Third Set of Embodiments

FIG. 18C is a flowchart of an example of a third set of embodiments of the MAI system 101 that employs MTMA exceptions. These embodiments implement an algorithm 113 (essentially implemented by program code 573-575 set forth hereafter) that employs a confirmation request to the user in combination with an "active" user response before (a) concluding that an MTMA discontinuance or transition has occurred or (b) initiating an action. As shown in FIG. 18C, the MAI system 101 includes at least the following program code (or logic): program code 571 designed to receive data from one or more sensors 116; program code 572 designed to detect an MTMA 105 associated with the MT 106 transporting the WCD 104, based upon the movement data from the one or more sensors 116; program code 573 designed to detect discontinuance or transition of the MTMA 105; program code 574 designed to request a user input(s) to confirm the discontinuance or transition or to confirm the desire to have an action initiated; and program code 565 designed to refrain from initiating the action based upon lack of the user input, or in the alternative, to initiate the action if an appropriate user input(s) is in fact received.

As examples, the user input request may be an audible message communicated over a WCD speaker 120, which states: "Please confirm walking by pressing the pound key" or "You have stopped running. If correct, please press the star key" or "Please confirm that you would like an ambulance called by pressing any key." In embodiments where voice recognition software is employed in the WCD 104, the user can communicate responses with voice commands.

In some embodiments, the user input request may be in the form of a message displayed on a display screen 120 associated with the WCD 104.

In some embodiments, the action may include identifying a telephone number to call corresponding to a security organization (e.g., local police) that is situated in close proximity of the WCD 104.

The algorithm 113 may be, for example: when the MTMA 105 is running and the code 573 detects that running has ceased, do not conclude that running has ceased until the user confirms that running has ceased with an appropriate user input via an I/O device 120.

As another example, the algorithm 113 may be: when the MTMA 105 is running and then walking is detected by the program code 573, do not conclude that the transition from running to walking has occurred until the user confirms this with an appropriate user input via an I/O device 120.

In some embodiments, the program code 565 may be designed to refrain from initiating an action based upon lack of the user input and lapse of a predefined time period, and further designed to initiate the action if an appropriate user input(s) is in fact received during the predefined time period. A clock can be started upon detection of the discontinuance or transition of the MTMA 105. In these embodiments, the algorithm 113 may be, for example: when the MTMA 105 is running and the code 573 detects that running has ceased, do not conclude that running has ceased until the user confirms with an appropriate user input during the predefined time period. As another example, the algorithm 113 may be: when the MTMA 105 is running and then walking is detected by the program code 573, do not conclude that the transition from running to walking has occurred until the user confirms this with an appropriate user input during the predefined time period.

4. Fourth Set of Embodiments

FIG. 18D is a flowchart of an example of a fourth set of embodiments of the MAI system 101 that employs MTMA exceptions. These embodiments implement an algorithm 113 (essentially implemented by program code 603-604 set forth hereafter) that employs a waiting time period before attempting to detect, in whole or in part, one or more other MTMAs 105. As shown in FIG. 18D, the MAI system 101 includes at least the following program code (or logic): program code 601 designed to receive data from one or more sensors 116; program code 602 designed to detect an MTMA 105 based upon the sensor data; program code 603 designed to cause the MTMA detection logic to refrain from attempting, in whole or in part, to identify one or more other MTMAs 105 until a waiting time period has lapsed; and program code 604 designed to commence the detection process for detecting one or more other MTMAs 105 after expiration of the waiting time period.

The waiting time period can be preset based upon the first detected MTMA 105, or it can be adjusted dynamically based upon the first detected MTMA 105 and one or more inputs from other sensors 116, such as the GPS receiver data, pressure data, etc.

The predefined time period can correspond to the time that would typically be involved with performing a known MTMA 105 that the MT 106 is currently engaged in.

As an example, if it is known that the MTMA 105 is skiing and that the MT 106 is at the top of a known ski slope, then the program code 603 can impose a waiting time period that corresponds to the length of time needed for the MT 106 to travel to the bottom of the ski slope.

In some embodiments, the user can predefine in user preferences the waiting time period for one or more detected MTMAs 105. For example, the user may predefine 6 hours for an MTMA 105 that corresponds to sleeping, or 2.5 hours for an MTMA 105 that corresponds to biking.

The waiting time period can be based upon historical information associated with one or more MTMAs 105. For example, if the MTMA 105 is sleeping, and it is known from the past (from archive information stored in memory 102) that the MT 106 typically sleeps for 6 hours, then the waiting time period may be set, initially or dynamically, to be 6 hours.

M. Embodiments of MAI Systems That Employ Historical Data Algorithms

1. First Set of Embodiments

FIG. 19A is a flowchart of an example of a first set of embodiments of the MAI system 101 that employs an algorithm(s) 113 that takes into consideration a previous MTMA (s) 105 (in historical data 117b) when attempting to identify a new MTMA 105. As shown in FIG. 19A, the MAI system 101 includes at least the following program code (or logic): program code 651 designed to receive data from one or more sensors 116; program code 652 designed to detect a first MTMA 105 based upon an analysis of the sensor data from the sensors 116; and program code 653 designed to detect a second MTMA 105 based upon analysis of new sensor data and the first MTMA 105. The premise of the algorithm 113 is that some MTMAs 105 have a relation to other MTMAs 105, and so therefore, if one knows a current MTMA 105, this information can be used to help identify one or more future MTMAs 105.

As an example, consider an MT 106 in the form of a person whose current MTMA 105 is golfing. The next MTMA 105 would likely not be skydiving. There would likely need to be intermediate MTMAs 105 before skydiving would even be possible. The more likely next MTMAs 105 could be riding in a golf cart, walking, running, etc.

As another example, consider an MT 106 in the form of a person whose current MTMA 105 is flying in an airplane. It would be highly unlikely for the next MTMA 105 to be skiing. The more likely next MTMAs 105 could be landing in the airplane, walking after flying stops, etc.

As yet another example, consider an MT 106 in the form of a person whose current MTMA 105 is swimming. It would be highly unlikely for the next MTMA 105 to be skiing or skydiving. The more likely next MTMAs 105 could be riding in a boat, standing, walking, etc.

In some embodiments, the memory 102 can store and maintain a database (preferably, relational) 119 (FIG. 2D, 2E) that defines the relationships between and among MTMAs 105. So, when the program code 653 attempts to identify a new MTMA 105, the database 119 is accessed. An identifier associated with the current MTMA 105 is used as an index to look up a set of one or more other MTMA identifications (IDs) that will be considered when attempting to determine the next MTMA 105. Said another way, the program code 653 identifies a subset of possible IDs stored in the database 119 based upon the first detected MTMA 105, the subset including one or more MTMA IDs, but less than all of the entire set of MTMA IDs.

2. Second Set of Embodiments

FIG. 19B is a flowchart of an example of a second set of embodiments of the MAI system 101 that employs an algorithm(s) 113 that takes into consideration historical data 117b (FIG. 2E) when attempting to identify a new MTMA 105. As shown in FIG. 19B, the MAI system 101 includes at least the following program code (or logic): program code 671 designed to receive data from one or more sensors 116; program code 672 designed to retrieve historical data 117b from memory 102; and program code 673 designed to detect an MTMA 105 based upon (a) the sensor data and (b) the historical data 117b. The historical data 117b can be any data concerning the past that can help identify a current MTMA 105, for example but not limited to, one or more historical MTMAs 105, one or more historical events, one or more previous relationships between MTMAs 105 and time information (time of day, day of week, etc.), past actions taken by the AD system 101, one or more previous sequences or patterns of MTMAs 105, frequency of MTMAs 105, length of time for an MTMA 105 to have concluded, transition time in order to commence a new MTMA 105 from a previous MTMA 105, etc.

As an example, when an MT 106 in the form of a person has taken a two hour walk every morning starting at 7:00 am for the last month, it is likely that the person will also engage in this MTMA 105 at this time and for this duration in the future. So, as an example, the algorithm 113 may be designed so that if the sensor data indicates inconclusively that the MTMA 105 is either walking or riding, then the algorithm 113 checks the TOD and selects walking when the TOD is about 7:00 am.

As another example, when an MT 106 in the form of a person skis every day but never rides in a motor vehicle, it is likely that the person will continue with this pattern. So, as an example, the algorithm 113 may be designed so that if the sensor data indicates inconclusively that the MTMA 105 is either skiing or riding a motor vehicle, then the algorithm 113 will conclude that the MTMA 105 is skiing.

3. Third Set of Embodiments

FIG. 19C is a flowchart of an example of a third set of embodiments of the MAI system 101 that employs an algorithm(s) 113 that takes into consideration historical data 117b (FIG. 2E) when attempting to identify a new MTMA 105 by selecting which one or more sensors 116 and/or sensor data to use in order to make the identification. As shown in FIG. 19C, the MAI system 101 includes at least the following program code (or logic): program code 681 designed to retrieve historical data 117b (FIG. 2E) from database 119; program code 682 designed to select one or more sensors 116 and/or one or more sensor data based at least in part upon the historical data; and program code 683 designed to identify the MTMA 105 based upon data from the selected sensor(s) 116 or the selected sensor data.

In some embodiments, the program code 682 can be designed to cause the sensor(s) 116 to be turned on and off. In other embodiments, the sensors 116 are operational and produce sensor data, and the program code 682 merely selects which sensor data to utilize to make the MTMA identification.

As an example, the historical data 117b may indicate the an MT 106 in the form of an automobile drives every morning from 10:00 am to noon. Therefore, the algorithm 113 may be implemented as follows. Based upon this historical data 117b and the fact that is it currently 11:00 am, the program code 682 selects the accelerometer data and the microphone data, which both can be utilized to detect that an automobile engine is running, and from this, the program code 683 can identify the MTMA 105 as an automobile driving.

As another example, consider an MT 106 that is associated with a WCD 104 that fails to produce GPS data during a time period each day or all of the time because the WCD 104 cannot receive a sufficient number of data signals from GPS satellites. In this case, the program code 682 may be designed to select accelerometer data and gyroscope data, while ignoring GPS data, so that the program code 683 can identify the MTMA 105.

As yet another example, consider an MT 106 in the form of a person who only walks and runs each day. In this scenario, the program code 682 may be designed to only select accelerometer data and gyroscope data, while ignoring other available sensor data, so that the program code 683 can identify the MTMA 105 as either walking or running.

4. Fourth Set of Embodiments

FIG. 19D is a flowchart of an example of a fourth set of embodiments of the MAI system 101 that employs an algorithm(s) 113 that determines that a previously identified MTMA 105 (in historical data 117b) is correct, incorrect, or questionable, based upon one or more newly detected MTMAs 105. As shown in FIG. 19D, the MAI system 101 includes at least the following program code (or logic): program code 691 designed to receive sensor data from one or more sensors 116; program code 692 designed to detect a first MTMA 105 based upon an analysis of the sensor data from the sensors 116; program code 693 designed to detect a one or more new MTMAs 105 based upon analysis of new sensor data; program code 694 designed to make a determination as to whether the first MTMA 105 was correct, incorrect, or questionable. The premise of the algorithm 113 is that some MTMAs 105 have a relation to other MTMAs 105, and so therefore, if one knows a current MTMA 105, this information can be used to help determine whether a previously identified MTMA 105 was accurate or not. In some embodiments, if the first MTMA 105 is incorrect or questionable, then the MAI system 101 can attempt another identification of the MTMA 105 using archived sensor data or advise the AD system 102 of same so that the AD system 102 can take action, if necessary. In some embodiments, if correct, then any metric associated with the first MTMA detection certainty can be increased. As an example, if skiing was identified as the MTMA 105 and then flying in an airplane is detected, then the MTMA 105 of skiing can be brought into question.

N. Embodiments of MAI Systems That Employ User Preferences

1. First Set of Embodiments

Figure 2E:
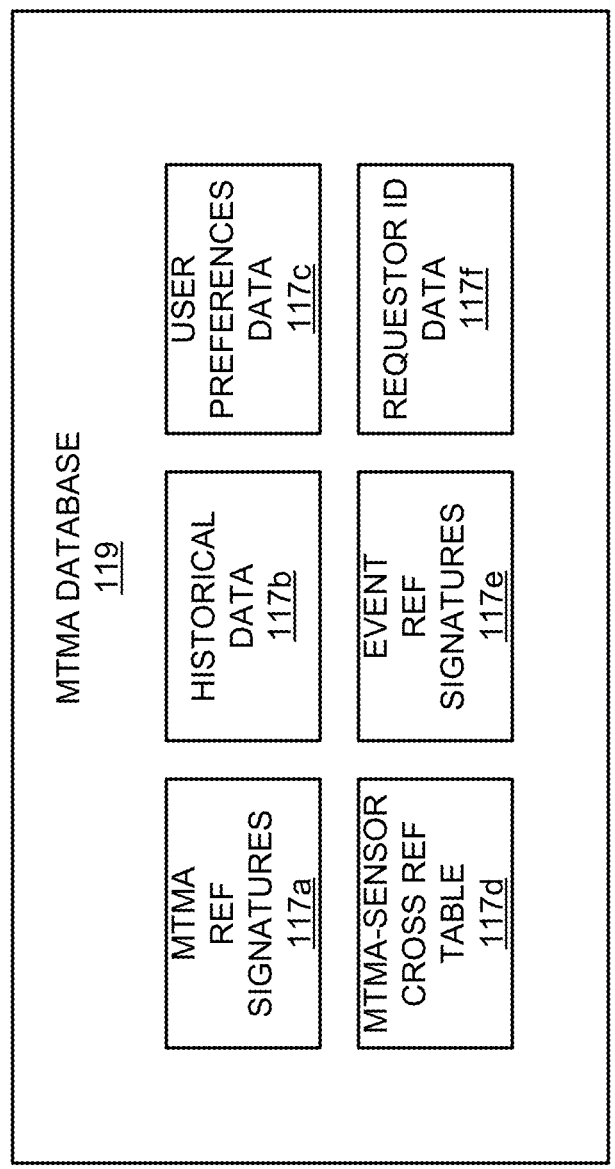
FIG. 2E is a block diagram illustrating an example of an MTMA database that can be employed in the MIA system of FIG. 2D.

FIG. 20A is a flowchart of an example of a first set of embodiments of the MAI system 101 that employs user preferences data 117c (FIG. 2E). Essentially, the MAI system 101 takes into consideration user preferences data 117c, which are input or selected by a user, when attempting to identify an MTMA 105. The user preferences data 117c identifies the one or more MTMAs 105 that will be the focus for detection. As shown in FIG. 20A, the MAI system 101 includes at least the following program code (or logic): program code 701 designed to receive data from one or more sensors 116; program code 702 designed to access the user preferences data 117c stored in memory 102 that identifies one or more MTMAs 105 to attempt to identify; and program code 703 designed to identify an MTMA 105 based upon the sensor data and the user preferences data 117c.

The user can define the user preferences data 117c via any suitable user interface. For instance, a graphical user interface (GUI) 112, in the form of software, can be stored in memory 102 that drives appropriate user input screens to the user via a display 120 and prompts the user for selections or inputs. MTMA options can be selected or otherwise input by the user. In essence, the user preferences data 117c defines the MTMA searching universe.

In some embodiments, the user may define, via user preferences, only the MTMAs 105 of interest to the user.

In some embodiments, the user can advise the MAI system 101, via user preferences, to track a particular number of the most often detected MTMAs 105 (by accessing the historical data 117b).

In some embodiments, the user can advise the MAI system 101, via user preferences, to track a particular number of the least often detected MTMAs 105 (by accessing the historical data 117b).

In some embodiments, the program code 703 is designed to compute one or more statistical metrics for each MTMA 105 and to compare the metrics in order to detect the MTMA 105.

As an example, the user may advice the MAI system 101, via user preferences, to detect all instances of running, and may advise the AD system 102, via user preferences, to track all instances and when the running exceeds 100 hours, communicate with a server associated with a retailer to order a new pair of running shoes.

2. Second Set of Embodiments

FIG. 20B is a flowchart of an example of a first second set of embodiments of the MAI system 101 that employs user preferences data 117c (FIG. 2E). Essentially, the MAI system 101 takes into consideration user preferences data 117c, which are input or selected by a user, when attempting to identify an MTMA 105. The user preferences data 117c define the one or more sensors 116 that will be utilized in order to detect one or more MTMAs 105. As shown in FIG. 20B, the MAI system 101 includes at least the following program code (or logic): program code 711 designed to receive data from one or more sensors 116; program code 712 designed to access the user preferences data 117c stored in memory 102 that identifies one or more sensors 116 to use to attempt to identify one or more MTMAs 105; and program code 713 designed to identify an MTMA 105 based upon the sensor data and the user preferences data 117c.

The user can define the user preferences data 117c via any suitable user interface. For instance, the GUI 112, in the form of software, can be stored in memory 102 that drives appropriate user input screens to the user via a display 120 and prompts the user for selections or inputs. Sensor options can be selected or otherwise input by the user.

As an example, the user may specific, via user preferences, that the MAI system 101 should only use data from an accelerometer 116 to identify the one or more MTMAs 105 in situations where it is known that other sensor data will not be available, will be unreliable, will cause undue delay, etc.

In some embodiments, the program code 713 can be designed to turn sensors on or off based upon the user preferences data 117c that define which will be utilized.

In some embodiments, the user preferences data 117c can define which one or more sensors 116 will be used to identify specific MTMAs 105. For example, use the accelerometer data when attempting to identify running.

In some embodiments, the user preferences data 117c can define use of one or more sensors 116 for all MTMAs 105. For example, use the microphone for detecting all MTMAs 105.

In some embodiments, the user preferences data 117c can define use of one or more sensors 116 for categories or groupings of MTMAs 105. For example, use the accelerometer data and gyroscope data when attempting to identify the MTMAs 105 in the group consisting of running, walking, and standing. However, in the case of flying and driving, use the pressure sensor 116 and the accelerometer data.

O. Embodiments of MAI Systems That Employ Sensor Data Selection

1. First Set of Embodiments

FIG. 21A is a flowchart of an example of a first set of embodiments of the MAI system 101 that employs a sensor data selection algorithm 113 in order to assist with identifying an MTMA 105. As shown in FIG. 21A, the MAI system 101 includes at least the following program code (or logic): program code 761 designed to receive sensor data from one or more sensors 116; program code 762 designed to attempt to identify an MTMA 105 based upon the sensor data from the one or more sensors 116; program code 763 designed to determine whether or not the MTMA 105 can be identified;

program code 764 designed to, when the program code 763 cannot identify the MTMA 105 with sufficient accuracy, analyze data from one or more other sensors 116; and program code 765 designed to determine the MTMA 105 based upon the original sensor in combination with the new other sensor data or merely based upon the new other sensor data.

The program code 764 may be designed to request or acquire the data from the other sensors 116. In some embodiments, the program code 764 may be designed to initiate operation (turn on) of the other sensors 116 so that they produce data that can be analyzed.

In some embodiments, the program code 762 is designed to attempt to identify the MTMA 105 by correlating the sensor data with a plurality of MTMA reference data signatures 117 using the MTMA detection engine 315 (FIG. 15). A correlation value for is produced for each correlation of the sensor data with a specific one of the reference data, the correlation value indicative of a degree to which the sensor data matches the specific one of the reference data. The program code 763 is designed to compare the correlation value with a predetermined threshold and to determine whether or not the MTMA 105 has been determined with sufficient accuracy based upon the comparison.

In some embodiments, the program code 763 may be designed to (a) communicate a proposed MTMA 105 to the user via a suitable I/O device 120, for instance, a display image, audible message, etc., (b) request confirmation from the user that the identified MTMA 105 is correct, and (c) to notify the program code 764 to analyze data from the other sensors 116 when the user does not confirm the proposed MTMA 105.

In some embodiments, the other sensors that are consulted are identified by time information (TOD, TOW, etc.), event detection, temperature, predefined user preferences data 117c, etc.

2. Second Set of Embodiments

FIG. 21B is a flowchart of an example of a second set of embodiments of the MAI system 101 that employs a sensor data selection algorithm 113 in order to assist with identifying an MTMA 105. As shown in FIG. 21A, the MAI system 101 includes at least the following program code (or logic): program code 771 designed to receive sensor data from one or more sensors 116; program code 772 designed to attempt to identify an MTMA 105 based upon the sensor data from the one or more sensors 116; program code 773 designed to determine whether or not the MTMA 105 can be identified with sufficient accuracy; program code 774 designed to, when the program code 763 can identify the MTMA 105 with sufficient accuracy, refrain from analyzing data from one or more other sensors 116; and program code 765 designed to determine the MTMA 105 based upon the received sensor data.

In some embodiments, the program code 772 is designed to attempt to identify the MTMA 105 by correlating the sensor data with a plurality of MTMA reference data signatures 117 using the MTMA detection engine 315 (FIG. 15). A correlation value for is produced for each correlation of the sensor data with a specific one of the reference data, the correlation value indicative of a degree to which the sensor data matches the specific one of the reference data. The program code 773 is designed to compare the correlation value with a predetermined threshold and to determine whether or not the MTMA 105 has been determined with sufficient accuracy based upon the comparison. If so, then the program code 774 insures that the MAI system 101 does not analyze other sensor data, and the program code 775 conclusively determines the MTMA 775.

In some embodiments, the program code 773 may be designed to (a) communicate a proposed MTMA 105 to the user via a suitable I/O device 120, for instance, a display image, audible message, etc., (b) request confirmation from the user that the identified MTMA 105 is correct, and (c) to notify the program code 774 to not analyze data from the other sensors 116 when the user does confirm the proposed MTMA 105.

3. Third Set of Embodiments

FIG. 21C is a flowchart of an example of a third set of embodiments of the MAI system 101 that employs a sensor data selection algorithm 113 in order to assist with identifying an MTMA 105. As shown in FIG. 21C, the MAI system 101 includes at least the following program code (or logic): program code 781 designed to determine one or more MTMAs 105 to detect; program code 782 designed to select one or more sensors 116, or sensor data, based upon the determined MTMAs 105; and program code 783 designed to detect the determined MTMAs 105 by analyzing selected sensor data.

The program code 781, which is designed to determine one or more MTMAs 105 to detect, can take many different forms. As an example, the user could specific which MTMAs 105 to attempt to detect via (a) selection or input provoked by a suitable GUI 112 or (b) user preferences 117c.

As another example, the MTMAs 105 to detect could be based at least in part upon historical data 117b. For instance, the algorithm 113 may be: search for the 5 most often detected MTMAs 105.

As yet another example, the MTMAs 105 to detect could be preset (fixed).

The program code 782, which is designed to select one or more sensors 116 or sensor data, based upon the determined MTMAs 105, can take various forms. For example, an MTMA-sensor cross reference table 117d (FIG. 2E) can be stored in memory 102 and used to define which one or more sensors 116 or sensor data will be used to attempt to identify each MTMA 105. For instance, in the case of driving, the selected sensors 116 or sensor data might be an accelerometer 116 and a microphone 116.

As another example, the program code 782 may be designed to select the one or more sensors 116 or the sensor data merely based upon availability or integrity.

As yet another example, the program code 782 may be designed to select the one or more sensors 116 or the sensor data to minimize power consumption, while still identifying the MTMAs 105. For instance, if the MTMA 105 is driving and driving can be determined with high certainty most of the time with an accelerometer 116, then only use the accelerometer 116 and do not activate other sensors 116, such as the GPS receiver 116, etc.

As still another example, the program code 782 may be designed to select the one or more sensors 116 or the sensor data based upon historical data 117b relating, for instance, on how successful or trustworthy MTMA detection has been in the past in connection with the sensors 116.

The program code 783, which is designed to detect the determined MTMAs 105 by analyzing selected sensor data, can take numerous forms, as described at various locations in the present disclosure.

In some embodiments, the program code 782 can be further designed so that the sensor or sensor data selection is implemented in a plurality of successive analysis stages, where the selection is based upon the success or lack of success of previous analysis stages in detecting the MTMAs 105. For example, in a single stage implementation, the program code 782 may be designed to initially select one or more sensors 116 or sensor data to utilize in an attempt to identify the MTMAs 105 and then make a determination on whether or not other additional sensors 116 or sensor data are needed or should be utilized after analyzing the initially selected sensor data. For instance, the program code 782 may determine that the MTMAs 105 cannot be determined with sufficient accuracy using only the initially selected sensor data, in which case, other sensor data is needed for helping in the attempt to identify the MTMAs 105.

4. Fourth Set of Embodiments

FIG. 21D is a flowchart of an example of a fourth set of embodiments of the MAI system 101 that employs a sensor data selection algorithm 113 in order to assist with identifying one or more MTMAs 105. This set of embodiments involves making the selection based at least in part upon time information, e.g., time of day (TOD), time of week (TOW), time of month (TOM), time of year (TOY), time usually associated with a current MTMA 105, time remaining in connection with battery power of the WCD 104, etc. As shown in FIG. 21D, the MAI system 101 includes at least the following program code (or logic): program code 791 that determines the time information; program code 792 that selects one or more sensors 116 or sensor data based at least in part upon the time information; and program code 793 that detects one or more MTMAs 105 by analyzing data from the selected sensors 116 or sensor data.

The program code 791, which determines the time information, can take various configurations. In one embodiment, the program code 791 may be designed to merely identify the TOD, TOW, etc., directly or indirectly, from an on-board clock associated with the WCD 104, and the program code 792 may be configured to select the one or more sensors 116 merely based upon this time information.

In some embodiments, the program code 791 may be designed to identify the TOD, TOW, etc., directly or indirectly, from an on-board clock associated with the WCD 104, and the program code 792 may be configured to select the one or more sensors 116 based upon this time information as well as historical data 117b associated with MTMAs 105. For example, if it is known that running occurs each day from 6:00 am to 8:00 am, then during this time period, the sensors 116 or sensor data that is most appropriate for detecting the MTMA 105 of running should be selected and utilized. As another example, if a current MTMA 105 usually takes 15 minutes, then switch to a new one or more sensors 116, after expiration of the 15 minute time period, that are better for detecting another different MTMA 105.

In some embodiments, the program code 791 may be designed to identify the TOD, TOW, etc., directly or indirectly, from an on-board clock associated with the WCD 104, and the program code 792 may be configured to select the one or more sensors 116 based upon this time information in combination with user preferences data 117c. The user may define which sensors 116 or sensor data to used relative to TOD, TOW, etc.

In some embodiments, the program code 791 may be designed to identify the TOD or TOW from an on-board clock associated with the WCD 104, and the program code 792 may be configured to select the one or more sensors 116 based upon this time information in combination with a detected event in the WCD environment. Detection of events is described in detail elsewhere in this disclosure.

In some embodiments, the program code 791 may be designed to identify the TOD or TOW from an on-board clock associated with the WCD 104, and the program code 792 may be configured to select the one or more sensors 116 based upon this time information in combination with a location of the WCD 104. Detection of WCD location using GPS data 109 and map data 119 is described in detail elsewhere in this disclosure.

In some embodiments, the program code 791 may be designed to identify how much WCD battery power remains, and the program code 792 may be configured to select the one or more sensors 116 based upon this time information. The program code 792 may select one or more sensors 116 that will minimize power consumption, while still enabling detection of the MTMA 105.

The program code 793, which is designed to detect the determined MTMAs 105 by analyzing selected sensor data, can take numerous forms, as described at various locations in the present disclosure.

P. Embodiments of MAI Systems That Employ Environmental Event Detection

1. First Set of Embodiments

FIG. 22A is a flowchart of an example of a first set of embodiments of the MAI system 101 that employs an environmental event detection algorithm 113 in order to assist with identifying one or more MTMAs 105. As shown in FIG. 22A, the MAI system 101 includes at least the following program code (or logic): program code 801 (event detection logic) designed to detect an event in the environment associated with the WCD 104; program code 802 (sensor selection logic) designed to initiate and/or select one or more sensors 116 and/or sensor data that will be used to attempt to identify the MTMA 105, the selection being based upon the event detection; and program code 803 (MTMA identification logic) designed to detect the MTMA 105 by analyzing the data from the selected sensors 116 and/or sensor data. The event can be any environmental occurrence in an environment associated with the WCD 104, for example but not limited to, an acoustic, thermal, magnetic, optical, electromagnetic, chemical, dynamic, wireless, atmospheric, or biometric condition.

a. Event Detection Logic

The program code 801, which is designed to detect an event in the environment associated with the WCD 104, can take various forms. One nonlimiting example is illustrated in FIG. 22B.

In some embodiments, the MAI system 101 may be designed with logic for storing identification information relating to a plurality of events and with logic for enabling the user to select which of the events will be detected.

With reference to FIG. 22B, the program code 801 is designed to include an event detection engine 815, which detects events using correlation, as will be further described hereafter. FIG. 22B shows the one or more sensors 116, such as but not limited to, an accelerometer, a gyroscope, an audio microphone, etc., for receiving one or more event reference signatures 117e (FIG. 2E) that are used to identify events. The event detection engine 815 may also be designed to also access and receive reference signatures from a remote computer 816 via the TX/RX 114 and the Internet 810.

The event detection engine 815 stores the one or more event reference signatures 117e in memory 102 (FIG. 2E) that are used to identify events, correlates sensed signal data with the reference signatures 117e, and detects occurrences of the events. A non-limiting example of such a detection engine 815 is described in U.S. Pat. No. 7,872,574, which is incorporated herein by reference in its entirety. The discussion hereafter will describe incorporation of the latter detection engine in the architecture of the present disclosure.

The event detection engine 815 is designed to be operated in several modes. The architecture of the event detection engine 815 will be apparent as each of these modes is described in detail hereafter.

i. First Mode

In a first mode, the remote computer 316 is connected to a reference memory array 860 by a switch 850. One or more reference signatures 117e are collected by the remote computer 816 and loaded into the reference memory array 860.

Reference signatures 117e can be collected from the remote computer 316. These can be stored locally on the WCD 104 and used for future comparisons, or these can be requested in real time when a sensed signature is being analyzed to identify an event.

The preprocessor 870 extracts the reference signature data from the reference memory array 860 and reformats the data to facilitate rapid correlation. The frequency domain is a preferred format, but time domain correlation or a combination thereof can also be employed. The preprocessor 870 analyzes each signature 117e by a sequence of Fourier transforms taken repeatedly over a period of time corresponding to the duration of the signature. The Fourier transform is preferably a two-dimensional vector, but a single measure of amplitude versus frequency is sufficient. In the preferred embodiment, among many possible embodiments, the event detection engine 815 processes a 3-dimensional array of amplitude, frequency, and time. The transformed signature arrays are stored back into a reference memory array 860 for subsequent rapid correlation. Preferably, each reference signature array includes an identifier field associated with the signature 117e.

ii. Second Mode

In a second mode of operation, event detection engine 815 can acquire the reference signatures 117e directly from the local environment via a sensor(s) 116. The data sensed by the sensor 116 is selected by the user via the switch 850 and loaded directly into the reference memory array 860. Preferably, several seconds of signal are collected in this particular application. Then, the preprocessor 870 reformats the reference data to enable rapid correlation, preferably by Fourier transform.

iii. Third Mode

In a third mode of operation, the event detection engine 815 monitors the sensor data continuously (at discrete successive short time intervals due to the computer-based architecture) for data that matches those stored in the reference memory array 860. To reduce computational burden, the preprocessor 870 is designed to monitor the sensor 116 for a preset threshold level of signal data before beginning the correlation process. When the signal data exceeds the preset threshold level, the preprocessor 870 begins executing a Fourier transform. After several seconds or a period equal to the period of the reference signatures 117e, the transformed active sensed data is stored at the output of the preprocessor 870. Then, array addressing logic 880 begins selecting one reference signature 117e at a time for correlation. Each reference signature 117e is correlated by a correlator 890 with the active sensed data to determine if the reference signature 117e matches the active sensed data.

A comparator 900 compares the magnitude of the output of the correlator 890 with a threshold to determine a match. When searching for a match, the correlator 890 is compared with a fixed threshold. In this case, the switch 910 selects a fixed threshold 911 for comparison. If the correlation magnitude exceeds the fixed threshold 911, then the comparator 900 has detected a match. The comparator 900 then activates the correlation identifier register 420 and the correlation magnitude register 930. The magnitude of the comparison result is stored in the correlation magnitude register 930, and the identity of the event is stored in the correlation identifier register 920. The fixed threshold 911 can be predefined by a programmer or the user of the WCD 104.

After event detection by the event detection engine 815, the process is stopped and the array addressing logic 880 is reset. A search for new active sensed data then resumes.

iv. Fourth Mode

In a fourth mode of operation, the event detection engine 815 searches for the best match for the sensed data. In this case, the correlation magnitude register 830 is first cleared. Then, the switch 910 selects the output 912 of the correlation magnitude register 830 as the threshold input to the comparator 900. The array addressing logic 880 then sequentially selects all stored references 117e of a set for correlation. After each reference 117e in the set is correlated, the comparator 900 compares the result with previous correlations stored in the correlation magnitude register 930. If the new correlation magnitude is higher, then the new correlation magnitude is loaded into the correlation magnitude register 930, and the respective identifier is loaded into the correlation identifier register 920.

In an alternative embodiment, the correlation process can be performed by an associative process, where the active reference is associated directly with the stored references in a parallel operation that is faster than the sequential operation. New device technologies may enable associative processing. For example, reference memory array 860 can utilize content addressable memory devices for associative processing. ASIC devices and devices, such as the Texas Instruments TNETX3151 Ethernet switch incorporate content addressable memory. U.S. Pat. No. 5,216,541, entitled "Optical Associative Identifier with Joint Transform Correlator," which is incorporated herein by reference, describes optical associative correlation that can be utilized.

This correlation process continues until all stored reference signatures 117e in the set under analysis have been correlated. When the correlation process is complete, the correlation identifier register 920 holds the best match of the identity of the source of the active signal.

b. Sensor Selection Logic

As shown in FIG. 22B, the program code 802 is designed to read this register 920 and then determines which one or more sensors 116 will be utilized to identify the MTMA 105. In addition, the identity of the event can also be displayed as a photo or text description in a display 120 or as a verbal announcement via a speaker 120.

As an example, when the program code 801 detects an event in the form of a low temperature or a low temperature in combination with a high altitude, the program code 802 may be designed to analyze sensor data from those one or more sensors 116 that are used to determine if the MTMA 105 is skiing.

c. MTMA Identification Logic

The program code 803 is designed to identify the MTMA 105 from the selected sensor data, using any of the various techniques (e.g., frequency domain analysis, time domain analysis, correlation, etc.) described in the present disclosure.

2. Second Set of Embodiments

FIG. 22C is a flowchart of an example of a second set of embodiments of the MAI system 101 that employs an environmental event detection algorithm 113 in order to assist with identifying one or more MTMAs 105. As shown in FIG. 22C, the MAI system 101 includes at least the following program code (or logic): program code 1001 (event detection logic) designed to detect an event in the environment associated with the WCD 104; program code 1002 (MTMA selection logic) designed to select a set of one or more MTMAs 105 that will be the focus of the identification analysis (i.e., those that the MAI system 101 will attempt to identify), the selection being based upon the event detection; and program code 803 (MTMA identification logic) designed to detect the MTMA 105 by analyzing the data from the selected sensors 116 or sensor data. The event can be any environmental occurrence in an environment associated with the WCD 104, for example but not limited to, an acoustic, thermal, magnetic, optical, electromagnetic, chemical, dynamic, wireless, atmospheric, or biometric condition.

The program code 1001, which is designed to detect an event in the environment associated with the WCD 104, can take various forms. In some embodiments, the program code 1001 is implemented the same way that program code 801 is implemented, utilizing the event detection engine of FIG. 22B.

The program code 1002 (MTMA selection logic), which is designed to select one or more MTMAs 105 that the MAI system 101 will attempt to identify, can take various configurations.

The program code 1003 is designed to identify the MTMA 105 from the selected set of one or more MTMAs 105 using any of the various techniques (e.g., frequency domain analysis, time domain analysis, correlation, etc.) described in the present disclosure.

3. Third Set of Embodiments

FIG. 22D is a flowchart of an example of a third set of embodiments of the MAI system 101 that employs an environmental event detection algorithm 113 in order to assist with identifying one or more MTMAs 105. As shown in FIG. 22D, the MAI system 101 includes at least the following program code (or logic): program code 1011 (event detection logic) designed to detect an event in the environment associated with the WCD 104; program code 1012 (sensor and MTMA selection logic) designed to initiate and/or select a set of one or more sensors 116 and/or sensor data and to select a set of one or more MTMAs 105 that will be the focus of the identification analysis (i.e., those that the MAI system 101 will attempt to identify), the foregoing selections being based upon the event detection; and program code 803 (MTMA identification logic) designed to detect the one or more MTMAs 105 by analyzing the data from the selected sensors 116 or sensor data. The event can be any environmental occurrence in an environment associated with the WCD 104, for example but not limited to, an acoustic, thermal, magnetic, optical, electromagnetic, chemical, dynamic, wireless, atmospheric, or biometric condition.

The program code 1011, which is designed to detect an event in the environment associated with the WCD 104, can take various forms. In some embodiments, the program code 1011 is implemented the same way that program code 801 is implemented, utilizing the event detection engine of FIG. 22B.

The program code 1012 (sensor and MTMA selection logic), which is designed to select one or more MTMAs 105 that the MAI system 101 will attempt to identify, can take various configurations.

The program code 1013 is designed to identify the MTMA 105 from the selected set of one or more MTMAs 105 using any of the various techniques (e.g., frequency domain analysis, time domain analysis, correlation, etc.) described in the present disclosure.

4. Fourth Set of Embodiments

FIG. 22E is a flowchart of an example of a fourth set of embodiments of the MAI system 101 that employs an environmental event detection algorithm 113 in order to assist with identifying one or more MTMAs 105. As shown in FIG. 22E, the MAI system 101 includes at least the following program code (or logic): program code 1021 designed to receive data from one or more sensors 116; program code 1022 (MTMA detection logic) designed to detect an MTMA 105 based upon the sensor data; program code 1023 (event detection logic) designed to detect an event in the environment associated with the WCD 104, after or during the MTMA detection process implemented by the program code 1022; program code 1024 designed to perform a verification process to determine whether the detected MTMA 105 is correct, incorrect, or questionable. In some embodiments, if the MTMA 105 is incorrect or questionable, then the MAI system 101 can attempt another identification of the MTMA 105. In some embodiments, if correct, then any metric associated with the MTMA detection certainty can be increased.

As an example, assume that the MTMA 105 has been identified as running. Then, an event in the form of a motor vehicle engine noise is detected, which calls into question whether or not the MTMA 105 is in fact running. In this case, the MAI system 101 may attempt another identification to insure that the MTMA is running.

The program code 1022, which is designed to identify the MTMA 105 from the sensor data can use any of the various techniques (e.g., frequency domain analysis, time domain analysis, correlation, etc.) described in the present disclosure.

The program code 1023, which is designed to detect an event in the environment associated with the WCD 104, can take various forms. In some embodiments, the program code 1023 is implemented the same way that program code 801 is implemented, utilizing the event detection engine of FIG. 22B.

5. Fifth Set of Embodiments

FIG. 22F is a flowchart of an example of a fifth set of embodiments of the MAI system 101 that employs an environmental event detection algorithm 113 in order to assist with identifying one or more MTMAs 105. As shown in FIG. 22F, the MAI system 101 includes at least the following program code (or logic): program code 1031 designed to receive data from one or more sensors 116; program code 1032 (MTMA detection logic) designed to detect an MTMA 105 based upon the sensor data; program code 1033 (event detection logic) designed to detect an event in the environment associated with the WCD 104; program code 1034 designed to identify a second MTMA 105 based at least in part upon the detected event.

In some embodiments, the program code 1034 identifies the second MTMA 105 based not only upon the detected event, but also historical data 117b.

Q. Embodiments of MAI Systems That Employ Data From Multiple WCDs

The following embodiments of the MAI system 101 are designed to analyze data associated with a plurality of WCDs 104 in order to identify one or more MTMAs 105.

1. First Set of Embodiments

FIG. 23A is a flowchart of an example of a first set of embodiments of the MAI system 101 that analyzes data associated with a plurality of WCDs 104, specifically sensor data from one or more sensors 116 associated with each WCD 104, in order to identify one or more MTMAs 105. As shown in FIG. 23, the MAI system 101 includes at least the following program code (or logic): program code 1101 designed to receive data from (a) one or more sensors 116 associated with the local WCD 104 and (b) one or more sensors 116 associated with one or more remote WCDs 104; and program code 1102 designed to identify the MTMA 105 based upon the sensor data.

The WCDs 104 can be designed to communicate using any of numerous communication technologies, including for example, Bluetooth, WiFi, etc.

In some embodiments, the sensor data from the local and remote WCDs 104 is from the same type of sensor (e.g., pressure sensor data from a local and remote sensor 116). An algorithm 115 (FIG. 2D) can be designed to analyze the sensor data and identify the MTMA 105 associated with the local WCD 104 and perhaps even the remote WCD 104. Signal processing techniques described elsewhere in this disclosure can be employed.

In some embodiments, the sensor data is from different types of sensors (e.g., accelerometer data from one and GPS data from another). An algorithm 115 (FIG. 2D) can be designed to analyze the sensor data from the different sensors 116 and identify the MTMA 105 associated with the local WCD 104 and perhaps even the remote WCD 104. Signal processing techniques described elsewhere in this disclosure can be employed.

2. Second Set of Embodiments

FIG. 23B is a flowchart of an example of a second set of embodiments of the MAI system 101 that analyzes data indicative of an MTMA 105 of one or more remote WCDs 104 in order to identify one or more MTMAs 105 associated with a local WCD 104. The idea with this set of embodiments is that knowledge of a remote MTMA 105 of a remote WCD 104 can sometimes assist a local WCD 104 in determining its MTMA 105. As shown in FIG. 23B, the MAI system 101 includes at least the following program code (or logic): program code 1121 designed to receive data locally from one or more sensors 116; program code 1122 designed to receive a message that a remote party is involved in a particular MTMA 105 (remote MTMA 105); and program code 1123 designed to identify a local MTMA associated with the local WCD 104 based upon the local sensor data and the remote MTMA 105 of the remote WCD 104.

With respect to the program code 1122, the message can take any suitable form that indicates the particular MTMA 105 associated with the remote WCD 104. Furthermore, the message can be communicated directly or indirectly from the remote WCD 104 to the local WCD 104, or communicated from some other computer system that has knowledge of the remote MTMA 105. Moreover, the message can be pushed or pulled (solicited) to the local WCD 104.

The program code 1123 can take a variety of possible configurations. As an example, it may be known, based upon historical data 117b, that two WCDs 104 exhibit the same MTMA 105 most of the time or most of the time during a particulars time period. In this case, the identification of the remote MTMA 105 can assist the local WCD in determining its MTMA 105. An algorithm 113 can give substantial weight to the remote MTMA 105 in determining the local MTMA 105.

Furthermore, note that the remote WCD 104 can be in close proximity to the local WCD 104, for example, each could be associated with a runner, the runners running side by side.

In some embodiments, the MAI system 101 and/or the AD system 102 of the local WCD 104 may be designed with program code that communicates information to the local user indicating the identity of the remote MTMA 105 and perhaps other information, for example, the location of the remote WCD 104, etc. Such information could enable the local user to associate with the remote user, if desired. As an example, one runner may wish to join another runner.

R. Embodiments of MAI Systems That Employ Sampling Rate Changes to Enhance MTMA Detection FIG. 23C is a flowchart of an example of a set of embodiments of the MAI system 101 that employs a change in the sampling rate in order to enhance MTMA detection. As shown in FIG. 23C, the MAI system 101 includes at least the following program code (or logic): program code 1131 designed to receive sensor data from one or more sensors 116; program code 1132 designed attempt to identify the MTMA 105 (contingent MTMA 105) based upon the sensor data; program code 1133 designed to acquire one or more new sensor data sets by changing a data sampling rate when the MTMA identification is not possible or not identifiable beyond a certain level of confidence; and program code 1134 designed to identify the MTMA 105 based upon the new sensor data associated with the new sampling rate(s).

In some embodiments, the program code 1132 and/or program code 1133 can be designed to produce a probability or other metric and compare same to a threshold in order to determine if the MTMA 105 can be identified with sufficient confidence.

The program code 1133 may be designed to iteratively change the sampling rate one or more times in order to produce a respective number of data sets for analysis.

The program code 1133 can be designed to increase, decrease, or both increase and decrease the sampling rate of the sensor data in order to produce more data sets for analysis.

In some embodiments, wherein the sampling rate is increased, the new sampled data is analyzed alone or in combination with one or more previous sampled data in order to attempt to make the MTMA identification. In these embodiments, one or more noise filters may need to be employed due to the increase in data samples.

In some embodiments, wherein the sampling rate is decreased, the new sampled data is analyzed alone or in combination with one or more previous sampled data in order to attempt to make the MTMA identification. In these embodiments, noise is reduced, which can lead to a more accurate MTMA identification in some instances.

In some embodiments, wherein the sampling rate is both increased and decreased, the new sampled data is analyzed alone or in combination with one or more previous sampled data in order to attempt to make the MTMA identification.

S. Embodiments of Action Determination (AD) Systems

Once the MTMA 105 is identified and the pertinent information communicated to the AD system 102 by the MAI system 101, the AD system 102 can take any appropriate intelligent activity based action. The action can be the placement of an order for or purchase of a good or service, causing delivery or pickup of a good or service, solicitation of or selection and output of an advertisement, temporary or permanent prevention of a requested communication session, activating and/or deactivating one or more programs and/or devices (GPS receiver, WiFi transceiver, Bluetooth transceiver, cellular transceiver, program drivers associated with any of the foregoing, etc.) associated with the WCD 104 based at least in part upon the MTMA (e.g., to save WCD battery power), etc.

In some embodiments, the AD system 102 can implement one or more algorithms 115 (FIG. 2D) in order to determine an appropriate action.

A history of MTMAs 105 may be recorded, as part of historical data 117*b* (FIG. 2E), for mere analysis purposes.

The AD system 102 may be designed to store statistics of the MTMAs 105 over a prolonged period of time and provide the statistics or a derivative thereof to a user. For example, the user can be provided with a listing of the percentage of time spent walking or running during a day. These percentages can be computed from simple algorithms 115.

If the MTMA 105 is a form of exercise or entertainment, then the AD system 102 of the WCD 104 may be designed to turn on an audio file, such as music. If the MTMA 105 stops, for example, if the WCD 104 user stops during a jog or a bike ride, the AD system 102 could be designed to pause or turn down the volume of the audio file. The AD system 102 may also be designed to play different audio based on what MTMA 105 is identified. For example, the user may have different playlists for jogging and for bike rides.

The knowledge a user's performed MTMAs 105 can be used to analyze a user's daily patterns and report any anomalies. For example, if the user is known to take the bus/drive to work at a specific time every weekday, then if the user oversleeps, the AD system 102 can be designed to cause the WCD 104 to sound an alarm.

Studying the user's daily/weekly/monthly habits can provide information for more effective advertising. A person who regularly jogs may be pushed advertisements for running shoes. Also, a user can be alerted in the event of health related problems determined by the studies.

In some embodiments, user preferences (input by the user and stored as user preferences data 117*c* of FIG. 2E) can define one or more actions to initiate based upon detection of an MTMA 105, a plurality of MTMAs 105 (e.g., a sequence, total number, total time associated with the plurality, etc.), etc.

In some embodiments, the AD system 102 can be designed to initiate one or more actions based upon detection of an MTMA 105, a plurality of MTMAs 105 (e.g., a sequence, etc.), etc. in combination with detection of an event, a plurality of events (e.g., a sequence, etc.), etc. by the event detection engine 815 (FIG. 22B).

In some embodiments, the AD system 102 can be designed to identify a proposed action, communicate the proposed action to the user, and request confirmation from the user that the action is appropriate, before initiating the proposed action.

In some embodiments, the AD system 102 can be designed to communicate information to a remote WCD 104 that indicates the identity of the MTMA 105 associated with the local WCD 104, along with perhaps other information, for example, a location of the local WCD 104, so that the remote user can meet with the local user based upon the common MTMA 105.

In some embodiments, the AD system 102 can be designed to initiate a communication session with a remote communication device to request an action based upon the identification of an MTMA 105, a plurality of MTMAs 105, length of an MTMA 105, etc.

In some embodiments, the AD system 102 can be designed to initiate commencement of at least one of a sequence of steps for implementing an action based upon a contingent determination of an MTMA 105, and then later, if it is determined that the contingent MTMA 105 was incorrect, then cancel the action by stopping the commencement of further steps of the sequence.

In some embodiments, the AD system 102 (or the MAI system 101) may be designed to interject a delay period after detection of an MTMA 105 and commencement of an action. This would be desirable in embodiments where the initially detected MTMA 105 is determined to be erroneous at a later time, in which case the action item may be changed.

T. Embodiments Employing MAI System and AD System

The following description sets forth various exemplary embodiments that employ both the MAI system 101, in whole or in part, and the AD system 102, in whole or in part, in order to detect one or more MTMAs 105 and then initiate one or more intelligent activity based actions. It should be emphasized however that, although some specific examples of combined systems are set forth hereafter, any combination of embodiments of the MAI system 101 and the AD system 102 described elsewhere in this document are potentially combinable.

1. First Set of Embodiments

FIG. 24A is a flowchart of an example of a first set of embodiments, which involves selecting actions based upon user preferences. As shown in FIG. 24A, the first set of embodiments includes at least the following program code (or logic): program code 1201 designed to receive data from one or more sensors 116; program code 1202 designed to store user preferences (user preferences data 117*c* of FIG. 2E) defining an action to be initiated or taken when one or more MTMAs 105 are detected; program code 1203 designed to detect the one or more MTMAs 105 based upon the sensor data from the one or more sensors 116; and program code 1204 designed to initiate or take an action based upon the detected one or more MTMAs 105 and the user preferences.

2. Second Set of Embodiments

FIG. 24B is a flowchart of an example of a second set of embodiments, which involves initiating an action based upon event detection while involved in an MTMA 105. As shown in FIG. 24B, the second set of embodiments includes at least the following program code (or logic): program code 1211 designed to receive data from one or more sensors 116; program code 1212 designed to detect an MTMA 105 based upon the sensor data from the one or more sensors 116; program code 1213 designed to detect the one or more events in a local environment associated with the WCD 104 based upon environment data from the one or more sensors 116; and program code 1214 designed to initiate or take an action based upon the detected one or more MTMAs 105 and the detected one or more events. In some embodiments, the events can be detected using the event detection engine 815 (FIG. 22B).

3. Third Set of Embodiments

FIG. 24C is a flowchart of an example of a third set of embodiments, which involves requesting user confirmation of an identified action. As shown in FIG. 24C, the third set of embodiments includes at least the following program code (or logic): program code 1221 designed to receive data from one or more sensors 116; program code 1222 designed to detect an MTMA 105 based upon the sensor data from the one or more sensors 116; program code 1223 designed to identify one or more actions to initiate or take, communicate the action to the user with an appropriate I/O device 120 (FIG. 2D), and request confirmation from the user that the action is permissible and/or appropriate; and program code 1224 designed to initiate or take the action based upon the detected one or more MTMAs 105 when the confirmation is received from the user. In some embodiments, the action involves initiating and engaging in a communication session with a remote communication device to request an action.

4. Fourth Set of Embodiments

FIG. 24D is a flowchart of an example of a fourth set of embodiments, which involves detecting a plurality of the same or different MTMAs 105 (e.g., a sequence, number of instances, length of time associated with a plurality of the same MTMAs 105, etc.) and initiating one or more actions based upon the detected plurality. As shown in FIG. 24D, the fourth set of embodiments includes at least the following program code (or logic): program code 1231 designed to receive data from one or more sensors 116; program code 1232 designed to detect a plurality of MTMAs 105 based upon the sensor data from the one or more sensors 116; and program code 1233 designed to initiate one or more actions based upon the detected plurality of MTMAs 105.

In some embodiments, the program code 1233 may be designed with code that computes a value indicative of a number of MTMA sessions, compares the value with a redefined threshold (which could be predefined with user preferences data 117c), and initiates the action based upon the comparison.

In some embodiments, the action involves initiating and engaging in a communication session with a remote communication device to request an action.

5. Fifth Set of Embodiments

FIG. 24E is a flowchart of an example of a fifth set of embodiments, which involves tracking the time period (or length of time) associated with one or more MTMAs 105 and initiating an action based upon the time period. As shown in FIG. 24E, the fifth set of embodiments includes at least the following program code (or logic): program code 1241 designed to receive data from one or more sensors 116; program code 1242 designed to detect a time period associated with the one or more MTMAs 105 based upon the sensor data from the one or more sensors 116; and program code 1243 designed to initiate one or more actions based upon the time period.

In some embodiments, the action involves initiating and engaging in a communication session with a remote communication device to request an action.

As a nonlimiting example, consider a scenario where the system is designed to place a purchase order for a new pair of running shoes after a user has run in excess of 100 hours.

6. Sixth Set of Embodiments

FIG. 24F is a flowchart of an example of a sixth set of embodiments, which involves a conditional selection of an action and permitting or cancelling the full completion of the action based upon subsequently received MTMA detection information. As shown in FIG. 24F, the sixth set of embodiments includes at least the following program code (or logic): program code 1251 designed to receive data from one or more sensors 116; program code 1252 designed to detect an MTMA 105 (contingent MTMA) based upon the information that is currently available to make the decision; program code 1253 designed to request commencement of at least one of a sequence of steps or implementing an action based upon the detected contingent MTMA 105; and program code 1254 designed to, based upon a further analysis of the sensor data, conclude that the contingent MTMA 105 is incorrect and cancel the action by stopping the commencement of a further one or more steps of the sequence, or in the alternative, conclude that the contingent MTMA 105 is correct and permit completion of the one or more steps of the sequence.

In some embodiments, the action involves initiating and engaging in a communication session with a remote communication device to request an action.

As a nonlimiting example, consider a scenario where the system is designed to place a purchase order for a new pair of running shoes after a user has run in excess of 100 hours.

7. Seventh Set of Embodiments

FIG. 24G is a flowchart of an example of a seventh set of embodiments, which involves a conditional selection of an action and permitting or cancelling the full completion of the action based upon subsequently received MTMA detection information. As shown in FIG. 24G, the seventh set of embodiments includes at least the following program code (or logic): program code 1261 designed to receive data from one or more sensors 116; program code 1262 designed to identify a first contingent MTMA 105 and a second contingent MTMA 105 based upon an initial analysis of the sensor produced data; program code 1263 designed to initiate or otherwise request commencement of at least one of a first sequence of first steps for implementing a first action based upon the determined first contingent MTMA 105; program code 1264 designed to initiate or otherwise request commencement of at least one of a second sequence of second steps for implementing a second action based upon the determined second contingent MTMA 105; program code 1265 designed to, based upon a further analysis of the sensor produced data, (a) determine that the first contingent MTMA 105 was incorrect, cancel the first action by stopping the commencement of a further one or more first steps of the first sequence, and permit the second action to be implemented, or in the alternative, (b) determine that the first contingent MTMA 105 was correct and permit commencement of the remaining first steps of the first action to permit completion of same, while cancelling the second action by stopping the commencement of the remaining second steps of the second sequence. Note that, in some embodiments, the first and second actions can be commenced substantially concurrently. Furthermore, in some embodiments, the permission and cancellation of actions can occur substantially concurrently In some embodiments, the detection of the first and second contingent MTMAs may be based upon probabilities that are derived for each MTMA 105 and a predefined threshold.

In some embodiments, the program code 1265 may be designed to select which action to permit and which action to cancel based upon probabilities of each that have been later computed or received.

8. Eighth Set of Embodiments

FIG. 24H is a flowchart of an example of an eighth set of embodiments, which involves interception of a communication attempt to the WCD 104 and determining whether to permit or prevent consummation of the communication session based upon a detected MTMA 105. As shown in FIG. 24H, the eighth set of embodiments includes at least the following program code (or logic): program code 1271 designed to receive a request (or indication) from a requestor to engage in a communication session with the WCD 104 associated with the MT 106; program code 1272 designed to detect an MTMA 105 pertaining to the MT 106 associated with the WCD 104 from the plurality of possible MTMAs 105, based at least in part upon an analysis of sensor data from one or more sensors 116 associated with the WCD 104; and program code 1273 designed to determine whether to permit or prevent (at least initially) (a) consummation of the communication session, (b) an alert associated with the attempted communication session, or (c) both (a) and (b), based at least in part upon the detected MTMA 105.

The request observed by the program code 1271 can be any data indicative of an incoming telephone call, an incoming text message, an incoming email, etc.

The program code 1272, which is designed to detect the MTMA 105, is architected using any of the methodologies described elsewhere in this document.

The program code 1273 may be designed to use an algorithm 115 (FIG. 2D) to assist in its decision-making process.

The program code 1273 may be designed to access user preferences data 117c (FIG. 2E) to assist in its decision making process. As an example, the user may input a preference that indicates that the user is to receive no communications or alerts while jogging. Or, as another example, the user might input user preference data 117c that indicates that the user should receive incoming telephone calls while driving, but not emails or text messages.

In some embodiments, program code is provided and designed to, when the MTMA 105 terminates or after a predefined time period after the MTMA 105 terminates, produce a local alert (e.g., a displayed message on the screen, etc.) with the WCD 104 that advises the WCD user of the missed communication session and an identity (e.g., telephone number or name associated with an incoming call or text message, etc.) of the requestor. The foregoing features could also be activated and/or predefined by user preferences data 117c (FIG. >2E).

In some embodiments, program code is provided and designed to communicate a message to the remote requestor indicating that the communication session is being prevented and perhaps even a reason why. The MTMA 105 in which the MT 106 is involved could also be communicated to the requestor. As an example, a prerecorded message could be sent to a caller that explains that the called party cannot speak at the present time because the called party is running, driving, etc.

In some embodiments, program code is provided and designed to, when the MTMA 105 terminates or after a predefined time period after the MTMA 105 terminates, produce a local alert with the WCD 104 that advises a WCD user of the missed communication session and an identity of the requestor.

In some embodiments, program code is provided and designed to enable the requestor to provide one or more inputs that cause the WCD 104 to automatically alert or initiate a communication session with the WCD user when or a specified time period after the MTMA terminates. As an example, keystroke or voice recognition software can be employed to communicate such information with a voice band caller.

In some embodiments, program code is provided and designed to communicate a message to the requestor indicating a manner in which the request may be fulfilled, despite the initial prevention. For example, the message may indicate a number of times in which the requestor should make future requests in order for the communication session to be consummated. As another example, the message may indicate a time period in which the requestor should wait before initiating another request to engage in another communication session with the WCD 104. As yet another example, the message could indicate a ring cadence to be employed in a first future request in order for the communication session to be consummated in connection with a second future request.

In some embodiments, program code is provided and designed to store requestor identification data 117f (FIG. 2E; telephone number, email address, text message identifier, etc.) in database 119 or elsewhere in memory 102 (FIG. D), compare received requestor identification information associated with the request with the stored requestor identification data 117f, and perform the preventing at least in part upon the comparison.

In some embodiments, program code is provided and designed to communicate a message to the requestor indicating a different communication method that can be employed to communicate with the WCD 104 or the user of the WCD 104. For example, the message may advise the requestor to call a different telephone number, to send an email (and perhaps indicate an email address), to send a text message (and perhaps indicate a number to send the message), etc.

In some embodiments, program code is provided and designed to, prevent the communication session, at least initially, and then, after detecting an event (See Section XI herein), permit communication with the WCD 104.

In some embodiments, program code is provided and designed to communicate an alert to a user of the WCD 104, and enable the user to enter one or more inputs to the WCD 104 that will cause permission or prevention of the communication session, notwithstanding the detected MTMA 105.

In some embodiments, the program code 1273 may be designed to prevent consummation of the communication session based upon a detected MTMA 105A and to select and initiate a notification method to notify or communicate to the user or the user's designee. The notification methods can include, for example but not limited to, engaging in a telephone communication session with a different communication device; engaging in a voicemail communication session; engaging in a voicemail communication session within a particular voicemail queue; or forwarding the incoming request to another telephone number, email address, or text address. In yet other embodiments, the program code 1273 is designed to cause translation of a voice call or message into a text message or email message, using conventional translation software and then forward same to a text address or email address, respectively. An example of a translation system that could be utilized is described in U.S. Pat. No. 8,139,726, which is incorporated herein by reference in its entirety.

9. Ninth Set of Embodiments

FIG. 24I is a flowchart of an example of a ninth set of embodiments, which involves causing an advertisement 107 (FIG. 2D) to be communicated to a user of the WCD 104 based upon the detected MTMA 105. As shown in FIG. 24I, the ninth set of embodiments includes at least the following program code (or logic): program code 1281 designed to detect an MTMA 105 pertaining to the MT 106 associated with the WCD 104 from the plurality, based at least in part upon an analysis of sensor data from one or more sensors 116 associated with the WCD 104, and causing an advertisement 107 to be communicated to the user of the WCD 104 based at least in part upon the detected MTMA 105. The advertisement can be communicated to the user from the WCD itself or another communication device. The advertisement can be sent to the user via email, text message, telephonic voice message, etc.

As an example, it may be determined that the MTMA 105 is running. Further, an advertisement pertaining to runners could then be selected and communicated to the user of the WCD 104 while the user is running. The advertisement can be selected remotely and then communicated to the WCD 104, or selected locally on the WCD 104 and then communicated to the user.

These embodiments may be provided with program code that is designed to select the advertisement based in whole or in part upon the detected MTMA 105. More specifically, other sensor data may also be considered in selecting the advertisement, for example but not limited to, a location of the WCD 104 so that the selecting is further based upon the location in addition to the detected MTMA 105.

In some embodiments, a party (such as a telephone company, network service provider, etc.) may be involved in the selection and/or communication of the advertisement to the user. In this case, such party may receive a payment for or otherwise monetarily benefiting from causing the advertisement to be communicated. In further embodiments of this nature, such party could enable an advertiser to communicate the advertisement directly to the WCD 104 by advising a remote computer system associated with the advertiser of WCD identification information (e.g., telephone number, email address, etc.) and MTMA identification information.

In some embodiments, program code is provided and designed to enable a user of the WCD 104 to enable and disable the receipt of an advertisement(s).

10. Tenth Set of Embodiments

FIG. 24J is a flowchart of an example of a tenth set of embodiments, which involves activating and/or deactivating one or more programs and/or subsystems associated with the MCD 104 based upon the detected MTMA 105. As shown in FIG. 24J, the tenth set of embodiments includes at least the following program code (or logic): program code 1291 designed to detect an MTMA 105 pertaining to the MT 106 associated with the WCD 104 from the plurality, based at least in part upon an analysis of sensor data from one or more sensors 116 associated with the WCD 104, and program code 1292 designed to activate, deactivate, or change an operational characteristic of one or more programs and/or subsystems based at least in part upon the detected MTMA.

There are many possible scenarios that could involve these embodiments. An example would be to deactivate a power consuming program and/or subsystem (GPS receiver, WiFi transceiver, Bluetooth transceiver, cellular transceiver, texting engine, a smartphone function, any programs in or supporting any of the foregoing subsystems, etc.) to preserve battery power. Another example would be to activate a timer when it is determined that MT 106 is running in order to track the length of the run in terms of time. Yet another example would be tracking distance traveled while driving in a motor vehicle using a GPS receiver. Still another example would be, in the context of running, to play music, to play music that substantially matches the cadence of the running motion, etc.

In some embodiments, a confirmation request can be communicated to the WCD user to enable the user to confirm whether or not to activate and/or deactivate a program or subsystem. See section VI herein, involving confirmation techniques.

In some embodiments, an operational characteristic of a map program is changed. The operational characteristic can be the type of information associated with a map image. For example, when a person transitions from riding in a motor vehicle to walking, the map image can be changed so that the image is more appropriate for walking. The map image associated with riding in a motor vehicle may show gas stations, etc., while the map image associated with walking may show restaurants, bars, etc. The operational characteristic could also be the scale of the image. A higher scale (a larger distance per unit of length in the map image) could be associated with riding as opposed to walking.

U. Variations, Modifications, and Other Possible Applications

It should be emphasized that the above-described embodiments of the present invention, particularly, any "preferred" embodiments, are merely possible nonlimiting examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention.

With respect to variations, note that although one or more elements of one embodiment may not be described in connection with another, the elements can typically be employed in the other embodiment.

As another example of a variation, the calculations for identifying the MTMA may rely on the raw readings from the accelerometer along the three axes or the combined net acceleration in the horizontal direction, or total net acceleration. That is, the data may be manipulated into a different form, such as rotation about the axes (similar to gyroscope data).

As yet another example of a variation, in some embodiments, the MTMA 105 may be identified without the normalization process of the present disclosure with a one axis, two axis, or three axis accelerometer. As a nonlimiting example, if the MTMAs 105 to be identified are standing and moving, this can be determined from analyzing the raw accelerometer data without rotating or otherwise normalizing the data by merely reviewing the data for a change, which would indicate movement and a non-change, which would indicate standing. However, as more MTMAs 105 are added to the list of those that need to be identified, the normalization process of the present disclosure becomes more desirable because it enables more accurate analysis of acceleration data and therefore MTMA identification.

As still another variation, when an MTMA 105 is "detected" as mentioned in connection with many embodiments, this can be changed to a transition to or a transition from the MTMA 105 in alternative embodiments (as opposed to current involvement in the MTMA 105).

As yet another variation, in some embodiments, the MIA and AD systems associated with a WCD 104 can learn a WCD owner's one or more MTMAs and then make a determination that the WCD 104 has been stolen, in which case, a remedial action(s) can be initiated, such as deactivating the WCD 104, purging data stored on or in connection with the WCD 104, etc. For example, the MIA may identify an owner's particular walking style, and then detects that another person is carrying the WCD 104.

V. Appendix

The following is a nonlimiting example of source code (in Python code) that can be employed to implement the fourth set of embodiments of the MAI system (that employs normalization) of FIG. 7 in order to identify a most probable MTMA 105.

```
from numpy import *
from scipy import *
import scipy as Sci
import scipy.linalg
import sys
import time
def approxMotion(file, mtn, ran, output):
    bolMot = array([0, 0.0, 0.0, 0.0, 0.0, 0.0]);
    T = [ ]; hX = [ ]; hY =[ ]; hZ =[ ];
    f = open(file);
    lines = f.readlines( )
    for line in lines:
        items = str.split(line)
        T.append(float(items[0]) ); hY.append( float(items[2]) );
        hX.append(float(items[1]) ); hZ.append( float(items[3]) );
    f.close( )
    percentages = [0.0, 0.0, 0.0, 0.0];
    n = 256; #length of data sample
    upd = 256; #number of points shifted by
    s1 = 60*15-1; f1 = s1+n; #omit the first 15sec, set strt/fin of 1st sample
    nmax = int(floor((len(hZ) - f1)/upd )+1);
    m = 0
    correct = 0; #DEBUG number of correctly identified points
    mTotal = 0; #DEBUG tracking variable
    for k in range(0, nmax):
        timeR = T[s1:f1]; t = timeR[0];
        timeR = [x - t for x in timeR];
        hR = hZ[s1:f1];
        sR = [x**2 + y**2 for x,y in zip(hX[s1:f1],hY[s1:f1])];
        sR = [sqrt(x) for x in sR];
        ret = findMotion(hR, sR, timeR, ran);
        m = ret[0];
        if output == 1:
            print( file+' Time: '+str(T[s1])+' to '+str(T[f1])+' Motion is '+str(m));
        mTotal = mTotal + m/nmax;
        if ran == 0:
            print ("%.2f" % ret[1]+ ' ' + "%.2f" % ret[2]+
                ' ' + "%.2f" % ret[3]+' ' + "%.2f" % ret[4]);
            print (" ");
        percentages[0] = percentages[0] + ret[1]/nmax;
        percentages[1] = percentages[1] + ret[2]/nmax;
        percentages[2] = percentages[2] + ret[3]/nmax;
        percentages[3] = percentages[3] + ret[4]/nmax;
        if m == mtn:
            correct = correct + 1;
        elif m == -2 or m == -1:
            correct = correct+1;
        s1 = s1+upd; f1 = f1+upd;
    if output == 2:
        print( file + ' ' + str(correct/nmax)));
        print("%.2f" % percentages[0]+ ' ' + "%.2f" % percentages[1]+
            ' ' + "%.2f" % percentages[2]+' ' + "%.2f" % percentages[3]);
    if correct/(nmax-1) > 0.5:
        bolMot[0] = 1;
    else:
        bolMot[0] = 0;
    bolMot[1] = float(correct/(nmax));
    bolMot[2] = percentages[0]; bolMot[3] = percentages[1];
    bolMot[4] = percentages[2]; bolMot[5] = percentages[3];
    return bolMot;
```

Secondary Methods Utilized by the Main Motion Identification Method:

```
def peakdet(v, delta, x):
    """
    %PEAKDET Detect peaks in a vector
    %  [MAXTAB, MINTAB] = PEAKDET(V, DELTA, X) finds the
    %  local maxima and minima ("peaks") in the vector V.
    %
    %  A point is considered a maximum peak if it has the maximal
    %  value, and was preceded (to the left) by a value lower by
    %  DELTA.
    % Eli Billauer, 3.4.05 (Explicitly not copyrighted).
    % This function is released to the public domain; Any use is allowed.
    """
    maxtab = [ ]
    mintab = [ ]
    if x is None:
        x = arange(len(v))
    v = asarray(v)
    if len(v) != len(x):
        sys.exit('Input vectors v and x must have same length')
    if not isscalar(delta):
        sys.exit('Input argument delta must be a scalar')
    if delta <= 0:
        sys.exit('Input argument delta must be positive')
    mn, mx = Inf, -Inf
    mnpos, mxpos = NaN, NaN
    lookformax = True
    for i in arange(len(v)):
        this = v[i]
        if this > mx:
            mx = this
            mxpos = x[i]
        if this < mn:
            mn = this
            mnpos = x[i]
        if lookformax:
            if this < mx-delta:
                maxtab.append((mxpos, mx))
                mn = this
                mnpos = x[i]
                lookformax = False
        else:
            if this > mn+delta:
                mintab.append((mnpos, mn))
                mx = this
                mxpos = x[i]
                lookformax = True
    return maxtab, mintab
def powermeans(X, W, r):
    """
    Computes the mean using the formula
    [(sum x**r)/n]**(1/r).
    A general function, use specific functions
    for more accuracy, example, for r == 1,
    call the mean(X, method= ...). See previous blogs.
    X - original data
    W - optional weight array.
    r - power (usually integer valued.)
    """
    n = len(X)
    if W is None:
        if r == -1: #harmonic mean
            return 1.0 / (sum([ (1.0/x) for x in X])/n)
        elif r == 0: # geometric mean
            return exp(sum([(log(x) for x in X)])/n)
        elif r == 1: # arithmetic mean.
            return sum(X) / float(n)
        elif r == 2: # rms.
            return sqrt(sum([x*x for x in X])/n)
        else:
            return (sum([x**r for x in X])/n)**(1.0/r)
    else:
        if r == -1: #harmonic mean
            return 1.0 / (sum([ w * (1.0/x) for x,w in zip(X,W)])/sum(W))
        elif r == 0: # geometric mean
            return exp(sum([w * (log(x) for (x,w) in zip(X,W))])/sum(W))
        elif r == 1: # arithmetic mean.
            return sum(w * x for (x, w) in zip(X,W)) / float(sum(W))
```

-continued

```
    elif r == 2: # rms.
        return sqrt(sum([w * x*x for x,w in zip(X,W)])/sum(W))
    else:
        return (sum([w * x**r for x,w in zip(X,W)])/n)**(1.0/(sum(W)))
def nextpow2(i):
    n = 2
    while n < i: n = n * 2
    return n
def percentages (Mw, Mr, Mc, Mb):
    bottom = min(Mw, Mr, Mc, Mb) - 1;
    MwU = Mw - bottom; MrU = Mr - bottom;
    McU = Mc - bottom; MbU = Mb - bottom;
    total = MwU + MrU + McU + MbU;
    return [MwU/total, MrU/total, McU/total, MbU/total,];
```

Implementation of the Main Motion Identification Method:

```
def findMotion(hZ, sXY, timeR):
# Accepts vectors hZ containing vertical acceleration, sXY containing
horizontal acceleration and timer containing the relative time stamp.
# Returns a vector where the first entry is the identified motion and the
entries 2-5 are the counters of each of the motions
    n = len(hZ);
    Az = sum(hZ, 0.0) / n; As = sum(sXY, 0.0) / n;
    stdZ = sqrt(var(hZ)*len(hZ)/(len(hZ)-1));
    stdS = sqrt(var(sXY)*len(sXY)/(len(sXY)-1));
    #taking the FT
    Fs = n/timeR[-1];
    NFFT = nextpow2(n);
    zFT = fft(hZ-Az, NFFT)/n;
    xyFT = fft(sXY, NFFT)/n;
    f = Fs/2*linspace(0,1,NFFT/2+1);
    fZ = 2*abs(zFT[0:NFFT/2+1]);
    fS = 2*abs(xyFT[0:NFFT/2+1]);
    rmsZ = powermeans(fZ, None, 2); rmsS = powermeans(fS, None, 2);
    varZ4 = sum([x**4 for x in hZ])/n;
    varZ3 = sum([(x-Az)**3 for x in hZ])/n;
    rmsNet = sqrt(sum([z**2 + s**2 for z,s in zip(hZ,sXY)])/n);
    var03 = sum([x**3 for x in sXY])/n;
    var04 = sum([(x-As)**3 for x in sXY])/n;
    peaksZ, mins = peakdet(fZ, max([0.033, 2*average(fZ)]), f)
    highFreqZ = average(fZ[n/4:]);
    if len(peaksZ) == 0:
        peaksZ = [0, 0];
        tallZ = sort(peaksZ);
    elif len(peaksZ) == 1:
        tallZ = [peaksZ[0][0], peaksZ[0][1]];
    else:
        tallZ = sorted(peaksZ, key = lambda k: k[1], reverse = True)
    if Az < -0.9 and stdZ < 0.015 and stdS < 0.015 and abs(As) < 0.01:
        return [-1, 0, 0, 0, 0];
    elif stdZ <0.02 and stdS <0.015 and abs(1-Az)<0.05 and abs(As) <0.05:
        return [-2, 0, 0, 0, 0];
    elif Az < 0.62 and stdZ > 0.5:
        return [2, 0, 1, 0, 0];
    elif Az > 0.6:
        Mw = 0; Mr = 0; Mc = 0; Mb = 0;
    if var03 > 0.05:
        Mc = Mc - 1;
    if var04 > 0.056:
        Mw = Mw+1; Mr = Mr +1;
        Mc = Mc - 2;
    if varZ3 > 0.005:
        Mc = Mc - 1;
    if average(fZ) < 1.2*highFreqZ:
        Mb = Mb +3; Mc = Mc + 4;
        Mw = Mw - 2; Mr = Mr - 2;
    #if there are high frequencies, the motion favours car or bike
    elif average(fZ) < 1.25*highFreqZ:
        Mb = Mb +3; Mc = Mc + 3;
        Mw = Mw - 1; Mr = Mr - 1;
    elif average(fZ) < 1.56*highFreqZ:
        Mb = Mb +2; Mc = Mc + 2;
        Mw = Mw - 1; Mr = Mr - 1;
    elif average(fZ) < 1.93*highFreqZ:
        Mb = Mb +2; Mc = Mc + 1;
    elif average(fZ) < 2.2*highFreqZ:
        Mb = Mb +1;
    elif average(fZ) < 2.5*highFreqZ:
        Mb = Mb +1;
        Mw = Mw + 1; Mr = Mr + 1;
    else:
        Mw = Mw + 1; Mr = Mr + 1;
        Mc = Mc - 1;
    #favour running for low ave, high std and high amplitude
    if len(peaksZ)==1:
        if Az < 0.8 and Az > -0.8 and stdZ > 0.69 and tallZ[1]>0.3:
            return [2, 0, 1, 0, 0];
    elif Az < 0.8 and Az > -0.8 and stdZ > 0.69 and tallZ[0][1]>0.3:
        return [2, 0, 1, 0, 0];
    if rmsNet > 1.44:
        Mr = Mr +2; Mc = Mc - 3;
        Mb = Mb - 1; Mw = Mw + 1;
    elif rmsNet >1.4:
        Mb = Mb - 1; Mc = Mc - 2;
        Mw = Mw + 1; Mr = Mr +1;
    elif rmsNet > 1.16:
        Mw = Mw + 1; Mr = Mr +1; Mc = Mc - 1;
    elif rmsNet > 1.11:
        Mc = Mc - 1;
    if stdS > 0.52:
        Mr = Mr + 2;
        Mc = Mc - 1;
        Mb = Mb - 1;
    if stdZ > 0.62:
        Mr = Mr + 2; Mc = Mc - 3;
    if Az < 0.82:
        Mc = Mc-2;
    #check for 4th power variance
    if varZ4 < 1.09375:
        Mb = Mb + 2;
        Mc = Mc + 2;
        Mw = Mw - 1;
    elif varZ4 < 1.246:
        Mb = Mb + 1; Mc = Mc + 1;
    elif varZ4 > 1.6953:
        Mw = Mw + 1;
    elif varZ4 > 2.0:
        Mw = Mw+2; Mb = Mb - 1; Mc = Mc - 1; Mr = Mr + 1;
    #Low deviation favours car
    if max(fZ)<0.1 and As<0.2 and stdZ < 0.1 and stdS < 0.1:
        Mc = Mc + 5;
    elif max(fZ)<0.1 and As<0.2 and stdZ < 0.2 and stdS < 0.2:
        Mc = Mc + 2;
        Mw = Mw - 2; Mr = Mr - 10;
    #high frequency peak for idling car
    if ndim(tallZ) == 1 and tallZ[0] > 20:
        return [3, 0, 0, 1, 0];
    elif ndim(tallZ) > 1 and tallZ[0][0] > 20:
        return [3, 0, 0, 1, 0];
    #biking tends to have lower rms than walking
    if rmsZ < 0.007:
        Mc = Mc +1;
    elif rmsZ < 0.026:
        Mb = Mb + 1;
    elif rmsZ > 0.098:
        Mw = Mw +2; Mr = Mr + 2;
        Mc -= 2; Mb -= 1;
    elif rmsZ > 0.069: #0.051 0.0718
        Mw = Mw +1; Mr = Mr + 1;
    #one peak much taller than the other
    if ndim(tallZ)>1 and (tallZ[0][1]) > (5.2*(tallZ[1][1])):
        Mb = Mb + 2;
    elif ndim(tallZ) > 1 and (tallZ[0][1]) > 1.33*(tallZ[1][1]):
        Mb = Mb + 1;
    elif ndim(tallZ) == 1 and (tallZ[1]) > 2.0*average(fZ):
        Mb = Mb +2;
        if tallZ[1] == 0 or tallZ[1] < 0.15:
            Mc = Mc +2;
    #if FT ammplitude is too low, disfavour running
    if ndim(tallZ) == 1 and tallZ[1] < 0.2:
        Mr = Mr-1;
    elif ndim(tallZ) > 1 and tallZ[0][1] < 0.2:
        Mr = Mr-1;
    #if no peaks, disfavour walk/run, use [0] instead [0 0] for 1D
    if ndim(tallZ) == 1 and tallZ[0] == 0:
```

-continued

```
Mw = Mw − 1; Mr = Mr − 1;
#favour walking if the dominant peak is at a low frequency
if max(fZ) > 7.9*average(fZ): #3,85
    if ndim(tallZ) == 1 and tallZ[0] < 2.6: #2.6
        Mw = Mw + 1;
    elif ndim(tallZ) > 1 and tallZ[0][0] < 2.6:
        Mw = Mw + 1;
#if highest peak is at a high frequency less likely to be walking
if ndim(tallZ) == 1:
    if tallZ[0] > 2.24 and tallZ[1] < 0.3:
        Mw = Mw − 1; Mc = Mc + 1; Mb = Mb + 2;
elif ndim(tallZ) > 1:
    if tallZ[0][0] > 2.24 and tallZ[0][1] < 0.3:
        Mw = Mw − 1; Mc = Mc + 1; Mb = Mb + 2;
if ndim(tallZ) == 1 and tallZ[0] > 2 and tallZ[1] < 0.16:
    Mb = Mb + 1; Mc += 1;
elif ndim(tallZ)> 1 and tallZ[0][0]>2 and tallZ[0][1] < 0.16:
    Mb = Mb + 1; Mc += 1;
elif ndim(tallZ) > 1 and tallZ[0][1] < 0.1:
    Mb = Mb+1; Mc +=1;
if ndim(tallZ) == 1 and tallZ[1] < 0.1:
    Mb = Mb+1; Mc +=1;
percent = percentages(Mw, Mr, Mc, Mb);
#find maximum value
if Mw >= Mr and Mw >= Mc and Mw >= Mb:
    return [1, percent[0], percent[1], percent[2], percent[3]];
elif Mr >= Mw and Mr >= Mc and Mr >= Mb:
    return [2, percent[0], percent[1], percent[2], percent[3]];
elif Mc >= Mw and Mc >= Mr and Mc > Mb:
    return [3, percent[0], percent[1], percent[2], percent[3]];
elif Mb >= Mw and Mb >= Mr and Mb >= Mc:
    return [4, percent[0], percent[1], percent[2], percent[3]];
else:
    return [0, percent[0], percent[1], percent[2], percent[3]];
else:
    return [0, 0, 0, 0, 0];
```

At least the following is claimed:

1. A method, comprising:
    receiving a time value and at least three streams of data sample values from one or more sensors of a wireless communication device (WCD) that is transported by a mobile thing (MT), each data sample value indicative of movement of the WCD at a corresponding time value;
    recognizing a particular set of data sample values as a reference for defining an orientation of the WCD in a coordinate system;
    computing reference data based upon the recognition of the particular set, the reference data defining a relationship between each set of subsequent non-reference data sample values and the particular reference set of data sample values in the coordinate system;
    calculating movement data in the coordinate system of one or more other non-reference data sample values based upon the reference data; and
    determining a mobile thing motion activity (MTMA) associated with the MT based upon the movement data.

2. The method of claim 1, further comprising:
    prior to recognizing, mathematically combining the data sample values of the particular reference set; and
    recognizing the particular reference set as the reference when a combined value has a magnitude that is indicative of a relationship to Earth gravity.

3. The method of claim 2, further comprising updating the reference data each time the reference set of data samples is recognized.

4. The method of claim 1, wherein:
    each set of data sample values includes a vector defined by three data sample values x, y, z;
    the reference data is a rotation matrix M; and
    the movement data comprises a vertical magnitude along the z axis and a horizontal magnitude along the x, y plane, both derived from a rotated vector, the rotated vector equal to the rotation matrix M multiplied by the vector associated with the other non-reference data sample values x, y, z.

5. The method of claim 4, further comprising:
    transforming the movement data to the frequency domain (FD) to produce FD data;
    computing one or more FD statistical metrics from the FD data; and
    wherein the MTMA identifying is based at least in part upon the FD statistical metrics.

6. The method of claim 5, wherein the MTMA is identified from a set of MTMAs and further comprising:
    computing a score for each MTMA of the set; and
    comparing the scores to identify the MTMA.

7. The system of claim 5, wherein the MTMA is identified from a set of MTMAs and wherein the computer program code further comprises:
    code to compute a score for each MTMA of the set; and
    code to compare the scores to identify the MTMA.

8. The method of claim 1, wherein the MTMA is identified from a set of MTMAs and further comprising:
    computing a score for each MTMA of the set; and
    comparing the scores to identify the MTMA.

9. The method of claim 1, wherein the reference data is in the form of a rotation matrix that normalizes the sets of non-reference data sample values with respect to Earth gravity.

10. The method of claim 1, wherein the movement data is in the time domain (TD) and wherein the computing comprises:
    computing a magnitude of the movement data in each of the two dimensions of space;
    computing one or more TD statistical metrics from the magnitudes; and
    wherein the MTMA determining is based at least in part upon the TD statistical metrics.

11. The method of claim 10, further comprising:
    transforming the magnitudes from the TD to the frequency domain (FD) to produce FD data;
    computing one or more FD statistical metrics from the FD data; and
    wherein the MTMA determining is based at least in part the FD statistical metrics.

12. The system of claim 10, wherein the computer program code further comprises:
    code to transform the magnitudes from the TD to the frequency domain (FD) to produce FD data;
    code to compute one or more FD statistical metrics from the FD data; and
    wherein the MTMA determining is based at least in part the FD statistical metrics.

13. The method of claim 1, wherein one or more of the steps of the method is implemented in the WCD, in a computer system that is remote to the WCD, or in a combination of both.

14. The system of claim 1, wherein the MTMA is identified from a set of MTMAs and wherein the computer program code further comprises:
    code to compute a score for each MTMA of the set; and
    code to compare the scores to identify the MTMA.

15. The system of claim 1, wherein the reference data is in the form of a rotation matrix that normalizes the sets of non-reference data sample values with respect to Earth gravity.

16. The system of claim 1, wherein the system is implemented in the WCD, in a computer system that is remote to the WCD, or in a combination of both.

17. A method, comprising:
   receiving first and second data from one or more sensors associated with a wireless communication device (WCD) transported by a mobile thing (MT), the first and second data indicative of movement of the WCD;
   determining reference data that defines a reference framework from the first data;
   normalizing the second data with the reference data so that the second data can be analyzed in the reference framework; and
   identifying a mobile thing motion activity (MTMA) associated with the MT based upon the normalized second data.

18. The method of claim 17, wherein the second data comprises a plurality of periodic samples.

19. The method of claim 17, wherein the reference data is indicative of a relationship to Earth gravity.

20. The method of claim 17, wherein the reference data is determined in the form of vector information indicative of a relation to Earth gravity by comparing the first data to a predefined numerical range.

21. The method of claim 20, wherein the one or more sensors produce first, second, and third sample data along each of 3 axes in a three dimensional (3D) coordinate system and wherein the first data pertains to a value that equals one within a predefined range, the value computed by combining the first, second, and third sample data.

22. The method of claim 17, wherein the second data is in the time domain (TD) and wherein the identifying comprises:
   computing magnitudes of the second data in each of the two dimensions of the 2D space;
   computing one or more TD statistical metrics from the magnitudes; and
   wherein the MTMA identifying is based at least in part upon the TD statistical metrics.

23. The method of claim 22, further comprising:
   transforming the magnitudes from the TD to the frequency domain (FD) to produce FD data;
   computing one or more FD statistical metrics from the FD data; and
   wherein the MTMA identifying is based at least in part the FD statistical metrics.

24. The method of claim 23, wherein the MTMA is identified from a known plurality of MTMAs and further comprising:
   computing a score for each MTMA of the known plurality; and
   comparing the scores to identify the MTMA.

25. The method of claim 17, wherein one or more of the steps of the method is implemented in the WCD, in a computer system that is remote to the WCD, or in a combination of both.

26. The method of claim 17, further comprising:
   determining an MTMA based action to be initiated based upon the identified MTMA; and
   initiating the MTMA based action.

27. A method for implementation in a wireless communication device (WCD) that is designed to detect a plurality of mobile thing motion activities (MTMAs) associated with a mobile thing (MT), comprising:
   receiving a plurality of data sample values from one or more sensors of the WCD that is transported by the MT, the data sample values indicative of movement of the WCD;
   computing reference data, the reference data defining a relationship between data sample values and a reference framework to enable comparison of data sample values;
   calculating movement data based upon the reference data and the data sample values; and
   determining an MTMA associated with the MT based upon the movement data.

28. The method of claim 27, further comprising:
   recognizing a particular set of data sample values as a reference for defining an orientation of the WCD in a coordinate system;
   determining a rotation matrix based upon the particular set of reference data sample values; and
   calculating the movement data based upon the rotation matrix and one or more sets of the data sample values that are not the particular reference set.

29. The method of claim 27, wherein the data sample values are received from a plurality of the sensors.

30. The method of claim 29, wherein the plurality of sensors include at least an accelerometer and a gyroscope.

31. The method of claim 30, wherein the plurality of sensors further includes a global positioning system (GPS) receiver.

32. The method of claim 27, wherein the MTMA is determined by:
   computing a score for each MTMA of the plurality; and
   comparing the scores to identify the MTMA.

33. The method of claim 27, wherein the reference data is indicative of a relationship to Earth gravity.

34. The method of claim 27, wherein the movement data is in the time domain (TD) and wherein the calculating comprises:
   computing a magnitude of the movement data in each of at least two dimensions of space;
   computing one or more TD statistical metrics from the magnitudes; and
   wherein the MTMA determining is based at least in part upon the TD statistical metrics.

35. The method of claim 34, further comprising:
   transforming the magnitudes from the TD to the frequency domain (FD) to produce FD data;
   computing one or more FD statistical metrics from the FD data; and
   wherein the MTMA determining is based at least in part the FD statistical metrics.

36. A system, comprising:
   one or more memories designed to store computer program code;
   one or more processors designed to execute the computer program code; and
   wherein the computer program code comprises:
      code to receive a time value and at least three streams of data sample values from one or more sensors of a wireless communication device (WCD) that is transported by a mobile thing (MT), each data sample value indicative of movement of the WCD at a corresponding time value;
      code to recognize a particular set of data sample values as a reference for defining an orientation of the WCD in a coordinate system;
      code to compute reference data based upon the recognition of the particular set, the reference data defining a relationship between each set of subsequent non-reference data sample values and the particular reference set of data sample values in the coordinate system;

code to calculate movement data in the coordinate system of one or more other non-reference data sample values based upon the reference data; and code to determine a mobile thing motion activity (MTMA) associated with the MT based upon the movement data.

37. The system of claim 36, wherein the computer program code further comprises:
code to mathematically combine the data sample values of the particular reference set; and
code to recognize the particular reference set as the reference when a combined value has a magnitude that is indicative of a relationship to Earth gravity.

38. The system of claim 37, wherein the computer program code further comprises code to update the reference data each time the reference set of data samples is recognized.

39. The system of claim 36, wherein:
each set of data sample values includes a vector defined by three data sample values x, y, z;
the reference data is a rotation matrix M; and
the movement data comprises a vertical magnitude along the z axis and a horizontal magnitude along the x, y plane, both derived from a rotated vector, the rotated vector equal to the rotation matrix M multiplied by the vector associated with the other non-reference data sample values x, y, z.

40. The system of claim 39, wherein the computer program code further comprises:
code to transform the movement data to the frequency domain (FD) to produce FD data;
code to compute one or more FD statistical metrics from the FD data; and
wherein the MTMA identifying is based at least in part upon the FD statistical metrics.

41. The system of claim 36, wherein the movement data is in the time domain (TD) and wherein the code to compute comprises:
code to compute a magnitude of the movement data in each of the two dimensions of space;
code to compute one or more TD statistical metrics from the magnitudes; and
wherein the MTMA determining is based at least in part upon the TD statistical metrics.

42. A system, comprising:
one or more memories designed to store computer program code;
one or more processors designed to execute the computer program code; and
wherein the computer program code comprises:
code to receive first and second data from one or more sensors associated with a wireless communication device (WCD) transported by a mobile thing (MT), the first and second data indicative of movement of the WCD;
code to determine reference data that defines a reference framework from the first data;
code to normalize the second data with the reference data so that the second data can be analyzed in the reference framework; and
code to identify a mobile thing motion activity (MTMA) associated with the MT based upon the normalized second data.

43. The system of claim 42, wherein the second data comprises a plurality of periodic samples.

44. The system of claim 42, wherein the reference data is indicative of a relationship to Earth gravity.

45. The system of claim 42, wherein the reference data is determined in the form of vector information indicative of a relation to Earth gravity by comparing the first data to a predefined numerical range.

46. The system of claim 45, wherein the one or more sensors produce first, second, and third sample data along each of 3 axes in a three dimensional (3D) coordinate system and wherein the first data pertains to a value that equals one within a predefined range, the value computed by combining the first, second, and third sample data.

47. The system of claim 42, wherein the second data is in the time domain (TD) and wherein the code to identify comprises:
code to compute magnitudes of the second data in each of the two dimensions of the 2D space;
code to compute one or more TD statistical metrics from the magnitudes; and
wherein the MTMA identifying is based at least in part upon the TD statistical metrics.

48. The system of claim 47, wherein the computer program code further comprises:
code to transform the magnitudes from the TD to the frequency domain (FD) to produce FD data;
code to compute one or more FD statistical metrics from the FD data; and
wherein the MTMA identifying is based at least in part the FD statistical metrics.

49. The system of claim 48, wherein the MTMA is identified from a known plurality of MTMAs and wherein the computer program code further comprises:
code to compute a score for each MTMA of the known plurality; and
code to compare the scores to identify the MTMA.

50. The system of claim 42, wherein the system is implemented in the WCD, in a computer system that is remote to the WCD, or in a combination of both.

51. The system of claim 42, wherein the computer program code further comprises:
code to determine an MTMA based action to be initiated based upon the identified MTMA; and
code to initiate the MTMA based action.

52. A system for implementation in a wireless communication device (WCD) that is designed to detect a plurality of mobile thing motion activities (MTMAs) associated with a mobile thing (MT), comprising:
one or more memories designed to store computer program code;
one or more processors designed to execute the computer program code; and
wherein the computer program code comprises:
code to receive a plurality of data sample values from one or more sensors of the WCD that is transported by the MT, the data sample values indicative of movement of the WCD;
code to compute reference data, the reference data defining a relationship between data sample values and a reference framework to enable comparison of data sample values;
code to calculate movement data based upon the reference data and the data sample values; and
code to determine an MTMA associated with the MT based upon the movement data.

53. The system of claim 52, wherein the computer program code further comprises:
code to recognize a particular set of data sample values as a reference for defining an orientation of the WCD in a coordinate system;

code to determine a rotation matrix based upon the particular set of reference data sample values; and code to calculate the movement data based upon the rotation matrix and one or more sets of the data sample values that are not the particular reference set.

54. The system of claim 52, wherein the data sample values are received from a plurality of the sensors.

55. The system of claim 54, wherein the plurality of sensors include at least an accelerometer and a gyroscope.

56. The system of claim 55, wherein the plurality of sensors further includes a global positioning system (GPS) receiver.

57. The system of claim 52, wherein the code to determine the MTMA comprises:
  code to compute a score for each MTMA of the plurality; and
  code to compare the scores to identify the MTMA.

58. The system of claim 52, wherein the reference data is indicative of a relationship to Earth gravity.

59. The system of claim 52, wherein the movement data is in the time domain (TD) and wherein the code to calculate comprises:
  code to compute a magnitude of the movement data in each of at least two dimensions of space;
  code to compute one or more TD statistical metrics from the magnitudes; and
  wherein the MTMA determining is based at least in part upon the TD statistical metrics.

60. The system of claim 52, wherein the computer program code further comprises:
  code to transform the magnitudes from the TD to the frequency domain (FD) to produce FD data;
  code to compute one or more FD statistical metrics from the FD data; and
  wherein the MTMA determining is based at least in part the FD statistical metrics.

* * * * *

UNITED STATES PATENT AND TRADEMARK OFFICE
CERTIFICATE OF CORRECTION

PATENT NO. : 9,049,558 B2
APPLICATION NO. : 13/935672
DATED : June 2, 2015
INVENTOR(S) : Martin Kelly Jones, Scott Andrew Horstemeyer and Maria Khomenko Page 1 of 1

It is certified that error appears in the above-identified patent and that said Letters Patent is hereby corrected as shown below:

On the title page

Item 60 After "61/843,077, filed on July 5, 2013," insert: --, continuation-in-part of application No. 12/354,927, filed January 16, 2009, now U.S. Patent No. 8,559,914, which claims the benefit of provisional application No. 61/021,447--.

In the specification

Column 1, line 29, after "DETECTION.", insert the following starting on line 30:

--This application is also a continuation-in-part (CIP) of application no. 12/354,927, filed January 16, 2009, entitled "INTERACTIVE PERSONAL SURVEILLANCE AND SECURITY (IPSS) SYSTEM, now U.S. Patent No. 8,559,914, which claims the benefit of provisional application no. 61/021,447, filed January 16, 2008, entitled "INTERACTIVE PERSONAL SURVEILLANCE SYSTEM AND METHOD."--.

Signed and Sealed this
Twenty-fourth Day of May, 2016

Michelle K. Lee
*Director of the United States Patent and Trademark Office*